(12) United States Patent
Hung et al.

(10) Patent No.: US 8,538,360 B2
(45) Date of Patent: Sep. 17, 2013

(54) SYSTEM AND METHOD FOR MANAGING ITEMS IN A LIST SHARED BY A GROUP OF MOBILE DEVICES

(75) Inventors: Michael Hin Kai Hung, Toronto (CA); Herbert Anthony Little, Waterloo (CA); Michael Stephen Brown, Kitchener (CA)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 13/570,751

(22) Filed: Aug. 9, 2012

(65) Prior Publication Data

US 2012/0298744 A1    Nov. 29, 2012

Related U.S. Application Data

(63) Continuation of application No. 12/756,807, filed on Apr. 8, 2010, now Pat. No. 8,254,890, which is a continuation-in-part of application No. 12/420,562, filed on Apr. 8, 2009.

(60) Provisional application No. 61/249,487, filed on Oct. 7, 2009.

(51) Int. Cl.
*H04B 1/18* (2006.01)
(52) U.S. Cl.
USPC ...................................... 455/154.2; 455/41.2
(58) Field of Classification Search
USPC ............ 455/518, 519, 3.06, 466, 41.2, 556.1, 455/154.2
See application file for complete search history.

(56) References Cited

U.S. PATENT DOCUMENTS

| | | | |
|---|---|---|---|
| 6,785,868 B1 | 8/2004 | Raff | |
| 7,221,910 B2 * | 5/2007 | Ishii et al. | 455/41.2 |
| 7,729,690 B1 | 6/2010 | Huang et al. | |
| 7,933,587 B1 | 4/2011 | Swan | |

(Continued)

FOREIGN PATENT DOCUMENTS

| | | |
|---|---|---|
| WO | WO 99/63709 A2 | 12/1999 |
| WO | WO 02/089026 A2 | 11/2002 |
| WO | WO 2008/003829 A1 | 1/2008 |

OTHER PUBLICATIONS

Zhang, N.; "Peer-to-Peer Distributed Database System"; Jul. 2004; Available from http://dspace.hil.unb.ca:8080/bitstream/handle/1882/180/zhang_naishan_200407.pdf?sequence=1.

(Continued)

*Primary Examiner* — Tu X Nguyen
(74) *Attorney, Agent, or Firm* — Brett J. Slaney; Blake, Cassels & Graydon LLP

(57) ABSTRACT

A method and system are provided for operating a mobile device, the method comprising: reading a barcode being displayed by another mobile device, to identify a group, by capturing at least one image of the barcode; and joining the group identified by the barcode. Another method and system are provided, the method comprising: storing a barcode on the mobile device, the barcode identifying a group; and displaying the barcode on a display of the mobile device such that the entire barcode is visible on the display to enable another mobile device to scan the barcode to join the group. Another method and system are provided, the method comprising: reading a barcode being displayed by another mobile device, to identify an individual associated with the other mobile device, by capturing at least one image of the barcode; and inviting the individual identified by the barcode to join a group.

32 Claims, 58 Drawing Sheets

(56) References Cited

U.S. PATENT DOCUMENTS

| | | |
|---|---|---|
| 8,068,811 B2 | 11/2011 | Takamune |
| 8,190,695 B2 * | 5/2012 | Rekimoto et al. ............ 709/208 |
| 2003/0208541 A1 | 11/2003 | Musa |
| 2005/0021695 A1 | 1/2005 | Takamine |
| 2005/0044187 A1 | 2/2005 | Jhaveri et al. |
| 2006/0069727 A1 | 3/2006 | Fuller et al. |
| 2007/0019616 A1 * | 1/2007 | Rantapuska et al. .......... 370/352 |
| 2007/0033271 A1 | 2/2007 | Hullot et al. |
| 2007/0042800 A1 | 2/2007 | Tani |
| 2007/0208802 A1 | 9/2007 | Barman et al. |
| 2009/0215486 A1 | 8/2009 | Batni et al. |
| 2009/0233543 A1 * | 9/2009 | Watson et al. ............... 455/3.06 |
| 2010/0174792 A1 | 7/2010 | Takei |

OTHER PUBLICATIONS

Yu, Jian et al.; "A Peer to Peer Database Model Based on Chord"; International Conference on Computer Science and Software Engineering; Dec. 12 to 14, 2008; vol. 4; Abstract only.

Ryeng; N. et al.; "Robust aggregation in peer-to-peer database systems"; Proceedings of the 2008 international symposium on Database engineering and applications; vol. 299 of the ACM International Conference Proceeding Series; ACM; New York, U.S.A.; Abstract only.

Larkin, H.; "Applying Concurrent Versioning to Serverless Mobile Device Synchronisation"; 6$^{th}$ IEEE/ACIS International Conference on Computer and Information Science; Jul. 11 to 13, 2007; pp. 157 to 162; IEEE Computer Society.

Screenshots from http://www.listingly.com; Accessed from internet Oct. 29, 2009.

Kreifelts, Thomas et al.; "Sharing To-Do Lists with a Distributed Task Manager"; Proceedings of the Third European Conference on Computer-Supported Cooperative Work, Sep. 13 to 17, 1993; Milan, Italy; http://www.ecscw.org/1993/03.pdf.

4Team Help Documentation; About 4Team (for Microsoft® Outlook®), Definitions, 4Team SE Introduction; http://outlook.4team.biz/4team_help_documentation.zip ; Accessed from internet Dec. 29, 2009.

Poppe, Fabrice; Search Report from corresponding European Application No. 10159435.6; Search completed Aug. 2, 2010.

Oteo Mayayo, C.; Partial search report from corresponding European Application No. 11161759.3; search completed Jul. 28, 2011.

* cited by examiner

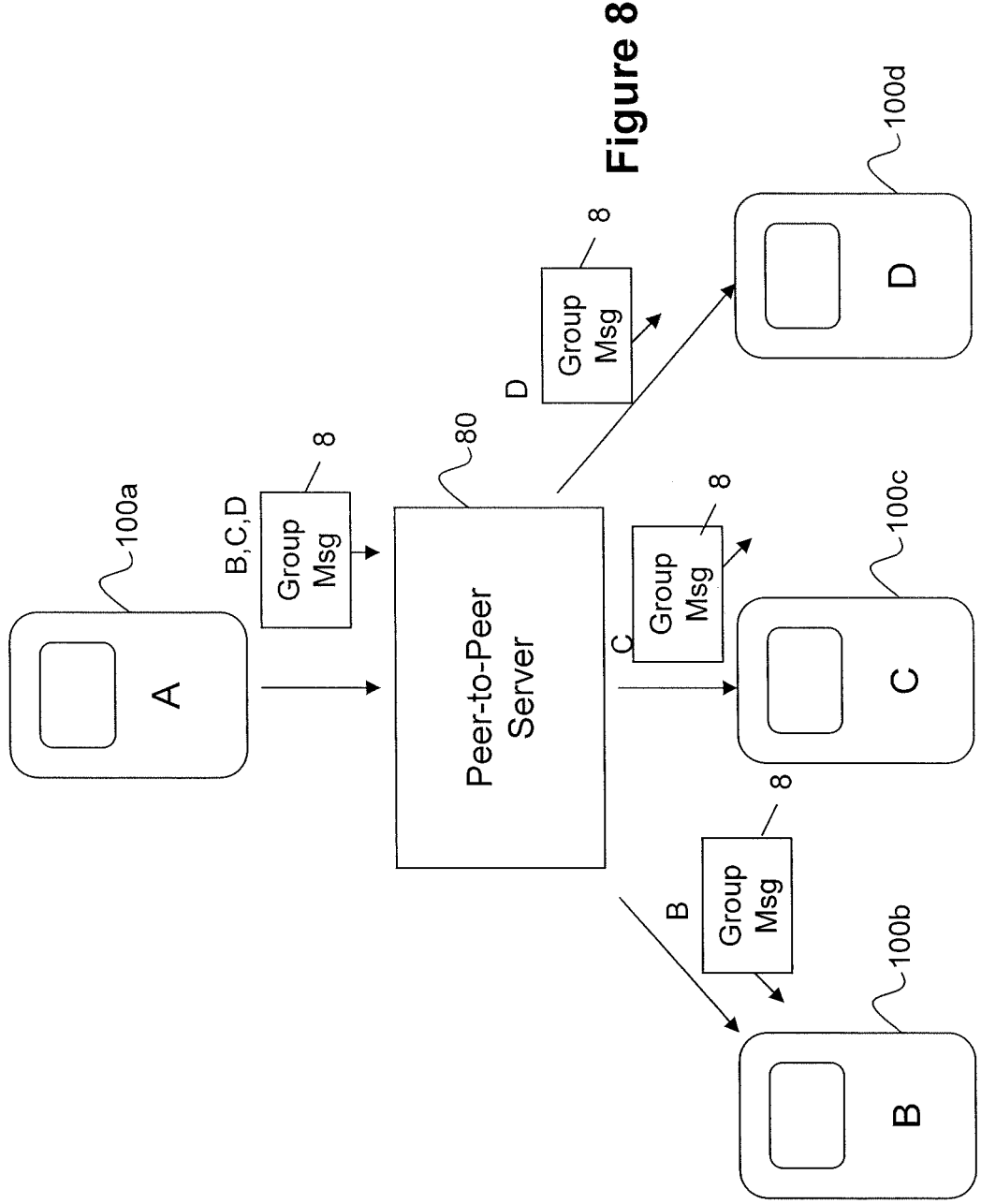

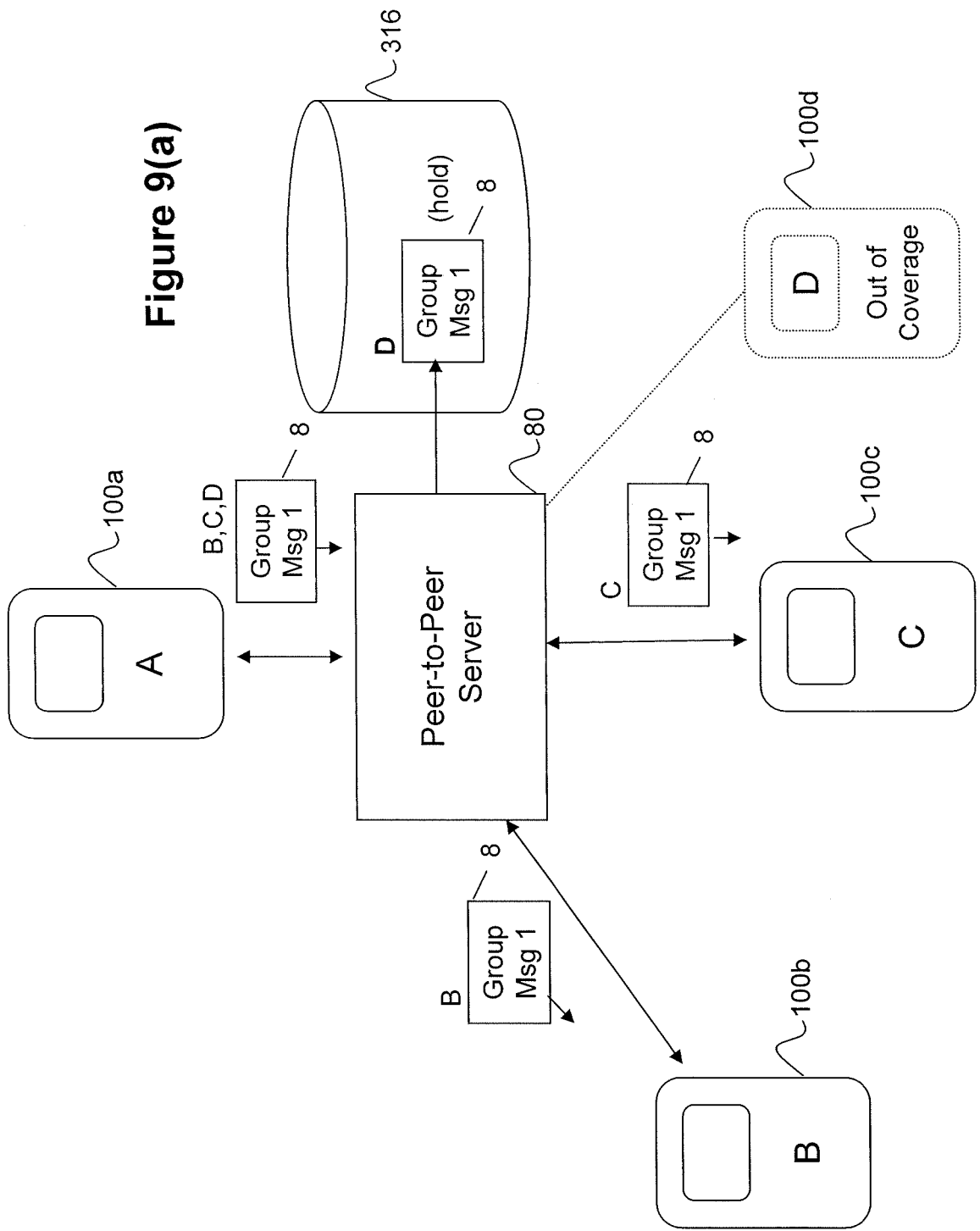

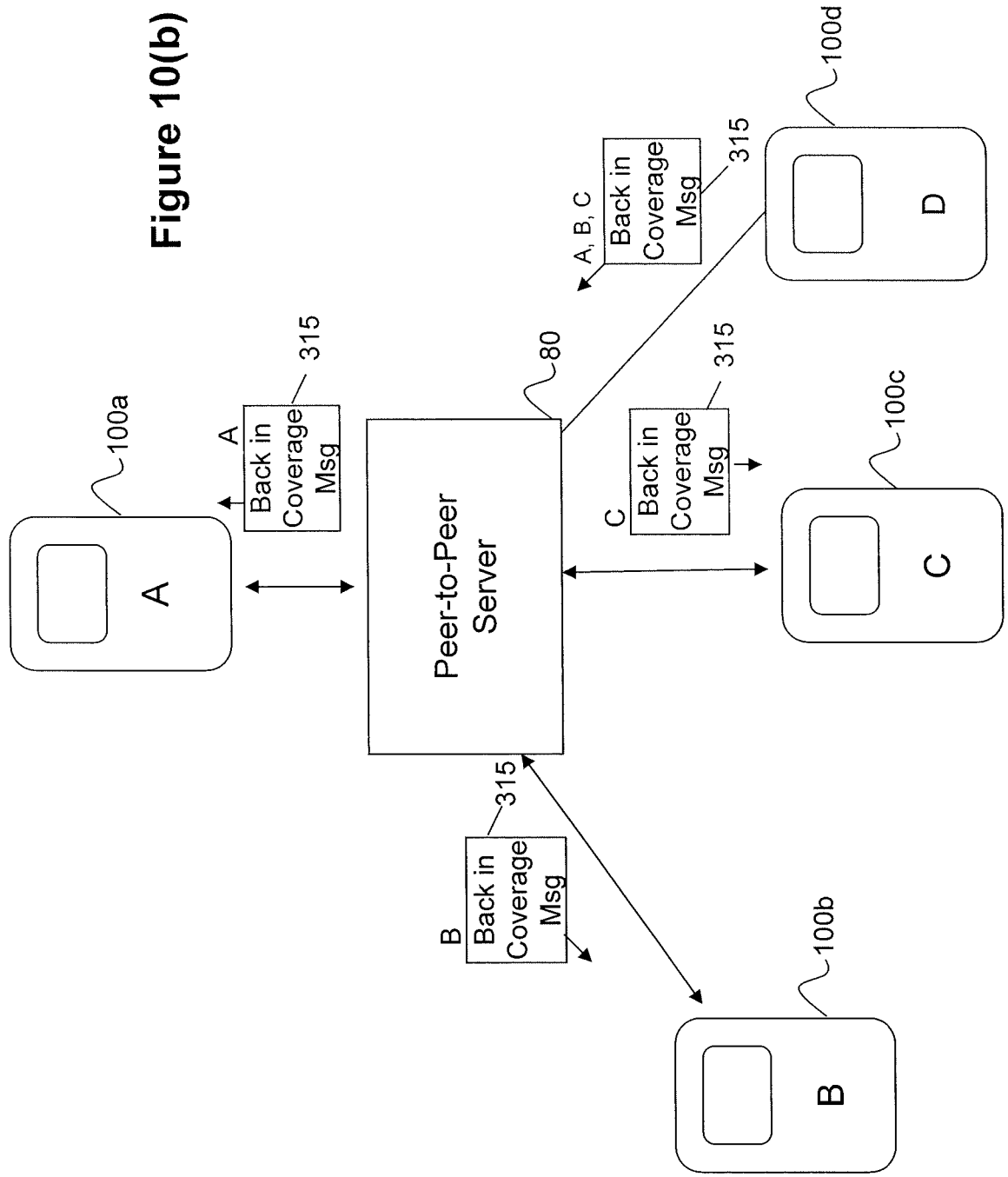

SYSTEM AND METHOD FOR MANAGING ITEMS IN A LIST SHARED BY A GROUP OF MOBILE DEVICES

This application is a continuation of U.S. patent application Ser. No. 12/756,807 filed on Apr. 8, 2010, which is a continuation-in-part of U.S. patent application Ser. No. 12/420,562 filed on Apr. 8, 2009; and claims priority from U.S. Provisional Application No. 61/249,487 filed on Oct. 7, 2009; the contents of these applications being incorporated herein by reference.

TECHNICAL FIELD

The following relates to systems and methods for managing tasks in a project shared by a group of mobile devices.

DESCRIPTION OF THE RELATED ART

Sharing data between a plurality of entities is typically accomplished by providing a set of shared data in a database on a centrally accessible server. Any changes, updates, edits, etc. can be managed by a document or version management system on the central server.

Implementing a database or otherwise sharing data on a server may have disadvantages. For example, providing a dedicated server and database service typically requires additional hardware, administration, infrastructure and corresponding overhead. There are also privacy concerns with regards to who has access to data and the susceptibility of such data to hackers or other adversaries. Furthermore, maintaining a master copy of the data on the server requires that version control be strictly monitored and typically requires some mechanism to update those having access to the data of any edits that are entered. Depending on the size of the group of users having access to the data, and the amount of data being stored, such tasks can add further administrative overhead. When allowing wireless access to a central database, low bandwidth and high latency can also put constraints on the system that can affect the consistency of the data and access thereto.

BRIEF DESCRIPTION OF THE DRAWINGS

Embodiments will now be described by way of example only with reference to the appended drawings wherein:

FIG. 8 is a flow diagram illustrating delivery of a group message to a group of mobile devices according to an update made at one of the mobile devices.

FIGS. 9(a) to 9(c) are a series of flow diagrams illustrating acknowledgement of delivery of a group message and illustrating holding a message for an "out of coverage" scenario.

FIGS. 10(a) to 10(c) are a series of flow diagrams illustrating forwarding held messages in a "back in coverage" scenario and subsequent delivery of a new group message by the back in coverage mobile device.

DETAILED DESCRIPTION

Figure 1A:
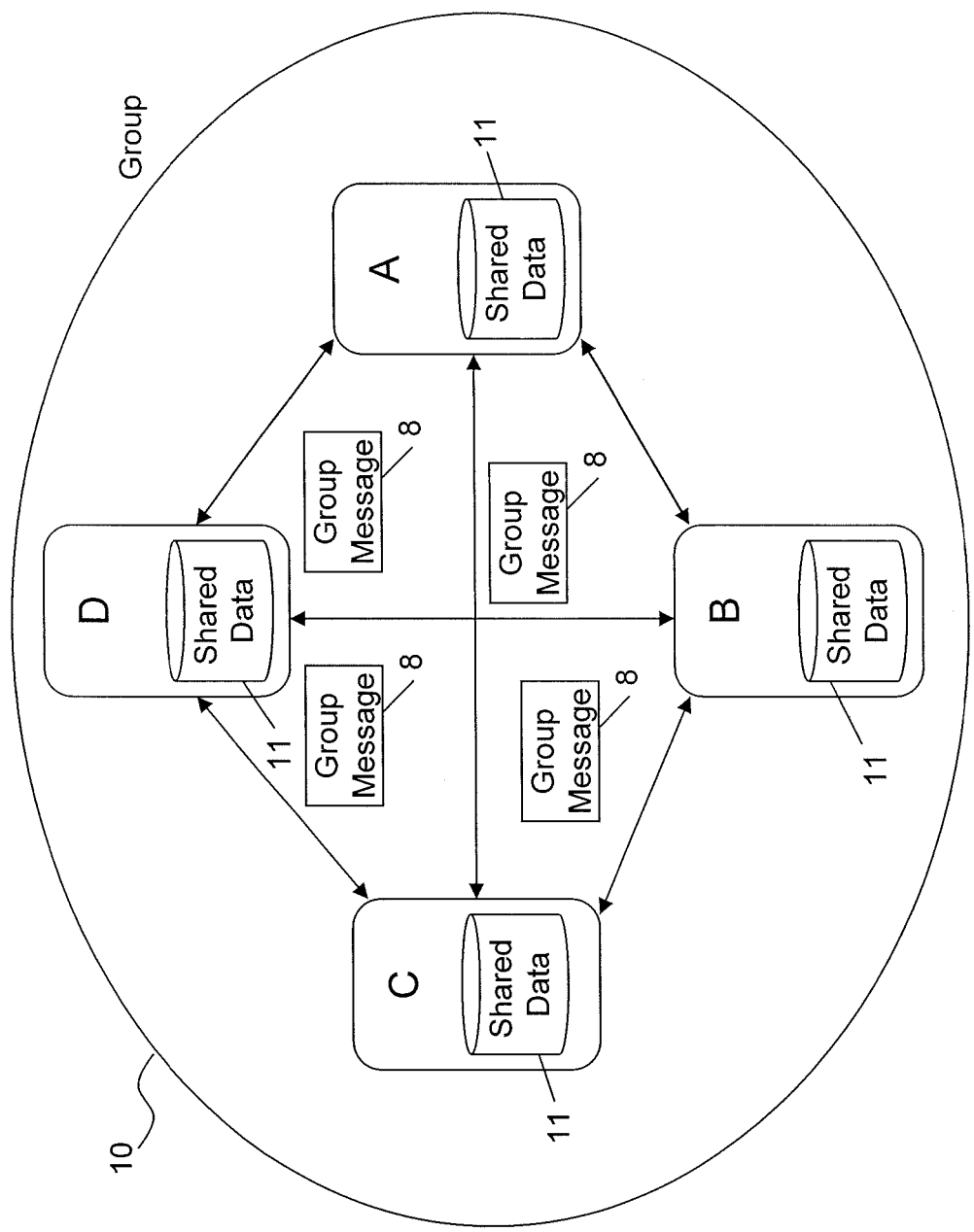
FIG. 1(a) is a schematic diagram illustrating a group of mobile devices sharing a common set of data.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

A method and system are provided for managing lists comprising a plurality of items, e.g. for managing tasks within a project. In order to share a project and manage tasks associated with such a project, an underlying system and method for sharing data amongst a group comprising a plurality of mobile devices can be used which does not require a database or server to centrally store the shared data. The shared data is instead stored by each group member individually while controlling the manner in which the shared data is updated. To manage such updates, the shared data is atomized such that individual databases in the shared data are separated or otherwise delineated into one or more records, each record having associated therewith, a value.

The value for a record can represent a user definable/customizable field or can be one of a finite set of alternatives, e.g. yes/no, time of day, etc. To maintain a common copy of the shared data at each device, any update is sent to all group members using an intermediate message exchange service that is capable of transmitting a sent message to more than one recipient if necessary. In this way, the updates are multicast to the group via a common message. To manage the content of the shared data, each update comprises one or more changes to a current copy of a corresponding record.

At the receiving end, each record may then be evaluated and replaced in its entirety (according to certain criteria) to simplify the resolution of collisions between updates to similar records and to inhibit propagation of changes throughout the shared data. In other words, atomic changes can be used such that only the data, information, selection or other value associated with a single record is affected for each addition, change or update. By managing the shared data in this way, updates to the shared data are also more tolerant of out-of-coverage situations. While devices are out-of-coverage, messages containing updates can be held until the device comes back into coverage or the messages may be resent on a periodic basis or both.

FIG. 1(a) illustrates an example group 10 of four members, A, B, C, D having amongst them, a set of shared data 11. The members A, B, C, and D may be any data communication device capable of sending, receiving, examining, storing and otherwise processing or handling data and in the following illustrative examples comprise mobile communication devices 100 (see also FIG. 3). The group 10 may be of any size but for the following examples is a small static set of members or users having the same relation to everyone else, e.g. family, sports team, co-workers, small business, club or organization, etc. As noted above, the shared data 11 exists without requiring a master copy controlled by a central entity but rather a copy of the shared data 11 is maintained at each member by exchanging multicast messages comprising updates via a message exchange service capable of such exchanges.

Although not shown, a private sub-group may also be formed within and amongst a sub-set of the members of the group 10 for sharing a set of private shared data. This allows certain members to share some specific data and information while excluding other members from accessing such data. For example, if the group 10 is a family, the parents may form a sub-group for sharing gift ideas for their children or other information such as disciplinary tactics or subjects of a sensitive nature. This avoids the need for forming an entirely separate group 10 simply to share some select information. It can be appreciated that the shared data 11 and any private shared data may be separate databases or separate portions of a common database. It can also be appreciated that FIG. 1(a) shows one group 10 but members may also belong to multiple groups each having a different set of shared data 11 exclusive to that group 10 (not shown).

Figure 1B:
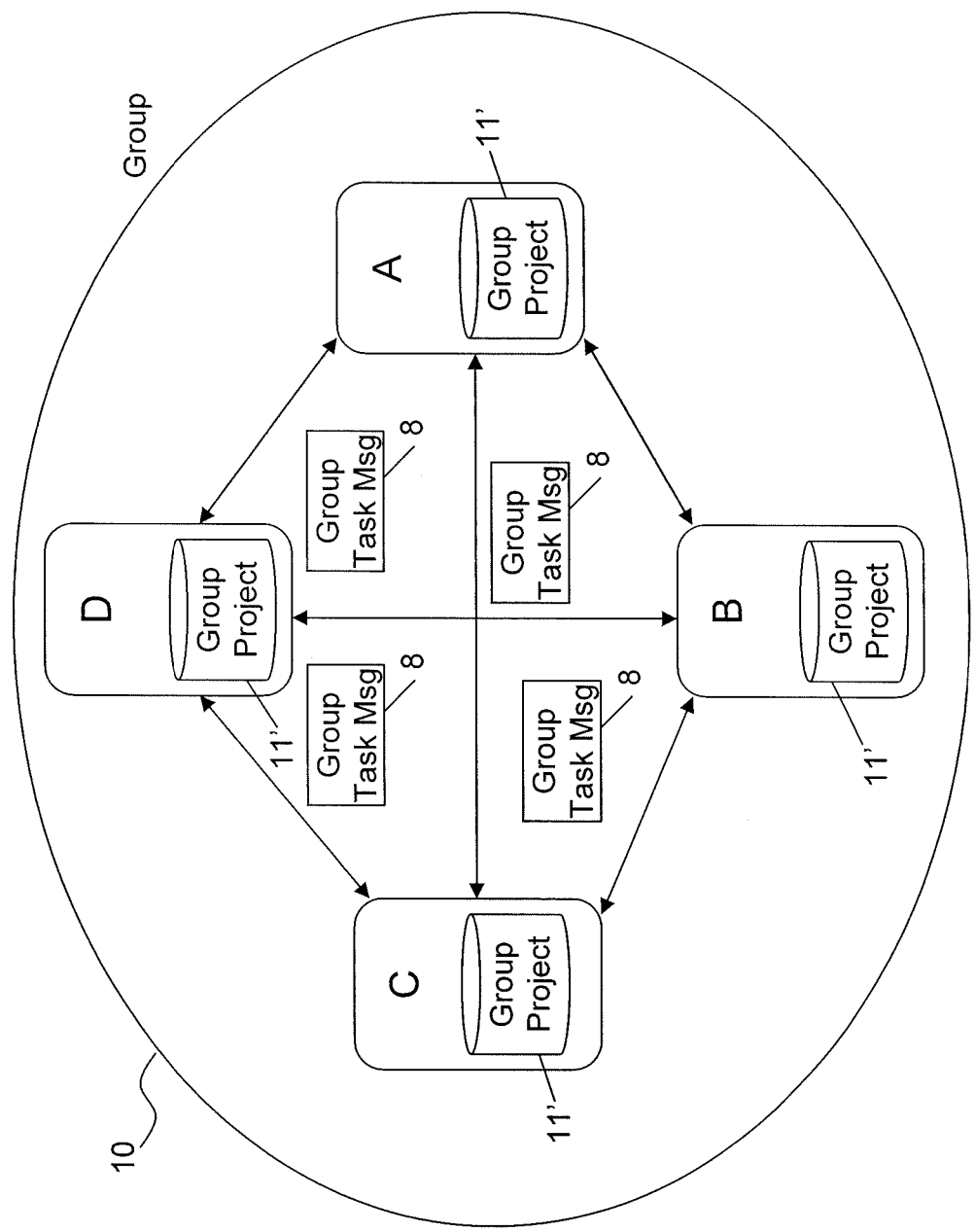
FIG. 1(b) is a schematic diagram illustrating management of a group list using the group shown in FIG. 1(a).

FIG. 1(b) illustrates an implementation of the group 10 shown in FIG. 1(a) for sharing a group list 11' and managing items within that group list 11'. The group list 11' may represent, as shown in this example, a project comprising a plurality of tasks. By utilizing the principles discussed herein, group tasks can be managed within a group project and by maintaining the group project 11' by exchanging group task messages 8, each member of the group 10 can see an up-to-date view of the status of the project. Similarly, tasks can be assigned and messages associated with the group project 11', which can both be seen by the members of the group through the distribution of data as herein described. This can be particularly advantageous for corporate project teams to establish groups and use the mechanisms employed herein to manage one or more projects.

Figure 2:
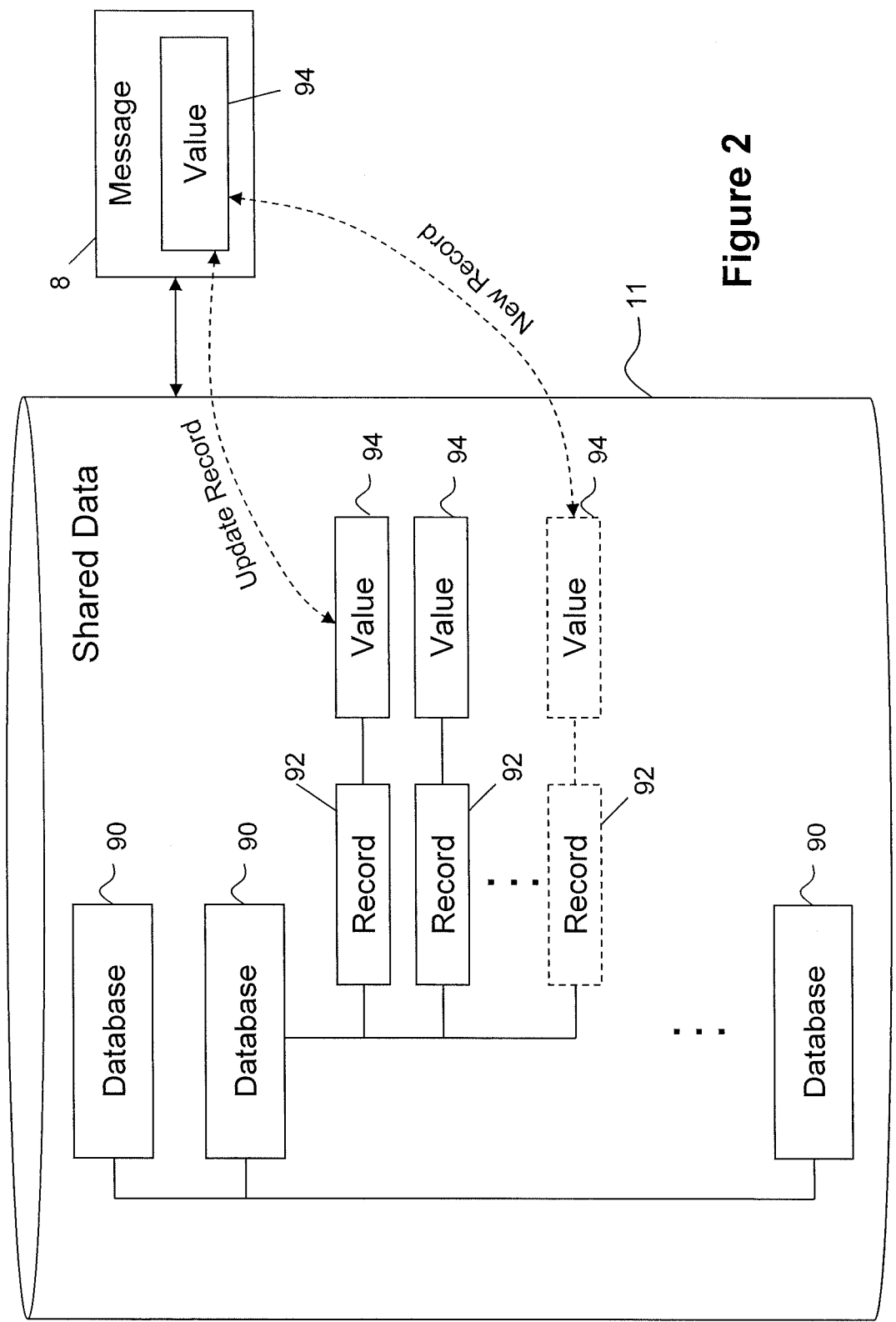
FIG. 2 is a schematic diagram illustrating a database storage hierarchy for the shared data shown in FIG. 1.

FIG. 2 illustrates the structure of the shared data 11 in one embodiment. The shared data 11 in this embodiment comprises one or more databases 90. Each database 90 can have associated therewith, one or more records 92, which enables each database 90 to be comprised of various components. Each record 92 has associated therewith, a value 94, which represents the portion of the database 90 associated with that particular record name. For example, a calendar program or applet can be represented in the shared data 11 as a database 90 which has a record 92 for each one hour block on each day in each month. Each record 92 can contain an appointment for the respective day, which is represented by the value 94, e.g. an alphanumeric string. As such, it can be seen from FIG. 2 that the shared data 11 can be given a tiered structure to provide granularity down to the record level such that when a new record 92 is added, or an existing record 92 is modified, the record 92 can simply be added or overwritten in the corresponding database 90 without necessarily disrupting the other components of the shared data 11. It can be appreciated that more than one database 90 can be associated with a particular application or applet. For example, an application for picture sharing may have a database 90 for the pictures and another database 90 for conversations or comments associated with the pictures.

It can be appreciated that the granularity and number of tiers shown in FIG. 2 is for illustrative purposes only and that other structures may be used. For example, another, higher level tier can be used to separate objects (not shown) within each database. Turning back to the calendar example, the calendar, being a database 90 can comprise an object for each day in the calendar with a record 92 for each hour and the value 94 contains anything that may be written in for that hour. Alternatively, as noted above, the calendar application could instead have multiple databases 90, each database representing a month, week, day, etc. A tiered structure such as that shown in FIG. 2 enables the shared data 11 to be updated through a simple replacement at a particular tier, typically that tier which includes the actual value that contains the information relevant to the group 10 (e.g. by replacing a record 92 and its value 94 at the lowest tier). If a new database 90 is created by one member, such a new database 90 can be created at each other member through the distribution of a group message 8. Similarly, for an existing database 90, if a new record 92 is created at one member, such new record 92 can be added to the shared data 11 at each other member by distributing a group message 8. In either case, using the structure shown in FIG. 2, a new record 92 and its associated value 94 would be added and placed in a new or existing database 90. It may be noted that the message 8 shown in FIG. 2 is for illustrative purposes only and would typically include other information in addition to the value 94, e.g. to identify the sender and recipient, identify the database 90 and record 92, etc. as will be explained in greater detail below.

As discussed, the shared data 11 is maintained by each member of the group 10 rather than being managed and maintained by a central entity such as a server or central database. In order to communicate any changes that are made locally at any one of the members, messages 8 are sent from the member making the change to each other member via a message exchange service. Such a message exchange service thus provides a multicast message service to the group 10.

Figure 3:
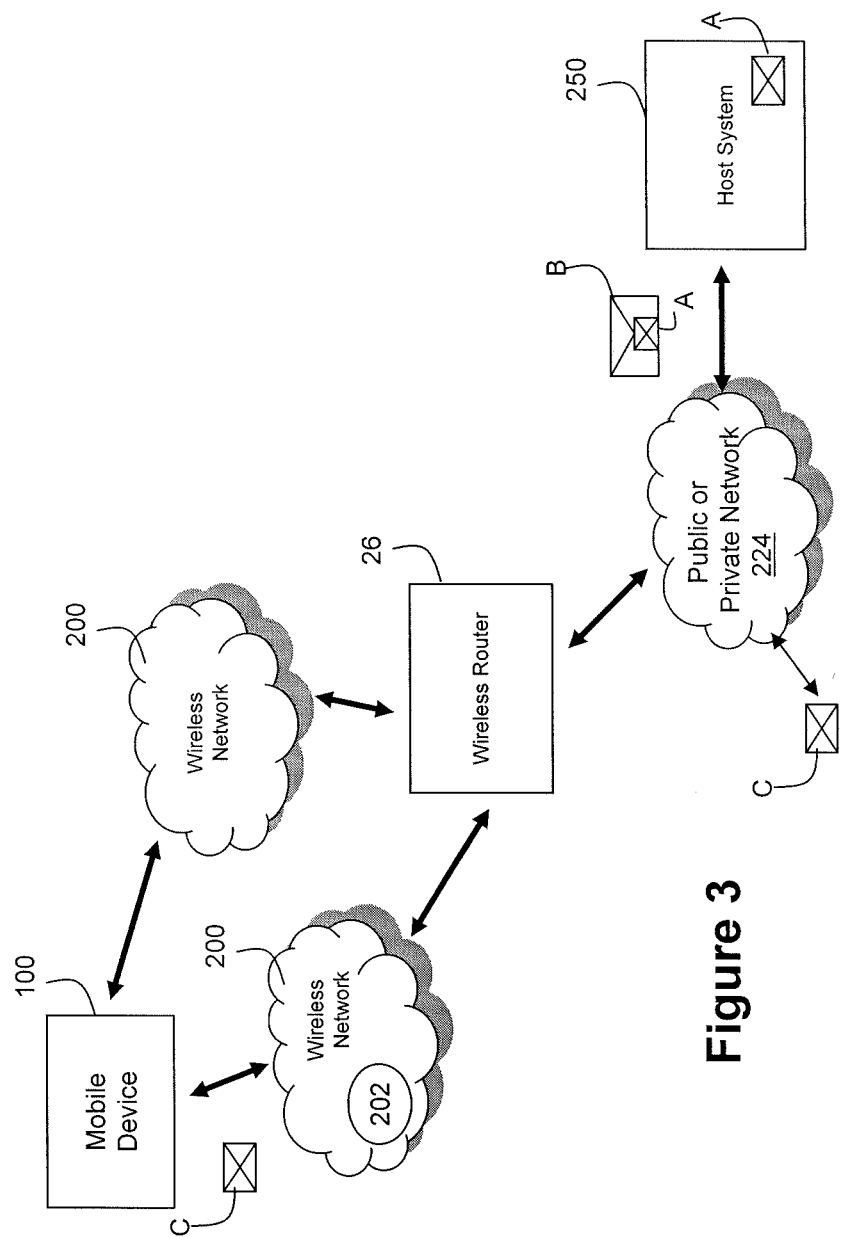
FIG. 3 is a system diagram illustrating the environment in which data items are pushed from a host system to a mobile device.

There are many suitable configurations for providing the message exchange but for the sake of illustration, the following examples are provided for a group 10 of mobile devices 100 that normally communicate through a wireless network 200 as shown by way of example in FIG. 3.

Examples of applicable communication devices include pagers, cellular phones, cellular smart-phones, wireless organizers, personal digital assistants, computers, laptops, handheld wireless communication devices, wirelessly enabled notebook computers and the like. Such devices will hereinafter be commonly referred to as "mobile devices" for the sake of clarity.

In a typical embodiment, the mobile device may be a two-way communication device with advanced data communication capabilities including the capability to communicate with other mobile devices or computer systems through a network of transceiver stations. The mobile device may also have the capability to allow voice communication. Depending on the functionality provided by the mobile device, it may be referred to as a data messaging device, a two-way pager, a cellular telephone with data messaging capabilities, a wireless Internet appliance, or a data communication device (with or without telephony capabilities).

The mobile device may be one that is used in a system that is configured for continuously routing all forms of pushed information from a host system to the mobile device. One example of such a system will now be described.

Referring now to the drawings, FIG. 3 is an example system diagram showing the redirection of user data items (such as message A or C) from a corporate enterprise computer system (host system) 250 to the user's mobile device 100 via a wireless router 26. The wireless router 26 provides the wireless connectivity functionality as it acts to both abstract most of the wireless network's 200 complexities, and it also implements features necessary to support pushing data to the mobile device 100. Although not shown, a plurality of mobile devices may access data from the host system 250. In this example, message A in FIG. 3 represents an internal message sent from, e.g. a desktop computer 262 within the host system 250 (see FIG. 11), to any number of server computers in the corporate network 260 (e.g. LAN), which may, in general, include a database server, a calendar server, an E-mail server or a voice-mail server.

Message C in FIG. 3 represents an external message from a sender that is not directly connected to the host system 250, such as the user's mobile device 100, some other user's mobile device (not shown), or any user connected to the public or private network 224 (e.g. the Internet). Message C could be e-mail, voice-mail, calendar information, database updates, web-page updates or could even represent a command message from the user's mobile device 100 to the host system 250. The host system 250 may comprise, along with the typical communication links, hardware and software associated with a corporate enterprise computer network system, one or more wireless mobility agents, a TCP/IP connection, a collection of data stores, (for example a data store for e-mail could be an off-the-shelf mail server like Microsoft Exchange® Server or Lotus Notes® Server), all within and behind a corporate firewall as will be explained further below.

The mobile device 100 may be adapted for communication within wireless network 200 via wireless links, as required by each wireless network 200 being used. As an illustrative example of the operation for a wireless router 26 shown in FIG. 3, consider a data item A, repackaged in outer envelope B (the packaged data item A now referred to as "data item (A)") and sent to the mobile device 100 from an Application Service Provider (ASP) in the host system 250. Within the ASP is a computer program, similar to a wireless mobility agent, running on any computer in the ASP's environment that is sending requested data items from a data store to a mobile device 100. The mobile-destined data item (A) is routed through the network 224, and through the wireless router's 26 firewall 27 protecting the wireless router 26 (see also FIG. 12).

Although the above describes the host system 250 as being used within a corporate enterprise network environment, this is just one embodiment of one type of host service that offers push-based messages for a handheld wireless device that is capable of notifying and preferably presenting the data to the user in real-time at the mobile device when data arrives at the host system.

By offering a wireless router 26 (sometimes referred to as a "relay"), there are a number of major advantages to both the host system 250 and the wireless network 200. The host system 250 in general runs a host service that is considered to be any computer program that is running on one or more computer systems. The host service is said to be running on a host system 250, and one host system 250 can support any number of host services. A host service may or may not be aware of the fact that information is being channelled to mobile devices 100. For example an e-mail or message program 138 (see FIG. 4) might be receiving and processing e-mail while an associated program (e.g. an e-mail wireless mobility agent) is also monitoring the mailbox for the user and forwarding or pushing the same e-mail to a wireless device 100. A host service might also be modified to prepared and exchange information with mobile devices 100 via the wireless router 26, like customer relationship management software. In a third example, there might be a common access to a range of host services. For example a mobility agent might offer a Wireless Access Protocol (WAP) connection to several databases.

Figure 4:
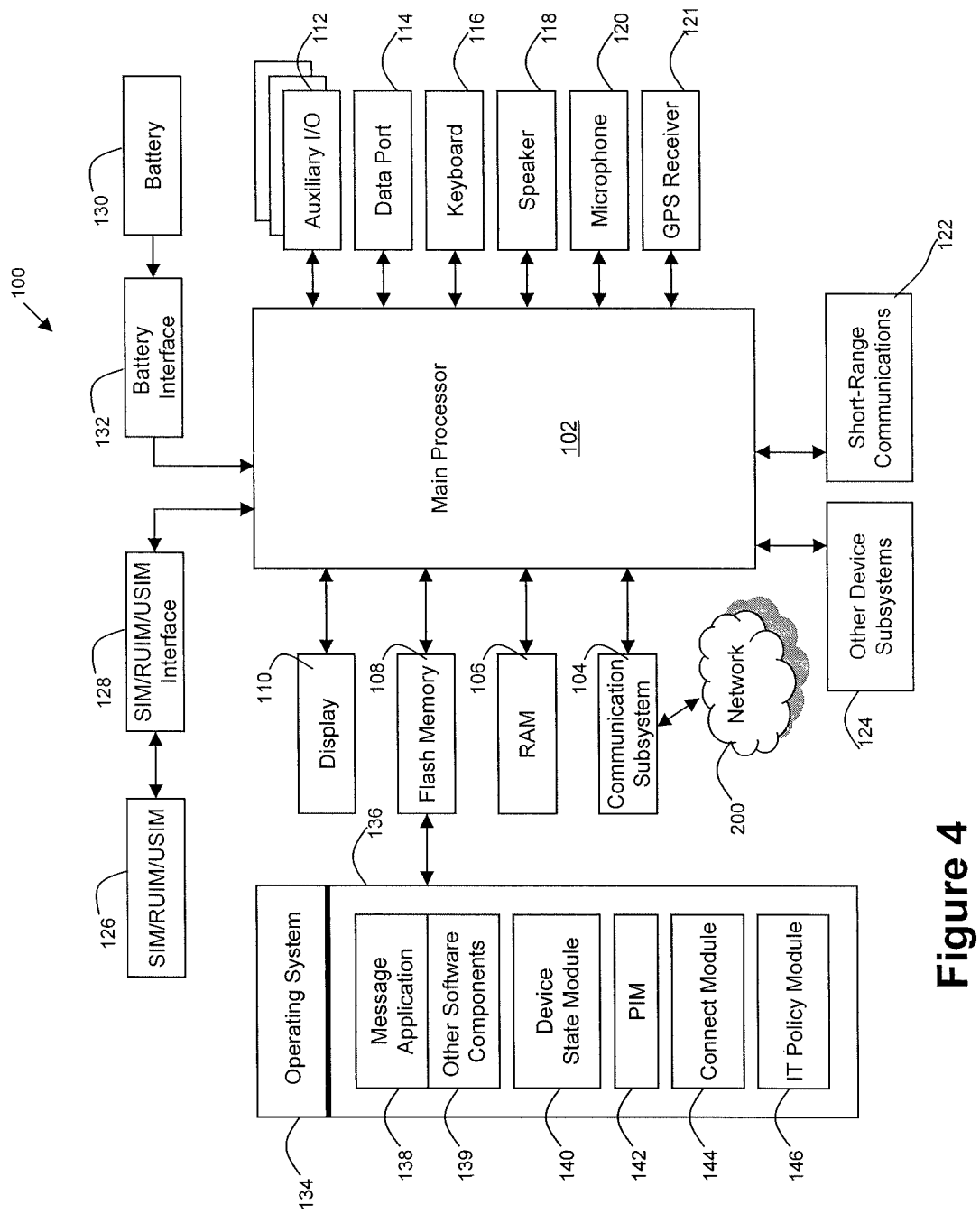
FIG. 4 is a block diagram of an example embodiment of a mobile device.
Figure 5:
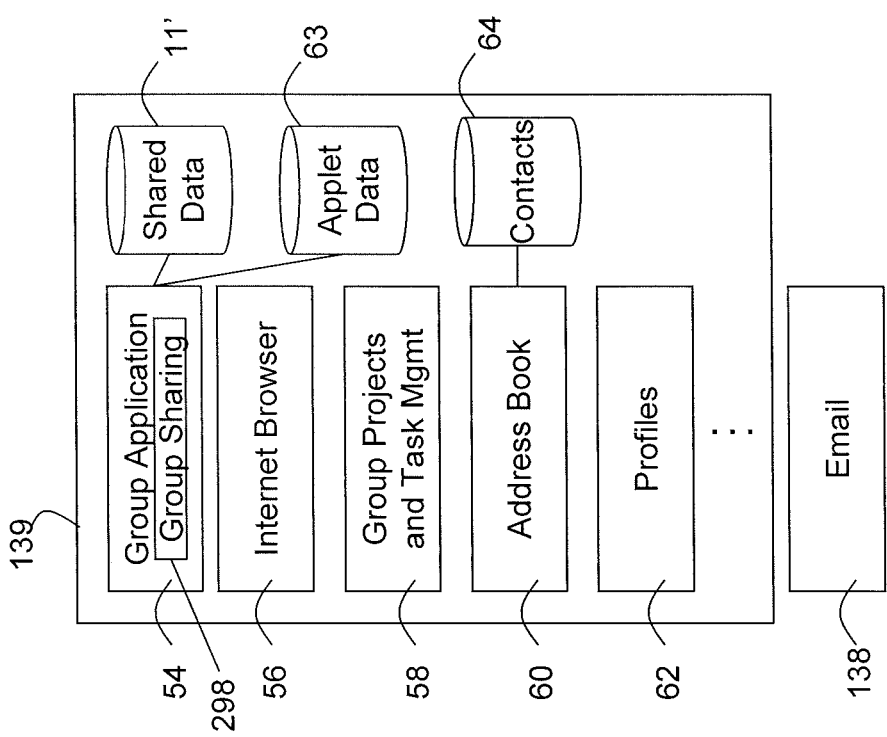
FIG. 5 is a block diagram illustrating example ones of the other software applications and components shown in FIG. 4.

As discussed above, a mobile device 100 may be a handheld two-way wireless computing device as exemplified in FIGS. 4 and 5, a wirelessly enabled palm-top computer, a mobile telephone with data messaging capabilities, a PDA with mobile phone capabilities, a wirelessly enabled laptop computer, a vending machine with an associated OEM radio modem, a wirelessly-enabled heart-monitoring system or, alternatively, it could be other types of mobile data communication devices capable of sending and receiving messages via a network connection. Although the system is exemplified as operating in a two-way communications mode, certain aspects of the system could be used in a "one and one-half" or acknowledgment paging environment, or even with a one-way paging system. In such limited data messaging environments, the wireless router 26 still could abstract the mobile device 100 and wireless network 200, offer push services to standard web-based server systems and allow a host service in a host system 250 to reach the mobile device 100 in many countries.

The host system 250 shown herein has many methods when establishing a communication link to the wireless router 26. For one skilled in the art of data communications the host system 250 could use connection protocols like TCP/IP, X.25, Frame Relay, ISDN, ATM or many other protocols to establish a point-to-point connection. Over this connection there are several tunnelling methods available to package and send the data, some of these include: HTTP/HTML, HTTP/XML, HTTP/Proprietary, FTP, SMTP or some other proprietary data exchange protocol. The type of host systems 250 that might employ the wireless router 26 to perform push could include: field service applications, e-mail services, stock quote services, banking services, stock trading services, field sales applications, advertising messages and many others. This wireless network 200 abstraction is made possible by the wireless router 26, which implements this routing and push functionality. The type of user-selected data items being exchanged by the host could include: E-mail messages, calendar events, meeting notifications, address entries, journal entries, personal alerts, alarms, warnings, stock quotes, news bulletins, bank account transactions, field service updates, stock trades, heart-monitoring information, vending machine stock levels, meter reading data, GPS data, etc., but could, alternatively, include any other type of message that is transmitted to the host system 250, or that the host system 250 acquires through the use of intelligent agents, such as data that is received after the host system 250 initiates a search of a database or a website or a bulletin board.

The wireless router 26 provides a range of services to make creating a push-based host service possible. These networks may comprise: (1) the Code Division Multiple Access (CDMA) network, (2) the Groupe Special Mobile or the Global System for Mobile Communications (GSM) and the General Packet Radio Service (GPRS), and (3) the existing and upcoming third-generation (3G) and fourth generation (4G) networks like EDGE, UMTS and HSDPA, LTE, Wi-Max etc. Some older examples of data-centric networks include, but are not limited to: (1) the Mobitex Radio Network ("Mobitex") and (2) the DataTAC Radio Network ("DataTAC").

To be effective in providing push services for host systems 250, the wireless router 26 may implement a set of defined functions. It can be appreciated that one could select many different hardware configurations for the wireless router 26, however, many of the same or similar set of features would likely be present in the different configurations.

To aid the reader in understanding the structure of the mobile device 100 and how it communicates with the wireless network 200, reference will now be made to FIGS. 4 and 5.

Referring first to FIG. 4, shown therein is a block diagram of an example embodiment of a mobile device 100. The mobile device 100 comprises a number of components such as a main processor 102 that controls the overall operation of the mobile device 100. Communication functions, including data and voice communications, are performed through a communication subsystem 104. The communication subsystem 104 receives messages from and sends messages to a wireless network 200. In this example embodiment of the mobile device 100, the communication subsystem 104 is configured in accordance with the Global System for Mobile Communication (GSM) and General Packet Radio Services (GPRS) standards, which is used worldwide. Other communication configurations that are equally applicable are the 3G and 4G networks such as EDGE, UMTS and HSDPA, LTE, Wi-Max etc. New standards are still being defined, but it is believed that they will have similarities to the network behaviour described herein, and it will also be understood by persons skilled in the art that the embodiments described herein are intended to use any other suitable standards that are developed in the future. The wireless link connecting the communication subsystem 104 with the wireless network 200 represents one or more different Radio Frequency (RF) channels, operating according to defined protocols specified for GSM/GPRS communications.

The main processor 102 also interacts with additional subsystems such as a Random Access Memory (RAM) 106, a flash memory 108, a display 110, an auxiliary input/output (I/O) subsystem 112, a data port 114, a keyboard 116, a speaker 118, a microphone 120, a GPS receiver 121, short-range communications 122, and other device subsystems 124.

Some of the subsystems of the mobile device 100 perform communication-related functions, whereas other subsystems may provide "resident" or on-device functions. By way of example, the display 110 and the keyboard 116 may be used for both communication-related functions, such as entering a text message for transmission over the network 200, and device-resident functions such as a calculator or task list.

The mobile device 100 can send and receive communication signals over the wireless network 200 after required network registration or activation procedures have been completed. Network access is associated with a subscriber or user of the mobile device 100. To identify a subscriber, the mobile device 100 may use a subscriber module component or "smart card" 126, such as a Subscriber Identity Module (SIM), a Removable User Identity Module (RUIM) and a Universal Subscriber Identity Module (USIM). In the example shown, a SIM/RUIM/USIM 126 is to be inserted into a SIM/RUIM/USIM interface 128 in order to communicate with a network. Without the component 126, the mobile device 100 is not fully operational for communication with the wireless network 200. Once the SIM/RUIM/USIM 126 is inserted into the SIM/RUIM/USIM interface 128, it is coupled to the main processor 102.

The mobile device 100 is a battery-powered device and includes a battery interface 132 for receiving one or more rechargeable batteries 130. In at least some embodiments, the battery 130 can be a smart battery with an embedded microprocessor. The battery interface 132 is coupled to a regulator (not shown), which assists the battery 130 in providing power V+ to the mobile device 100. Although current technology makes use of a battery, future technologies such as micro fuel cells may provide the power to the mobile device 100.

The mobile device 100 also includes an operating system 134 and software components 136 to 146 which are described in more detail below. The operating system 134 and the software components 136 to 146 that are executed by the main processor 102 are typically stored in a persistent store such as the flash memory 108, which may alternatively be a read-only memory (ROM) or similar storage element (not shown). Those skilled in the art will appreciate that portions of the operating system 134 and the software components 136 to 146, such as specific device applications, or parts thereof, may be temporarily loaded into a volatile store such as the RAM 106. Other software components can also be included, as is well known to those skilled in the art.

The subset of software applications 136 that control basic device operations, including data and voice communication applications, may be installed on the mobile device 100 during its manufacture. Software applications may include a message application 138, a device state module 140, a Personal Information Manager (PIM) 142, a connect module 144 and an IT policy module 146. A message application 138 can be any suitable software program that allows a user of the mobile device 100 to send and receive electronic messages, wherein messages are typically stored in the flash memory 108 of the mobile device 100. A device state module 140 provides persistence, i.e. the device state module 140 ensures that important device data is stored in persistent memory, such as the flash memory 108, so that the data is not lost when the mobile device 100 is turned off or loses power. A PIM 142 includes functionality for organizing and managing data items of interest to the user, such as, but not limited to, e-mail, text messages, instant messages, contacts, calendar events, and voice mails, and may interact with the wireless network 200. A connect module 144 implements the communication protocols that are required for the mobile device 100 to communicate with the wireless infrastructure and any host system 250, such as an enterprise system, that the mobile device 100 is authorized to interface with. An IT policy module 146 receives IT policy data that encodes the IT policy, and may be responsible for organizing and securing rules such as the "Set Maximum Password Attempts" IT policy.

Other types of software applications or components 139 can also be installed on the mobile device 100. These software applications 139 can be pre-installed applications (i.e. other than message application 138) or third party applications, which are added after the manufacture of the mobile device 100. Examples of third party applications include games, calculators, utilities, etc.

The additional applications 139 can be loaded onto the mobile device 100 through at least one of the wireless network 200, the auxiliary I/O subsystem 112, the data port 114, the short-range communications subsystem 122, or any other suitable device subsystem 124.

The data port 114 can be any suitable port that enables data communication between the mobile device 100 and another computing device. The data port 114 can be a serial or a parallel port. In some instances, the data port 114 can be a USB port that includes data lines for data transfer and a supply line that can provide a charging current to charge the battery 130 of the mobile device 100.

For voice communications, received signals are output to the speaker 118, and signals for transmission are generated by the microphone 120. Although voice or audio signal output is accomplished primarily through the speaker 118, the display 110 can also be used to provide additional information such as the identity of a calling party, duration of a voice call, or other voice call related information.

For composing data items, such as e-mail messages, for example, a user or subscriber could use a touch-sensitive overlay as part of a touch screen display (not shown), in addition to possibly the auxiliary I/O subsystem 122. The auxiliary I/O subsystem 112 may include devices such as: a mouse, track ball, infrared fingerprint detector, or a roller wheel with dynamic button pressing capability. A composed item may be transmitted over the wireless network 200 through the communication subsystem 104.

FIG. 5 shows an example of the other software applications and components 139 that may be stored on and used with the mobile device 100. Only examples are shown in FIG. 5 and such examples are not to be considered exhaustive. In this example, the group application 54, internet browser 56, group projects and task management (mgmt) 58, address book 60 and a profiles application 62 are shown to illustrate the various features that may be provided by the mobile device 100. Also shown in FIG. 5 is the message application 138, which in the following will be referred to as an email application 138 for clarity. It will be appreciated that the various applications may operate independently or may utilize features of other applications. For example, the phone application 62 and email application 138 may use the address book 60 for contact details obtained from a list of contacts 64. Group application 54 manages a mobile device user's groups and the applets therefor using a group sharing module 298. Data for the graphical user interfaces (GUIs) of the group application 54 and the associated applets may be stored in a group application and applet database 63. It can be appreciated that a user may belong to multiple groups, as well as any number of subgroups for sharing private information with certain one or more other group members as discussed above. Group application 54 also comprises or otherwise has access to its current, local version of the shared data 11'. In the following examples, the suffix (') is used to indicate that the specific local version of the shared data 11' may not necessarily be completely up to date when compared to the conceptual set of shared data 11 to be maintained by the wider group 10, due to out of coverage and other situations. The shared data 11' may comprise data pertaining to one or multiple groups and thus multiple sets of shared data 11' may exist and may be included in one or more separate databases.

The group projects and task mgmt application 58 enables the user to create a new project or participate in a project created by another in the group 10. Each project comprises one or more tasks as noted above, which can be assigned to different users in the group 10 and the management of these tasks controlled through the group projects and task mgmt application 58 as will be explained in greater detail below.

Figure 6:
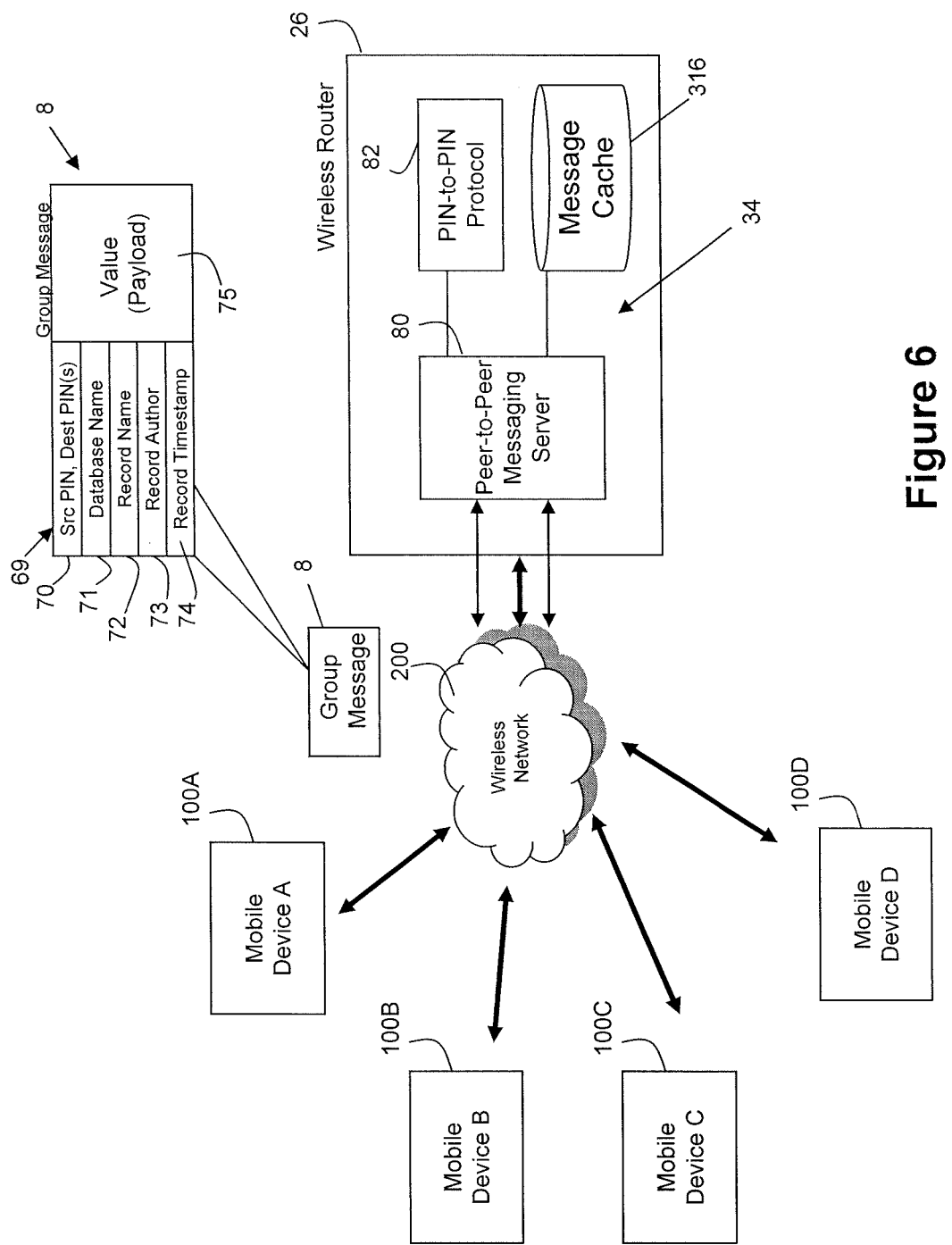
FIG. 6 is a system diagram illustrating an example configuration for peer-to-peer (P2P) messaging between a group of mobile devices.

Turning now to FIG. 6, a configuration suitable for users of mobile device A, B, C, and D; hereafter referred to as mobile devices 100a, 100b, 100c, and 100d to exchange group messages 8 through a message exchange service already being used by such devices, in this example through the wireless router 26. It can be seen in FIG. 6 the wireless router 26 in this example hosts a peer-to-peer messaging server 80, which utilizes a PIN-to-PIN protocol 82 and a message cache 316, all of which can be considered components of a peer-to-peer messaging component. In the embodiment illustrated in FIG. 6, personal identification numbers (PINs) are used to address the group messages 8. Such a PIN-based messaging system is implemented using a server-based communication infrastructure, such as one that provides email, SMS, voice, Internet and other communications. Particularly suitable for hosting a peer-to-peer messaging server 80, is the wireless router 26 used in systems such as those shown in FIG. 3. In FIG. 6, the wireless router 26 also facilitates communications such as instant messaging between mobile devices 100a, 100b, 100c and 100d. It will be appreciated that the number of users participating in the example shown in FIG. 6 is for illustrative purposes only. The sharing of group data 11 is provided by the group application 54 stored on each mobile device 100a-100d, which can be initiated by selecting an appropriate icon from the display screen (not shown). The wireless router 26 routes group messages 8 between the mobile devices 100a-100d according to the PIN-to-PIN protocol 82.

A PIN-to-PIN based group message is generally denoted by numeral 8 in FIG. 6, and illustrates an example of a complete structure for the group messages 8 shown in FIG. 1. It will be appreciated that a similar structure can be used for private messages 8a. In a PIN-based messaging protocol 82, each message 8 has associated therewith a PIN corresponding to the mobile device 100 which has sent the message 8 (source) and includes a destination PIN identifying each intended recipient (destination(s)). Further detail of an example structure for the group messages 8 is also shown in FIG. 6. Each group message 8 generally comprises a body 75, which contains the value 94 for the record 92 being updated (payload), and a header 69, which contains various fields used for transmitting and processing each group message 8. In this example, the header 69 includes a source (src) and destination (dest) field 70 comprising the PIN for the sender and PIN(s) for the recipient(s), a database name field 71 to specify the database 90 into which the record 92 is to be inserted, a record name field 72 to specify the name of the record 92 which is being created or updated, a record author field 73 to identify the author or "owner" of the change or addition being made, and a record timestamp field 74 to indicate the time (and if desired, the date) at which the record 92 being sent was added, updated, changed, modified, etc. It may be noted that the record author field 73 can be used to establish who made what changes and additions to the shared data 11 such that if a new member joins the group 10, the responsibility for sending records 92 to the new member can be split amongst all the of group members according to author (exemplified later, see also FIGS. 24 and 25).

In general, in a PIN based messaging protocol 82, the sender of the group message 8 knows the PIN of the intended recipient(s) and there are various mechanisms that can be employed to determine PIN messages for other members, e.g. through the host system 250, via email exchange, etc. According to the configuration shown in FIG. 6, mobile device 100a can communicate directly with any of the mobile devices 100b-100d either individually or collectively, through the peer-to-peer messaging server 80. When conducting a PIN-to-PIN exchange according to the embodiment shown in FIG. 6, the mobile devices 100a-100d can communicate directly with the wireless router 26 in a client based exchange where, similar to other peer-to-peer programs, an intermediate server is not required. A group message 8 sent by one mobile device 100 is received by the wireless router 26, which obtains the PIN number for the intended recipient(s) from information associated with the group message 8 (e.g. a data log) or from the group message 8 itself. Upon obtaining the recipients' PINs according to the PIN-to-PIN protocol 82, the wireless router 26 then routes the group message 8 to all intended recipients associated having such PINs. The wireless router 26 typically also provides a delivery confirmation to the original sender, which may or may not be displayed to the user, and the mobile device 100 can use an exchange of messages pertaining to in and out of coverage situations to update presence information on the mobile device 100. The destination device can also provide such delivery information. The wireless router 26 should be capable of routing group messages 8 reliably and hold onto the group messages 8 until they are successfully delivered. Alternatively, if delivery cannot be made after a certain timeout period, the wireless router 26 may provide a response indicating a failed delivery. The wireless router 26 may choose to expire a group message 8 if a certain waiting period lapses. In such cases, the mobile device 100 may then choose whether or not to resend the group message 8.

It will be appreciated that the principles discussed below are equally applicable to both PIN-to-PIN messaging and other Internet service-based instant messaging systems hosted by $3^{rd}$ parties.

Figure 7:
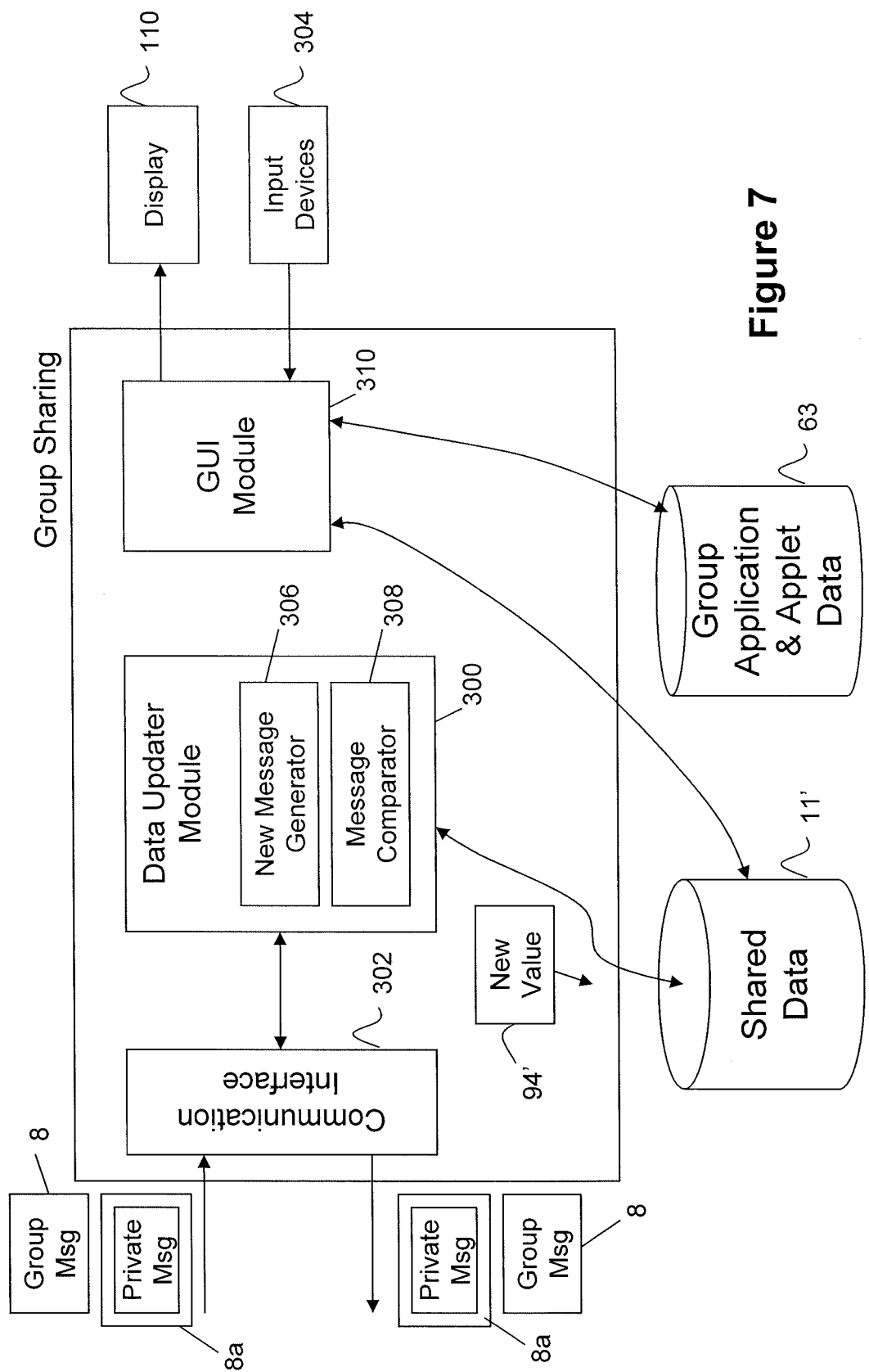
FIG. 7 is an example block diagram of the group sharing application shown in FIG. 5.

One example configuration for the group sharing module 298 is shown in FIG. 7. The group sharing module 298 comprises or otherwise has access to the mobile device's locally stored copy of the shared data 11', and comprises or otherwise has access to the mobile device's group application and applet database 63. As noted above, the group application and applet database 63 comprises any information, settings, or other data that is relevant to the way in which the records 92 are used in the corresponding applet provided by the group application 54. It can be appreciated that the applet database 63 is shown as a separate database for illustrative purposes only and may instead be maintained within the shared data 11' or elsewhere. The group sharing module 298 comprises a data updater module 300 for receiving or obtaining new group messages 8 and new private messages 8a (if applicable), examining the new messages 8, 8a for collisions with other recent updates, and updating the shared data 11' by replacing the currently stored record 92 with a new record 92' when appropriate. The data updater module 300 in this example also enables the mobile device 100 on which it resides to generate its own group messages 8 and private messages 8a (if applicable)

when updates are made locally. The data updater module 300 may send, receive or otherwise obtain or provide messages 8, 8a using a communication interface 302, which in this example is configured to access and utilize the communication subsystem 104.

The data updater module 300 comprises a new message generator 306, which is a sub-routine, sub-module, or feature for generating new messages 8, 8a; and comprises a message comparator 308, which is a subroutine, sub-module, or feature for processing incoming messages 8, 8a and resolving collisions between locally generated updates and recently received updates generated by other members of the group. The data updater module 300 in this example runs in the background to maintain the most up-to-date copy of the shared data 11' and to resolve collisions between record 92 updates as they arise. The message generator 306 may also be used to generate in and out of coverage messages and process acknowledgements from other members to determine delivery success. The group sharing module 298 comprises a graphical user interface (GUI) module 310 for displaying various ones of the applets available through the group application 54 using the group application and applet data 63 and by populating such applets using the shared data 11'. The GUI module 310 enables a user to select a desired one of the applets, which then instructs the processor 102 to initiate and display a GUI for that particular applet, in part by communicating with the display 110. Various ones of the input devices described above (e.g. trackball 14a, 14b, keyboard 12, touchscreen 28, etc.) can be used to view, edit, update and otherwise interact with the group application applets and thus the shared data 11', and may hereinafter be commonly denoted by reference numeral 304.

The group sharing module 298 may therefore be used by the group application 54 to initiate and display applet GUIs, to process and handle incoming and outgoing messages 8, 8a, and to handle incoming and outgoing in and out of coverage messages (to be explained below). Several example scenarios for handling the exchange of group messages 8 and private messages 8a are shown in FIGS. 8 to 10.

FIG. 8 illustrates a single update for the entire group 10 shown in FIG. 1(*a*). In the following examples, each member A, B, C, D is associated with a respective mobile device 100a, 100b, 100c, and 100d. In the scenario shown in Figure, mobile device 100a processes a locally generated update, e.g. adding an appointment to a group calendar, by generating a common group message 8 using the new message generator 306. The group message 8 identifies either a group number or in this example, the PIN number for each other member in the group (members B, C, and D in this example) and sends the group message 8 to the other mobile devices 100b, 100c, and 100d via the message exchange service which in this example is provided by the peer-to-peer server 80. The peer-to-peer server 80 is able to then send copies of message 8 to each of members B, C, and D as it would normally do for other PIN-to-PIN type messages, i.e. provides a multicast to the group 10. At this point in time, the update made to the shared data 11' at mobile device 100a is repeated at each of the other members since each mobile device 100b, 100c, 100d comprises a data updater module 300 having a message comparator 308 to process the new incoming message 8 and to update their local copy of the shared data 11' by writing a new record 92' thereto.

Figure 9B:
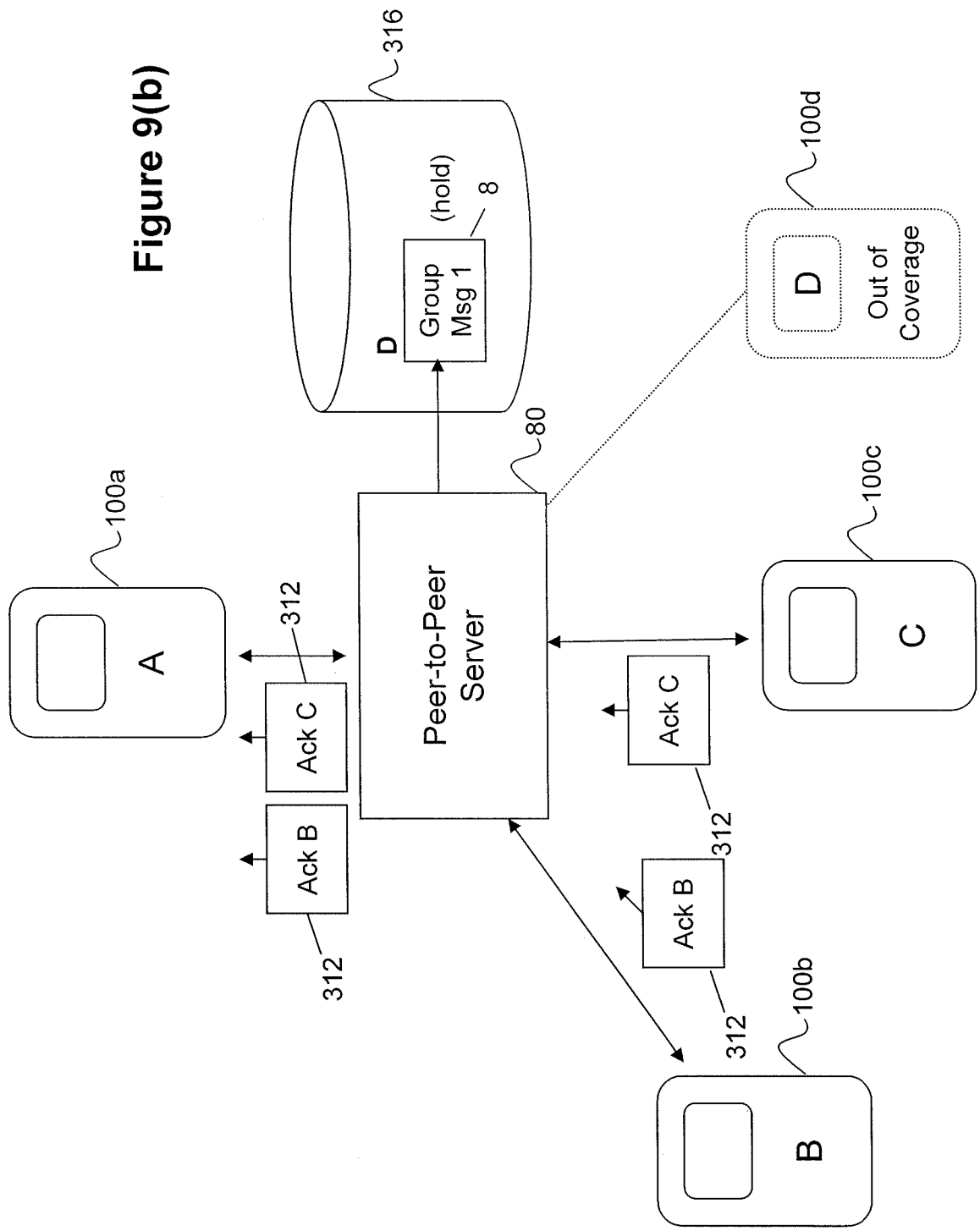
Figure 9C:
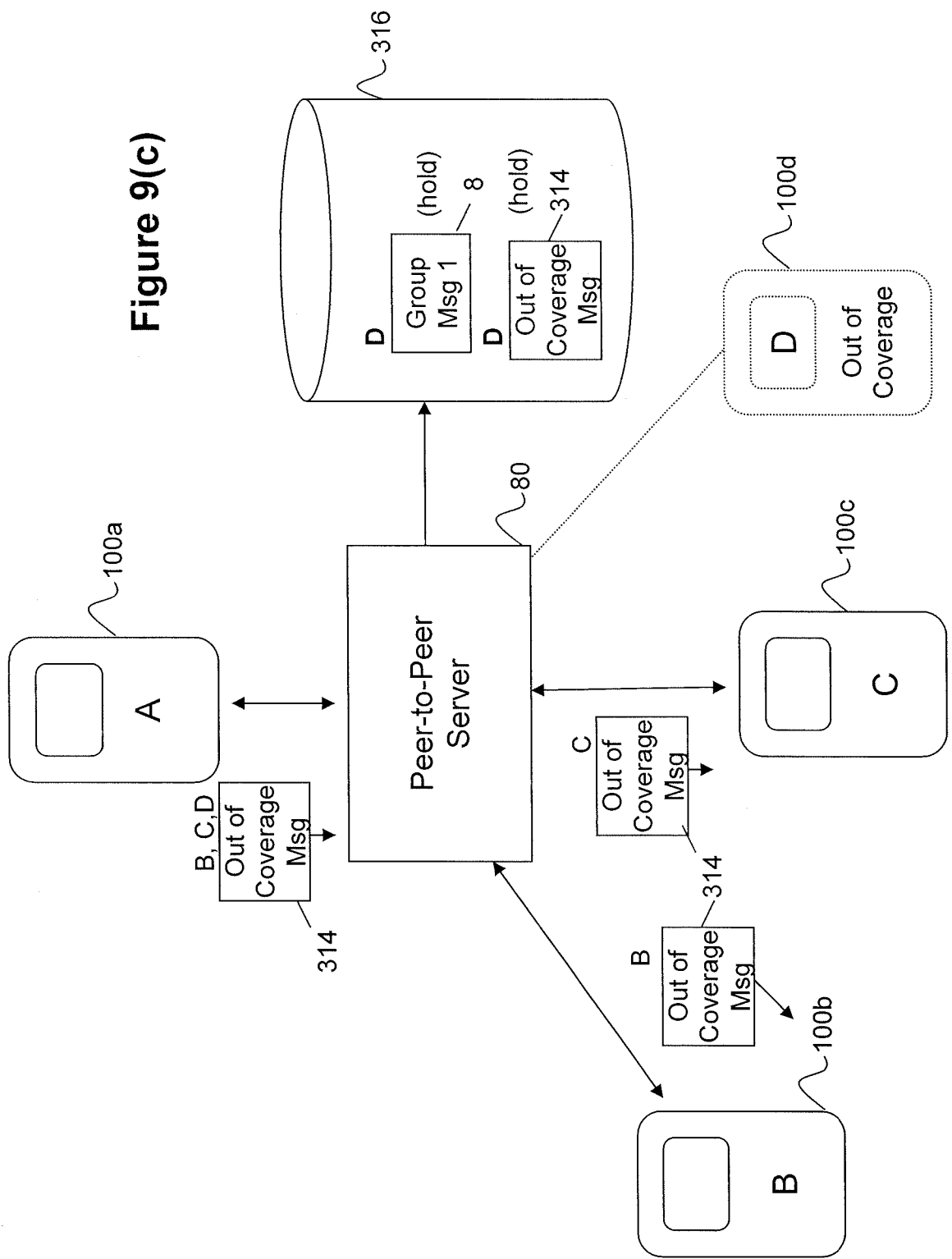
Figure 10A:
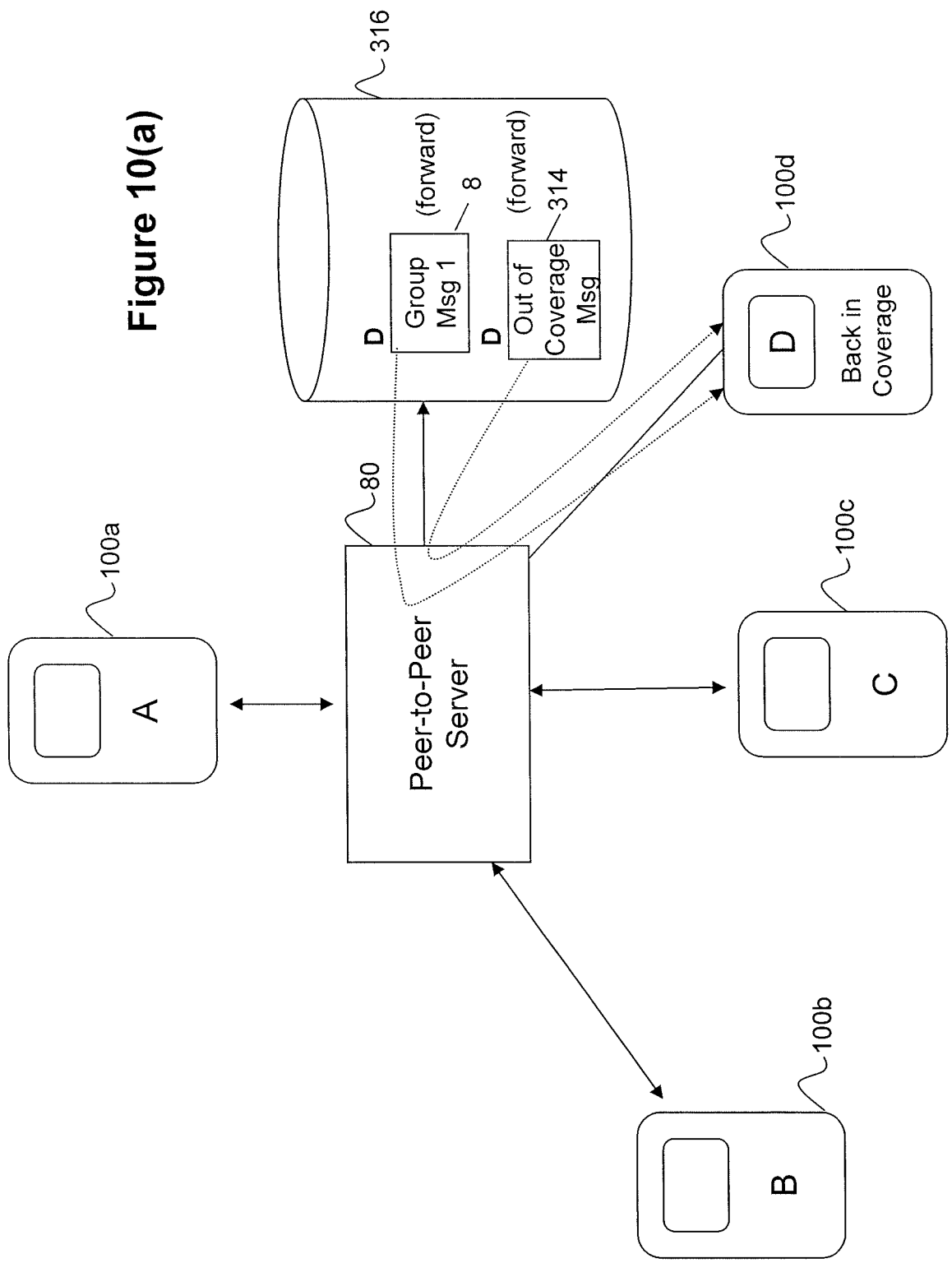
Figure 10C:
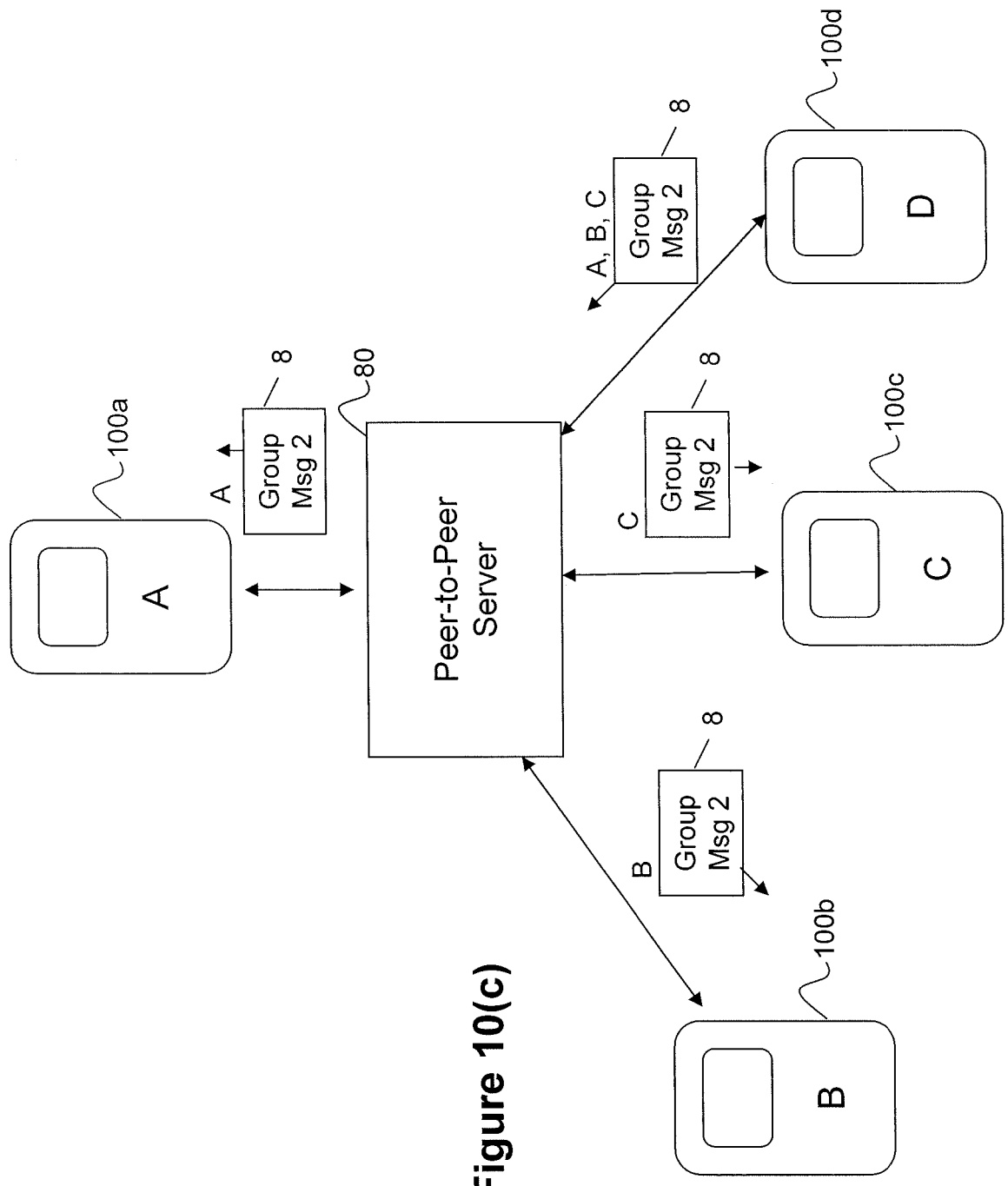

FIGS. 9(*a*) to 9(*c*) illustrate another scenario, which deals with an out-of-coverage situation for one of the members, and also illustrates the use of acknowledgement (Ack) messages 312 to broadcast out-of-coverage update messages 314 to other members of the group 10 without requiring the peer-to-peer server 80 to necessarily track or be responsible for such information. In the scenario illustrated in FIG. 9(*a*), group member A again generates an update to the shared data 11a' and sends Group Msg 1 to the group 10, i.e. by addressing the message 8 to members B, C, and D. The peer-to-peer server 80 determines which of the mobile devices 100 for the intended recipients are in coverage. In this example, the peer-to-peer server 80 determines that members B and C are in coverage but that group member D, i.e. mobile device 100d is out-of-coverage as indicated in FIG. 9(*a*) by the dashed lines. In this case, Group Msg 1 can be sent to both mobile device 100b and mobile device 100c but, since mobile device 100d is out-of-coverage, the peer-to-peer server 80 stores or "holds" a copy of Group Msg 1 for member D in message cache 316. As will be shown in FIG. 10, upon mobile device 100d coming back into coverage, the peer-to-peer server 80 is then able to forward the stored message 8 to mobile device 100d. In other words, the existence of the peer-to-peer server 80, which in this example already exists for communications between mobile devices 100 via the wireless network 200, can be taken advantage of to "store-and-forward" the group messages 8 to enable the group 10 to tolerate out-of-coverage situations such as that shown in FIG. 9.

In some embodiments, the peer-to-peer server 80 and mobile devices 100 are configured to require Ack messages 312 upon successful delivery of the group messages 8. In the example shown in FIG. 9(*b*), the peer-to-peer server 80 would relay Ack messages 312 generated and sent by member B and member C, wherein the absence of an Ack message from member D would provide an indication to mobile device 100a that mobile device 100d is out-of-coverage. In this case, as shown in FIG. 9(*c*), an out of coverage message 314 can be generated and sent back to mobile device 100b, mobile device 100c, and mobile device 100d, wherein if mobile device 100d is still out of coverage as shown in FIG. 9(*c*), the peer-to-peer server 80 holds the out of coverage message 314 for mobile device 100d until they come back into coverage. The out of coverage information can be used by the mobile devices 100 to track presence, e.g., to update the UI to show that member D is not in coverage and thus will not receive a message, e.g. in a messaging conversation.

Turning now to FIG. 10(*a*), at this time, the peer-to-peer server 80 has determined that mobile device 100d is back in coverage and thus is able to forward Group Msg 1 and the out of coverage message 314 being held in the message cache 316 to mobile device 100d. In this example, upon detecting receipt of the Out of Coverage message 314, the mobile device 100d determines that some other user had at some point determined that they were out of coverage. Mobile device 100d may then generate and send a back in coverage message 315 addressed to the other members of the group 10, which would be relayed to the respective mobile devices 100 as shown in FIG. 10(*b*). In this way, mobile device 100d is able to notify the group that 10 that they are back in coverage, e.g. for updating presence identifiers, etc. Mobile device 100d would then process and update the shared data 11' and GUIs taking into account the new messages. FIG. 10(*c*) illustrates a further update generated by mobile device 100d and sent as Group Msg 2, which is possible now that mobile device 100d is back in coverage. When out of coverage situations arise, the chance of a collision occurring may rise since there is a higher likelihood that group messages 8 are sent but not delivered to the mobile device 100 while it is out of coverage. If a collision occurs, the mobile device 100 can utilize a collision resolution scheme, to be described below, to overwrite the corresponding record 92 with a preferred one of the updates, determined according to certain criteria.

Figure 11A:
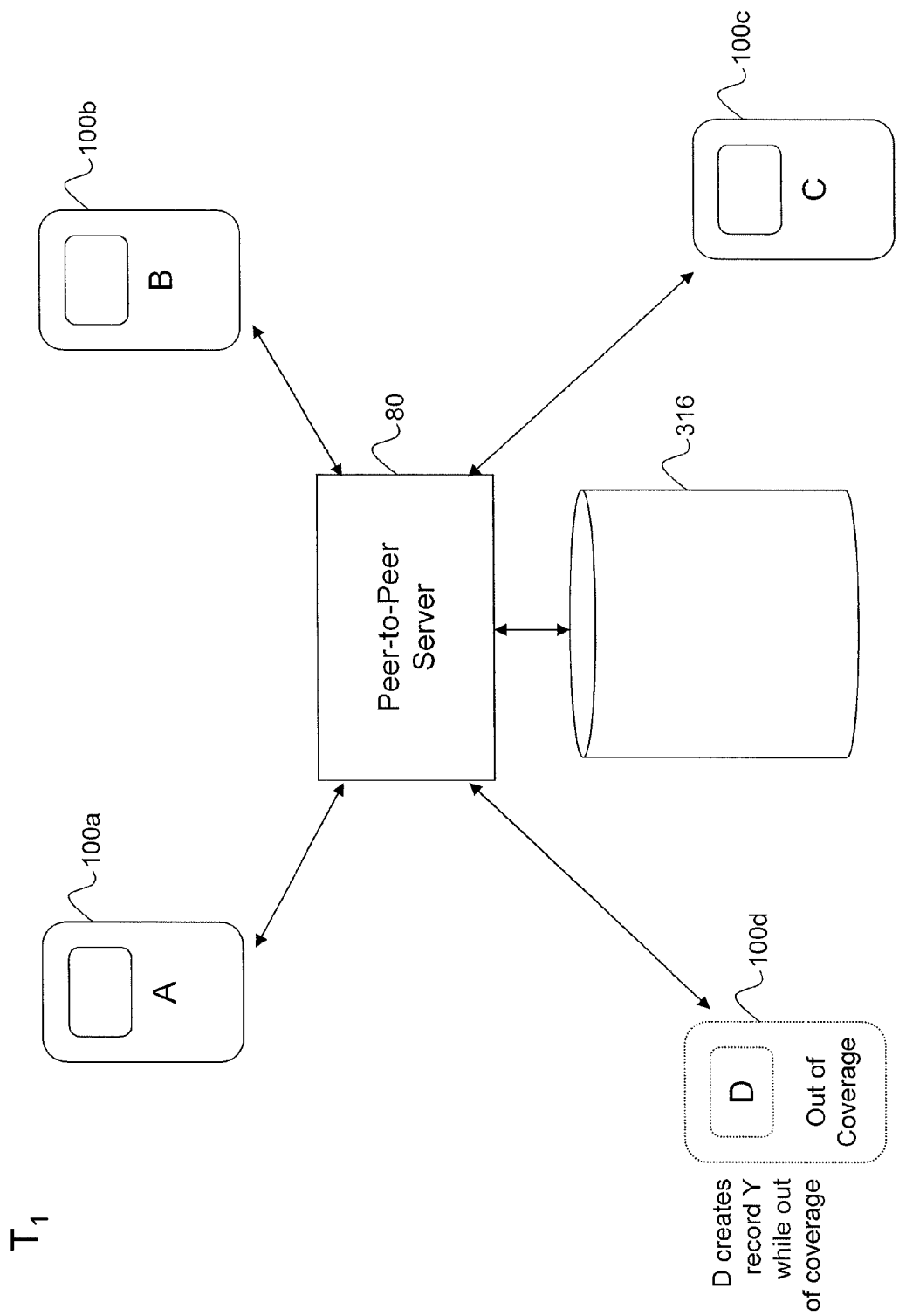
FIGS. 11(a) to 11(f) are a series of flow diagrams illustrating an example collision resolution scenario for updates to the same record in the shared data.
Figure 11B:
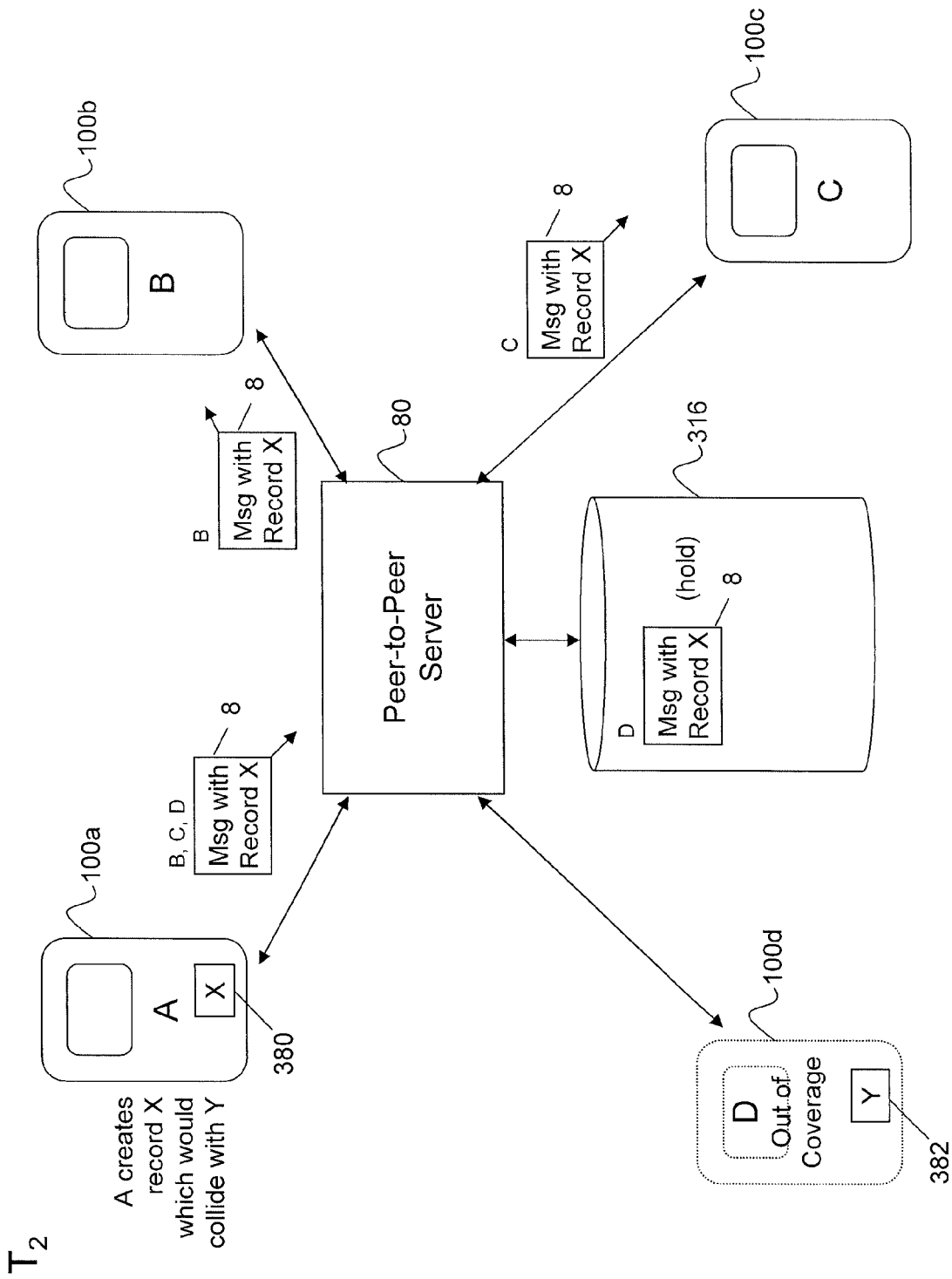

FIGS. 11(a) to 11(f) illustrate an example of a collision resolution. Turning first to FIG. 11(a), in this scenario at $T_1$, while mobile device 100d is out of coverage, member D generates or modifies a record Y 382, which may comprise generation of a new record Y or modification of a new record Y. However, this change cannot be distributed to the rest of the group 10 at this time due to mobile device 100d being out of coverage. In FIG. 11(b), at $T_2$, member A makes a modification X 380 to their local copy of the shared data 11', which may comprise generation of a new record X or modification of a new record X and which would collide with modification Y 382. For example, wherein modification X is an appointment at 9:00 am on May $4^{th}$ set by member A, and modification Y comprises a different appointment at the same time. A group message 8 comprising the modification X 380 is then sent to the peer-to-peer server 80 and the group message 8 is relayed to member B and member C but held for member D since in this case mobile device 100d is determined to be out of coverage. In FIG. 11(b), members A, B, and C have modification X 380 residing on their respective mobile devices 100, e.g. in the shared data 11', while member D has modification Y 382.

Figure 11C:
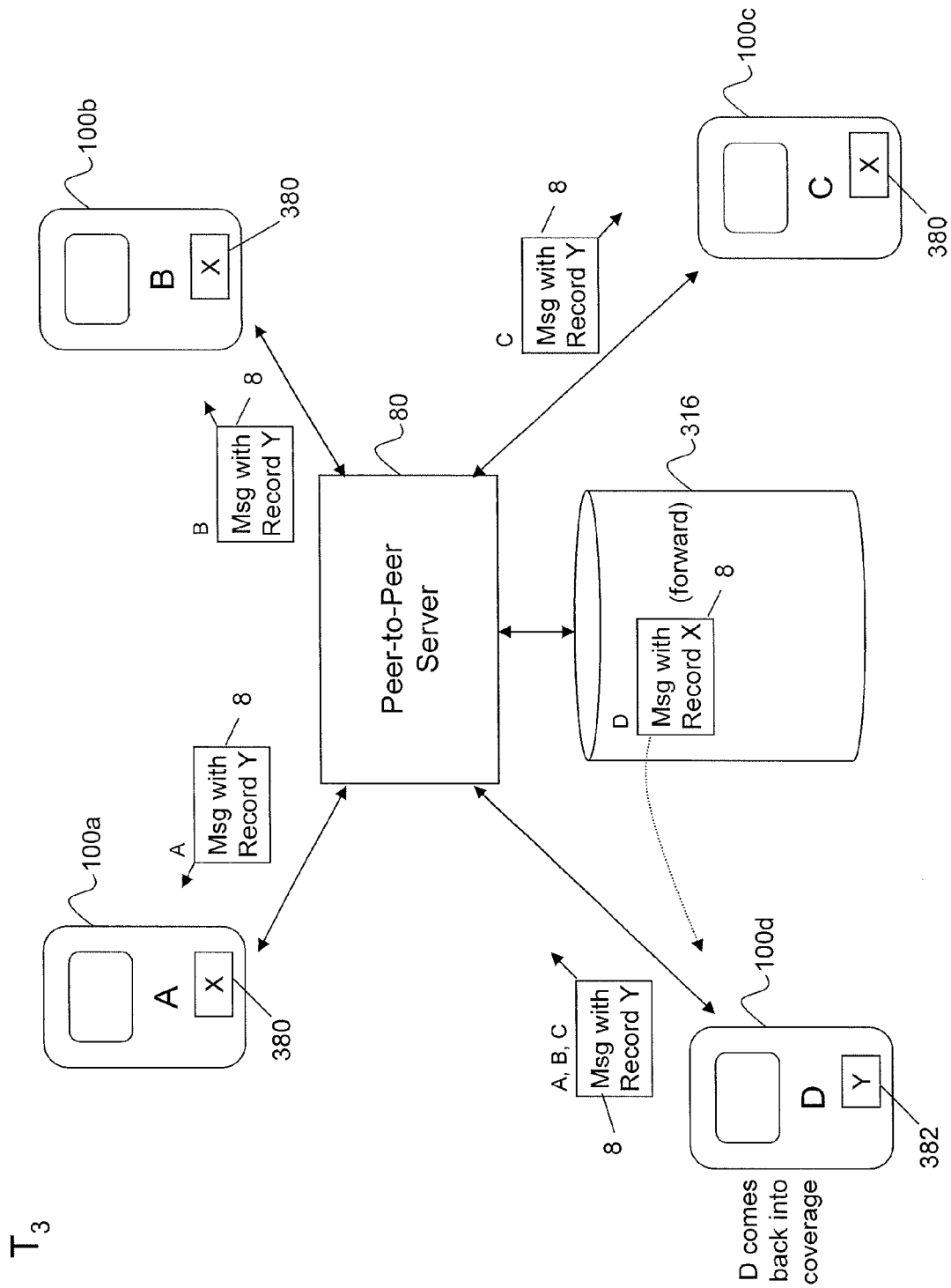
Figure 11D:
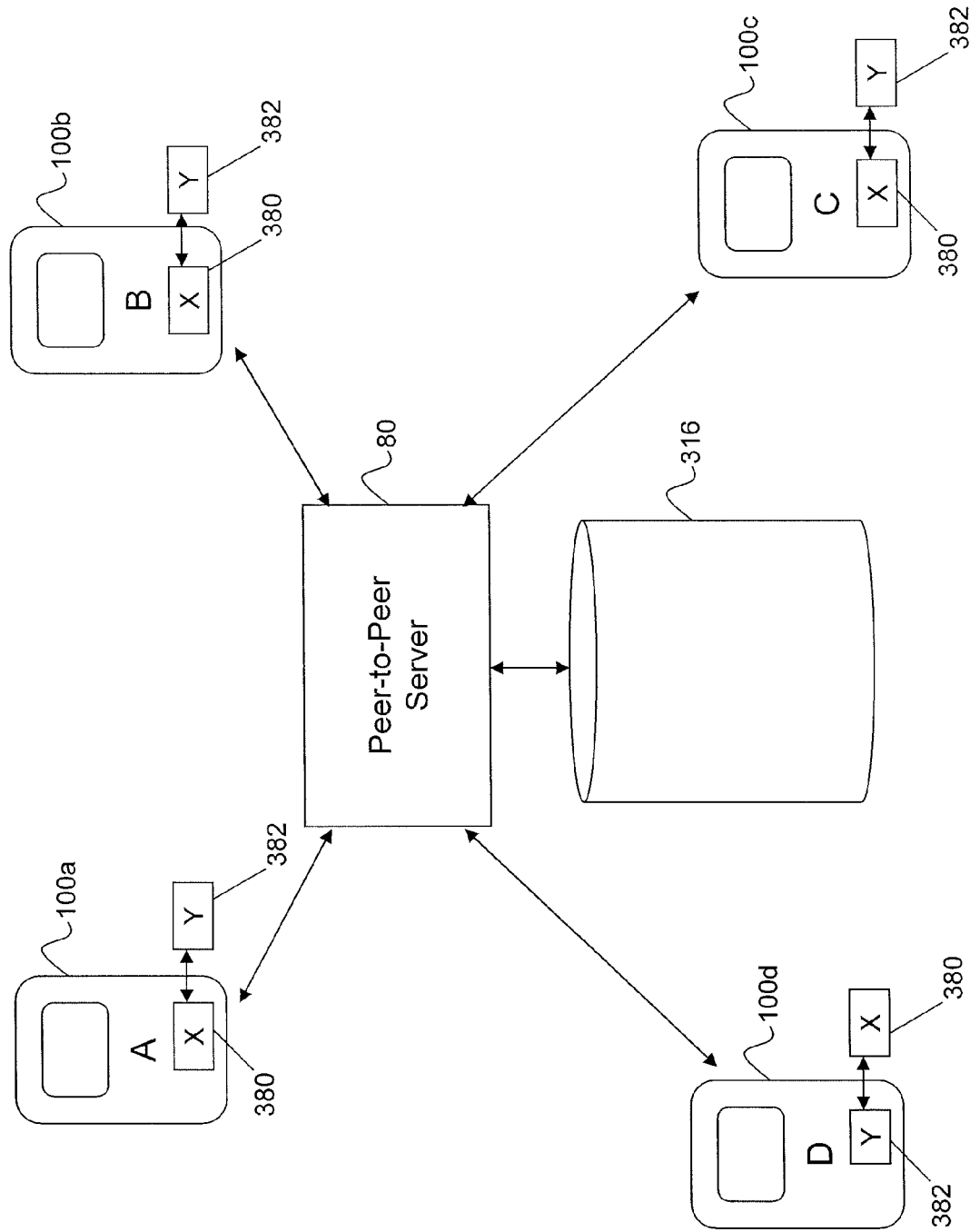
Figure 11E:
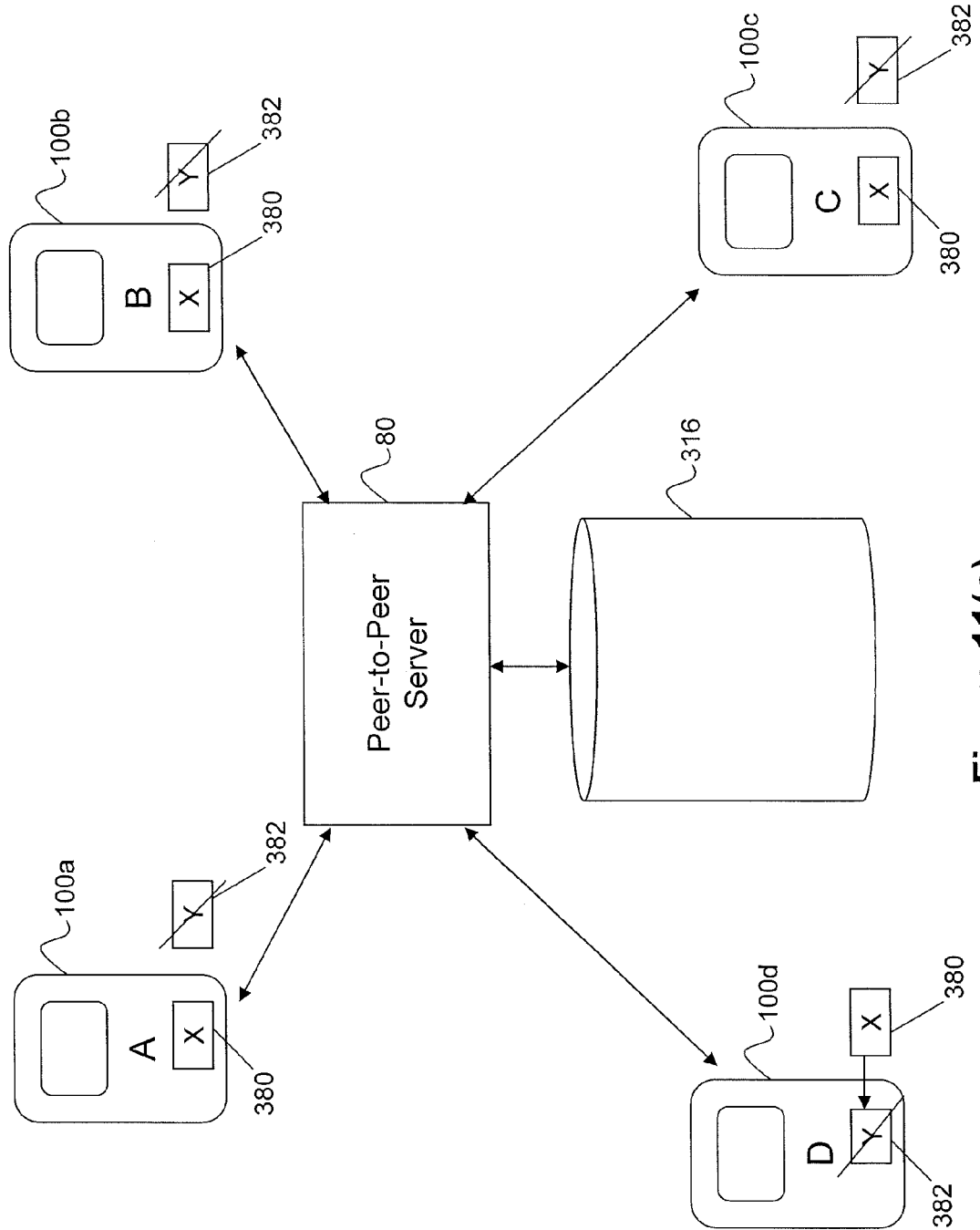
Figure 11F:
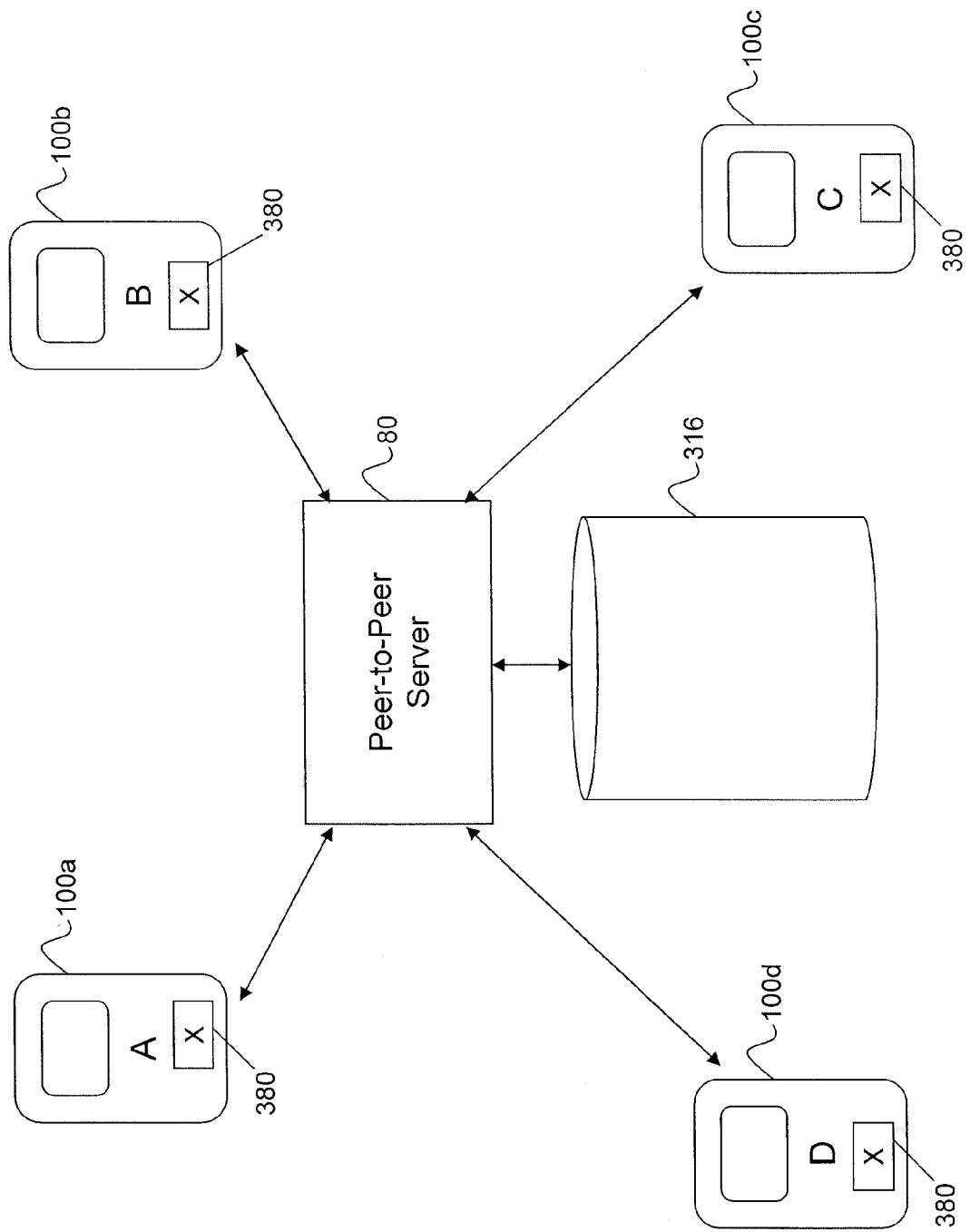

Turning now to FIG. 11(c), at $T_3$ when mobile device 100d comes back into coverage, they will both receive the group message 8 with modification X 380 being held in the message cache 316, and send a group message 8 with modification Y 382 to members A, B, and C. As shown in FIG. 11(d), at $T_4$ each device has both modification X 380 and modification Y 382, which are in a collision. It can be seen that in this case, member D is currently holding modification Y 382 and resolving this with modification X 380 whereas the reverse is true for members A, B, and C. In this example, the collision is resolved, as shown in FIG. 11(e) at $T_5$, by discarding modification Y 382 and keeping modification X 380 at $T_6$ as shown in FIG. 11(f). There are many suitable collision resolution schemes that can be used. For the purpose of this illustration, the latest record timestamp 74 is kept while the other is discarded. Since mobile device 100d actually made modification Y earlier than modification X, which was distributed first, the change made by member D is superseded by that modification made by member A. It can be appreciated that choosing the latest timestamp is only one example and, as will be shown below, others may exist.

It may be noted that the time sequence shown in FIG. 11 assumes for clarity that all mobile devices 100 in the group 10 have substantially identical or otherwise reasonably synchronized clocks. In some embodiments, this may be difficult to maintain, however, in many cases, the data updater module 300 can be tolerant of minor discrepancies in the clocks. However, some of the shared data 11' could become out of sync due to time skews and thus measures can be taken to alleviate this. For example, the new message generator 306 could be programmed to look at the record timestamp 74 for the most recently received group message 8 and, to ensure that their update will have a later timestamp 74, add an increment of time to that indicated in the most recently received group message 8, in particular if such message 8 has a later timestamp 74 than the current clock on the mobile device 100. In this way, even if one of the members has a significant time skew, once he or she sends an update, the group messages 8 going forward would be synchronized with respect to that timestamp 74 and eventually the shared data 11' would be sorted out. Alternatively, a more complicated scheme could be used such as reliance on a global clock or a periodic exchange of messages to override any user-modified time settings. Addressing time skew can also inhibit members of the group 8 from purposely setting their clock ahead to ensure that their updates are always chosen. Of course, some of these considerations can be ignored if other, non-time-related collision resolution schemes such as a hierarchy or user preferences are used.

Figure 12:
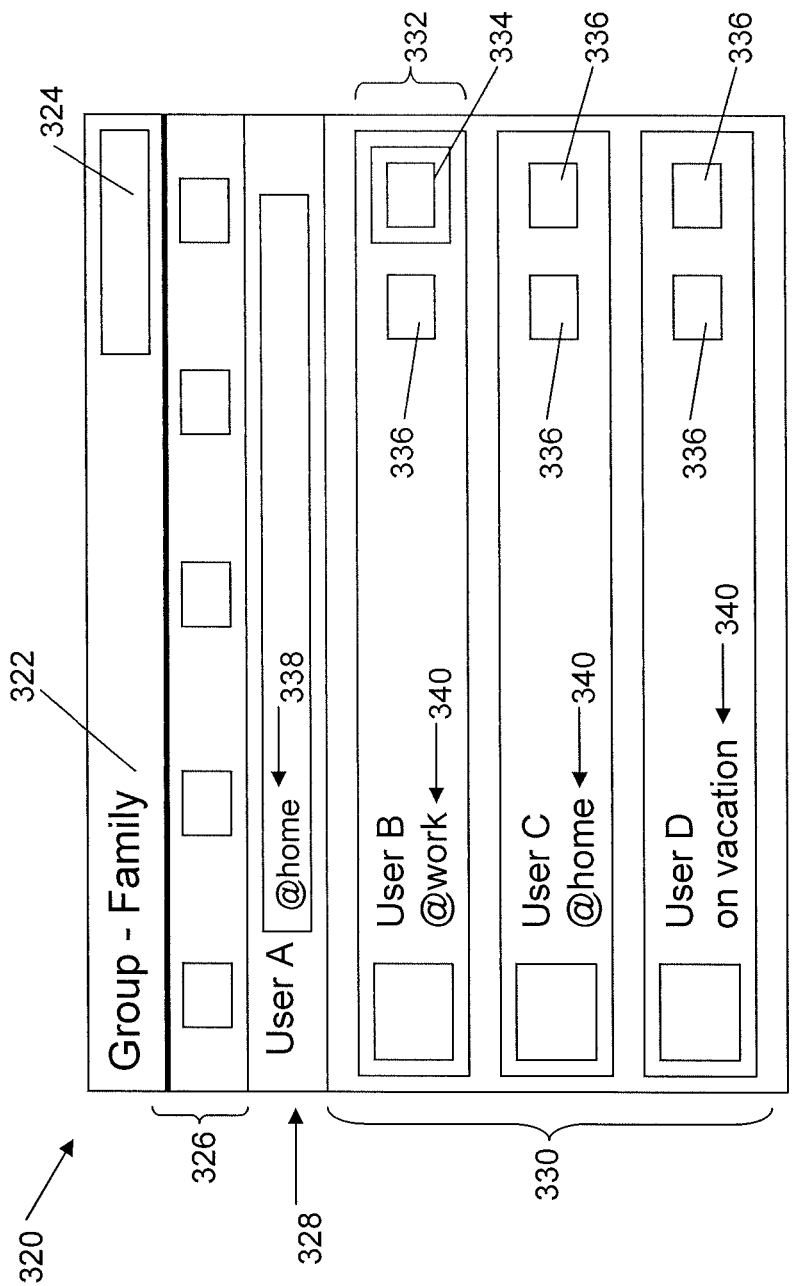
FIG. 12 is an example graphical user interface (GUI) for the group sharing application shown in FIG. 5.
Figures 14, 15:
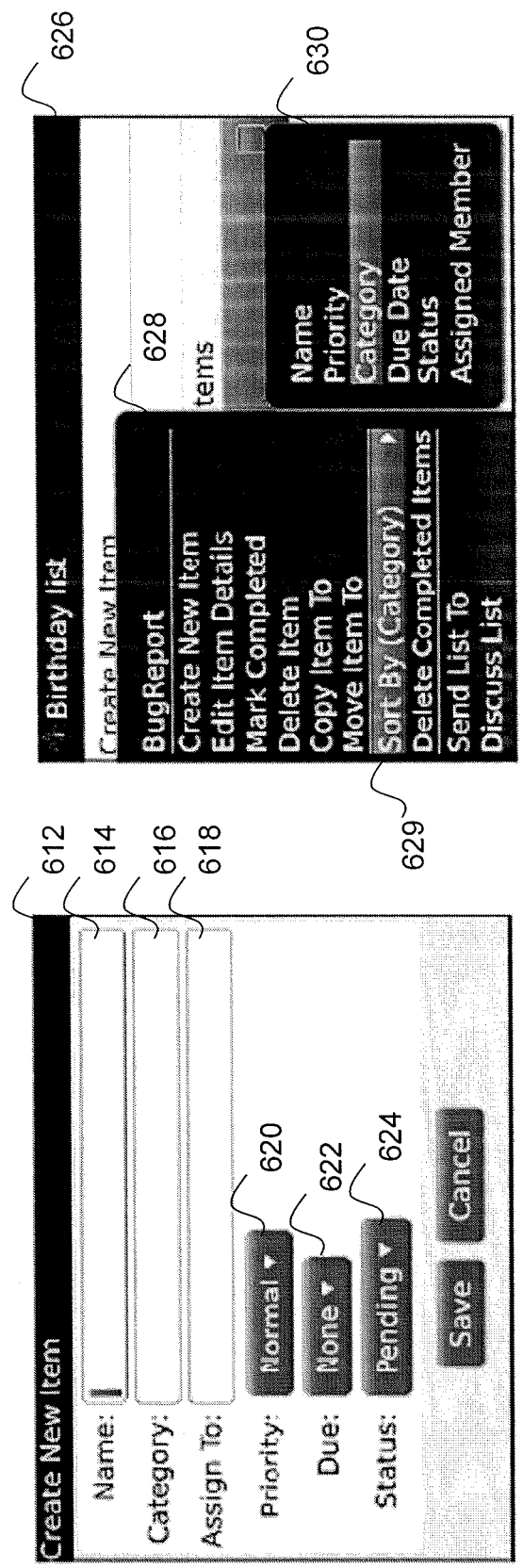
FIG. 14 is an example screen shot illustrating the creation of a new list item.
FIG. 15 is an example screen shot illustrating a menu interface for sorting lists.

As discussed above, the group application 54 may include one or more applets each having associate therewith, one or more databases 90, which are updated as exemplified above. Turning now to FIG. 12, an example group application GUI 320 is shown. The group application GUI 320 can be initiated and displayed on the mobile device display 12 by highlighting and selecting the appropriate icon from the display. The group application GUI 320 comprises a group name 322 and notification area 324 along the top of the screen to identify the group 10 currently being shown in the group application GUI 320. As noted, each member may belong to more than one group and thus the group application GUI 320 may display information for various groups 10. A number of available global applets 326 are also shown, which enables the member to select and utilize a desired applet 326, examples of which are shown in FIGS. 13 and 14 and will be described later. The group application GUI 320 also comprises a status bar 328 to indicate the member's name and the member status 338. In this example, User A is at home. The group application GUI 320 also comprises a member listing 330 for each member in the group 10 indicated by the group name 322. In this example, Users B, C, and D are given listings 330 with a corresponding member status 340. Each listing in this example comprises member applet icons 332, which indicate the various applets 326 common to the user and the other member. The applet icons 332 may comprise public or global applet indicators 336 as well as private applet indicators 334 such as private lists or conversations. In this example, User A has a private applet in progress with User B, e.g. a list of gifts as discussed above.

By highlighting and selecting one of the global applets 326 or a private applet (e.g. through a private applet indicator 334), a GUI for the desired applet may be initiated and displayed as shown in FIGS. 13 to 14.

Figure 13A:
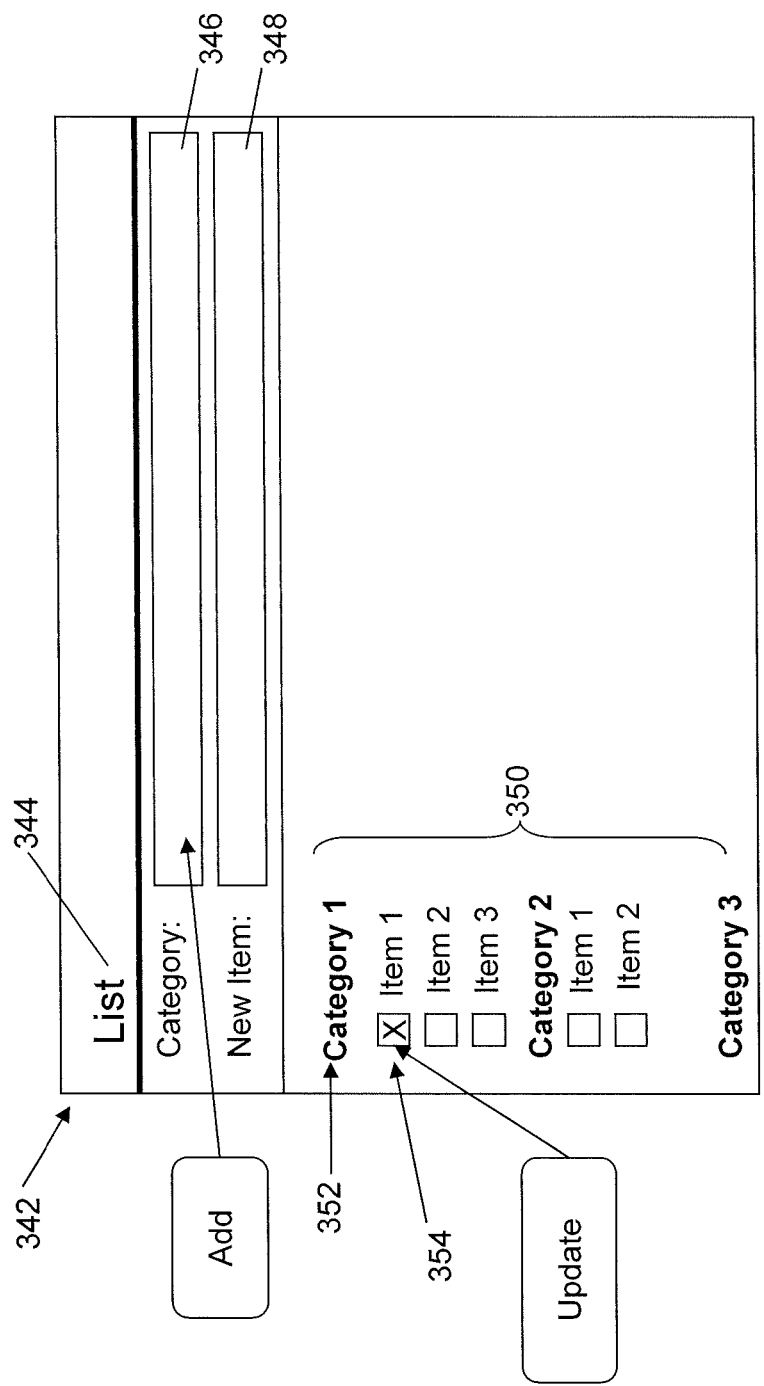
FIGS. 13(a) to 13(g) are example GUIs illustrating the use of lists maintained using the group sharing application.

FIG. 13(a) illustrates a list GUI 342, which has an applet name 344, a category entry box 346, an item entry box 348, and a current list of items 350. The current list of items 350 comprises one or more categories 352, each of which comprises zero or more items (i.e. a category can be awaiting population). In FIG. 13(a), two examples of updates to the list are shown, namely adding a new category or updating (i.e. selecting) a currently listed item 354. Such examples illustrate modifications to the shared data 11. In this example, if the items 354 are shopping list items, and User A checks off Item 1 as shown in the figure, a record 92 for that item can be changed to reflect the real-world situation: "Apples—need"; to the current situation: "Apples—purchased"; for example by appending or changing a tag or flag internally or through any other modification of a value in the record 92. This new record 92 would then be sent in a group message 8 to enable the other group members to replace the previous record 92 indicating "Apples—need" to "Apples—purchased", indicating that the item 354 is no longer needed. To update this change in the list GUI 342, the group application and applet data 63 can provide rules or instructions for providing a check mark or modified text to indicate in the list of items 350 that Item 1 has been purchased.

Figures 13B, 13C:
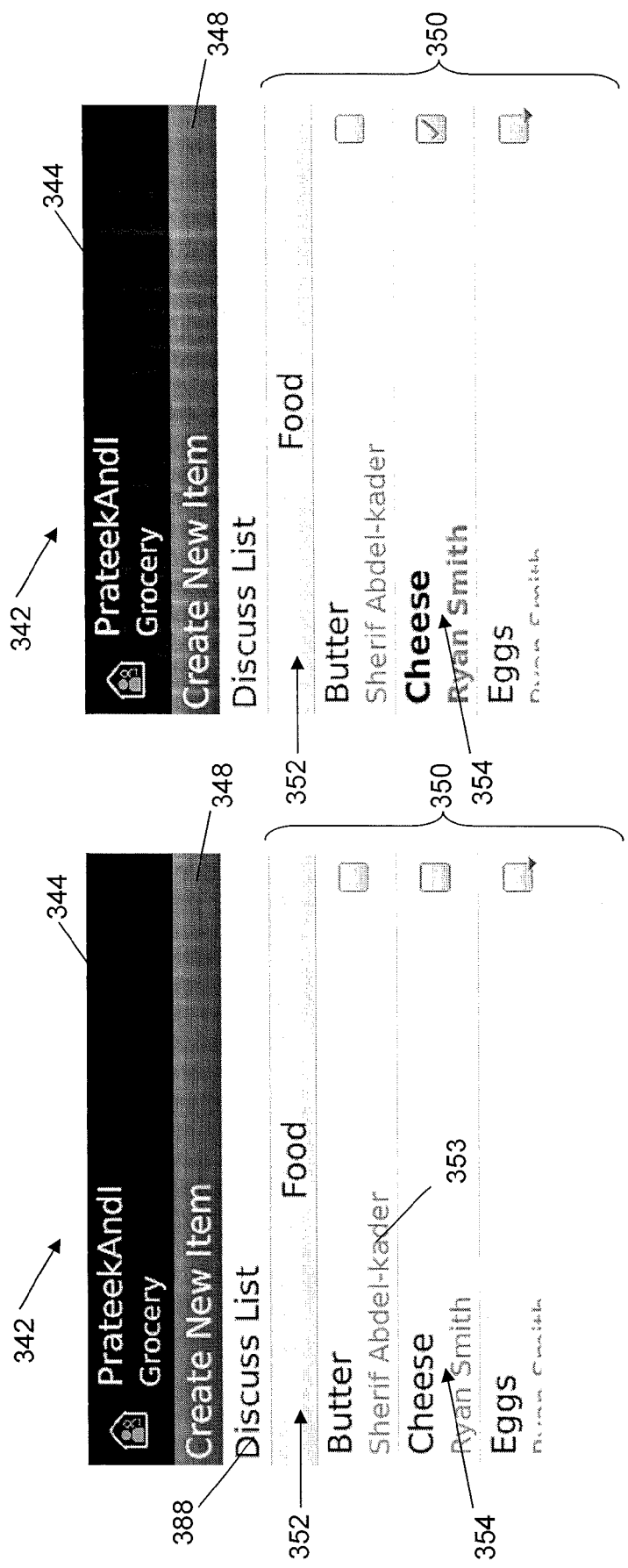

FIGS. 13(b) to 13(e) illustrate another embodiment of the list GUI 342 shown in FIG. 13(a). In FIG. 13(b), a discuss list option 388 is included which enables a user to engage in a chat or post messages concerning the list 344. In this example, the category 352 "Food" comprises a number of items 354, and each item 354 has a user assignment 353 that is included to indicate who is to be obtaining or completing that item 354. FIG. 13(c) illustrates completion of an item 354 labelled "Cheese" and the updating of the list 344 to show that the "Cheese" has been picked up by Ryan Smith.

Figure 13D:
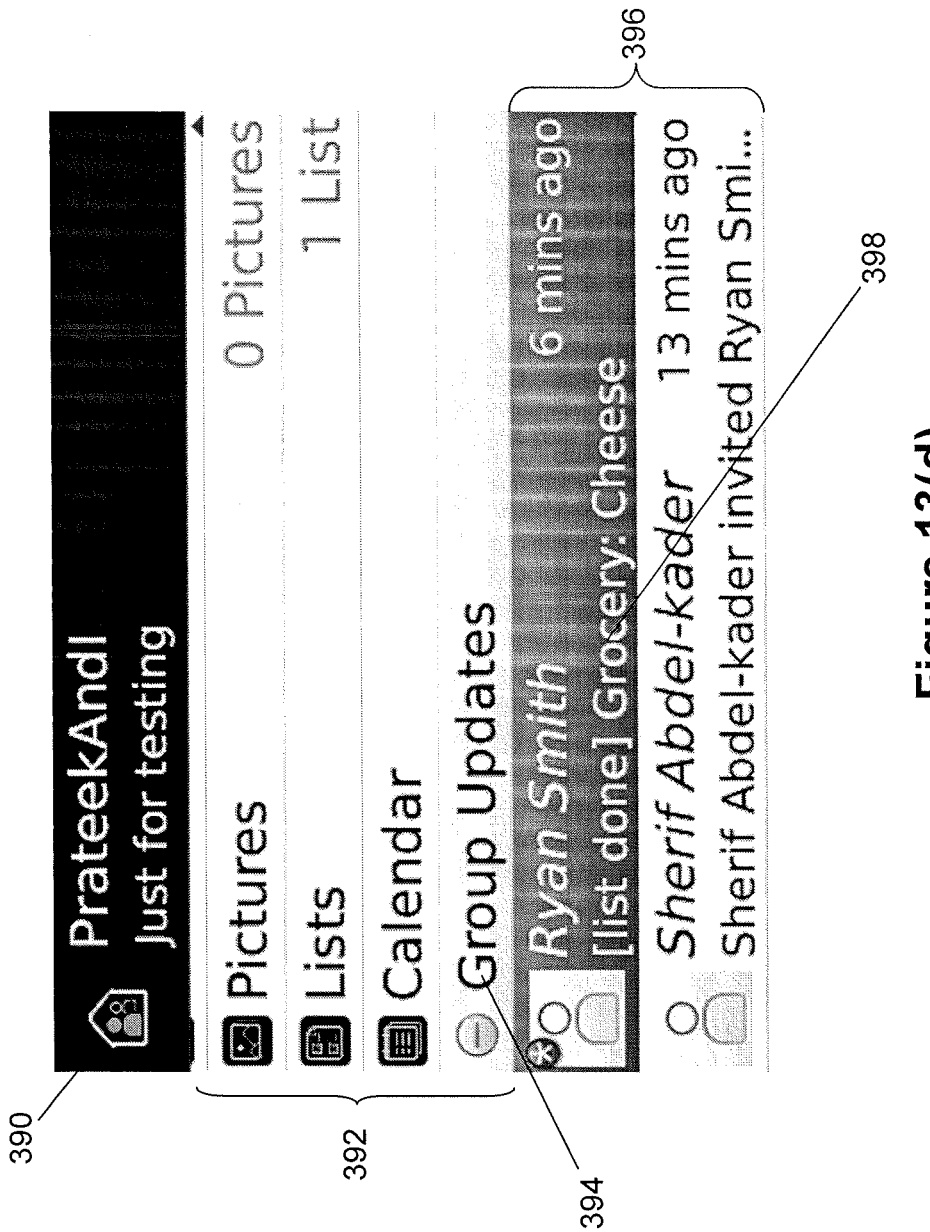

FIG. 13(d) illustrates a group applet list GUI 390, which comprises a list 392 of applets, including an expandable group updates entry 394. The group updates 394, when expanded can display a list 396 one or more updates for the group. Illustrated by way of example only in FIG. 13(d) is a particular update 398 associated with completion of the "Cheese" item 354 as shown in FIG. 13(c). In this way, the user can become aware of list updates by viewing the list 342 itself or by referencing the updates similar to referencing a new incoming message.

Figure 13E:

FIG. 13(e) illustrates another way in which to advise the user of group updates, namely by including a group update message 397 amongst a list of messages 395. FIG. 13(f) illustrates yet another way in which to display activity updates, including group updates. In FIG. 13(f), a Recent Updates GUI 600 is shown, which displays an activity updates list 602. The activity updates list 602 displays certain contact activities and group activities, such as when display pictures are changed or when members are added to a group. The activity updates list 602 may be configured to include a predetermined maximum number of most recent updates, e.g. the 25 most recent updates. The Recent Updates GUI 600 can be accessed by selecting an icon or other link in a group GUI or instant messaging contact list. Also shown in FIG. 13(f) is an updates menu 604 which can be initiated to clear, collapse or manage grouped (sorted) updates, or to perform a function associated with a contact named in the update (e.g. "Call Voice Mail" as shown).

Figure 13G:
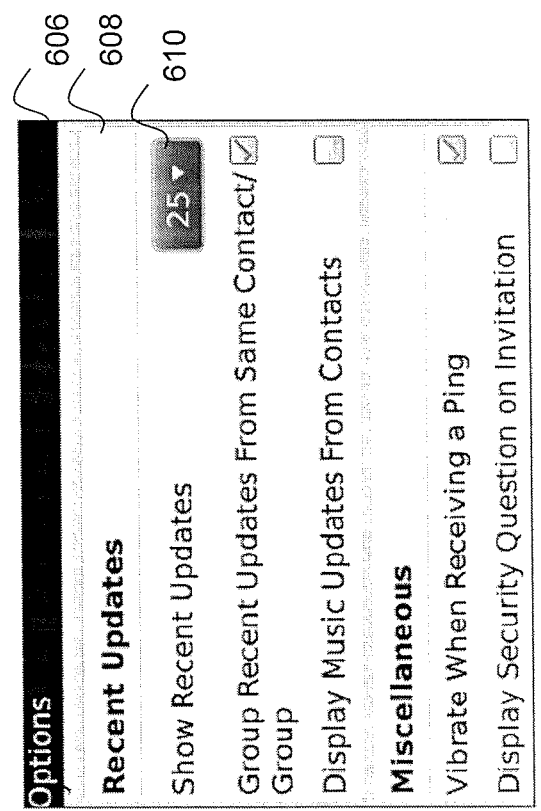
Figure 13F:
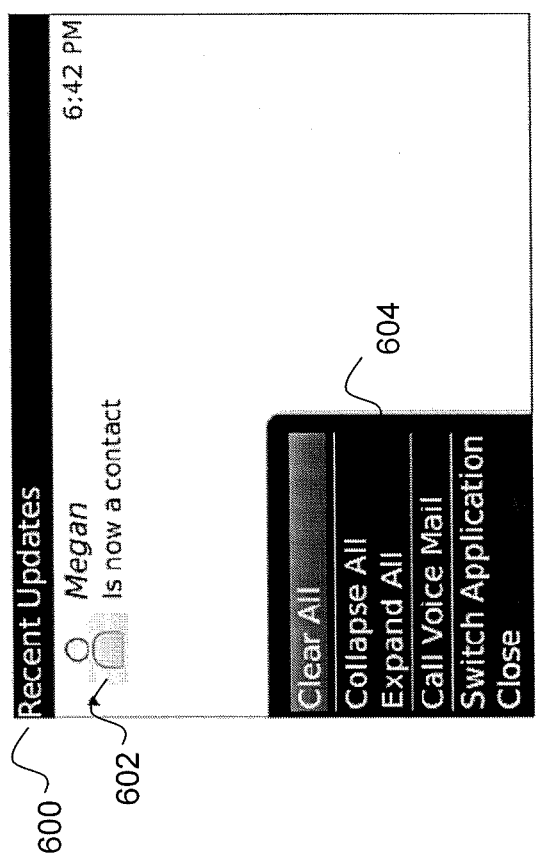

FIG. 13(g) illustrates an Options GUI 606 for, among other things, modifying settings associated with the Recent Updates GUI 600. The Options GUI 606 in this example is accessible via a menu that can be invoked through the group sharing application 54 or an instant messaging application (not shown). A Recent Updates portion 608 of the Options GUI 606 enables the user to change the number of updates that appear in the activity updates list 602 by using a drop-down option 610. Various other options can also be provided such as the ability to stop grouping activity updates from the same contact or group 10.

As discussed above, lists can be created to share with all members in a group 10. Due dates can be assigned to the lists, the priority level for list items can be changed, and owners can be assigned to list items. List items can be changed or marked as completed. Members can comment on list items and send a list to users that are outside of the group 10. FIG. 14 illustrates a Create New Item GUI 612, which can be initiated by selecting a Create New Item button (not shown) from within a list interface. As shown in FIG. 14, the new item can be assigned a name by typing in a Name entry box 614. To add a category for the list item to appear under, a category name can be typed in a Category entry box 616. To assign responsibility for the list item to a group member, as the member's name is typed, a lookup in the group list (or other source) can be performed and the user can select the member from a filtered list (not shown). To set the priority for the list item, a Priority field 620 can be changed. To specify a due date associated with the new item, a Due field 622 can be changed by selecting a date option (not shown) and selecting a particular date. In order to set the priority level to automatically change to high at a specified time for a list item with a due date, a make high priority field can be provided.

When a list has been selected on the mobile device 100, a list GUI 626 appears as shown in FIG. 15. By invoking a primary menu 628 (e.g. by selecting a menu key), a Sort By option 629 can be selected to invoke a secondary menu 630. The secondary menu enables a criterion to be chosen for sorting the lists. Examples shown in FIG. 15 include name, priority, category, due date, status and assigned member.

When a member of a group 10 deletes a list item (or otherwise "completes" that item), it appears crossed out in the list. Another member can restore that item, e.g. if it needs to be repeated or is not actually finished, by selecting a recreate option from a menu (not shown).

Figure 16A:
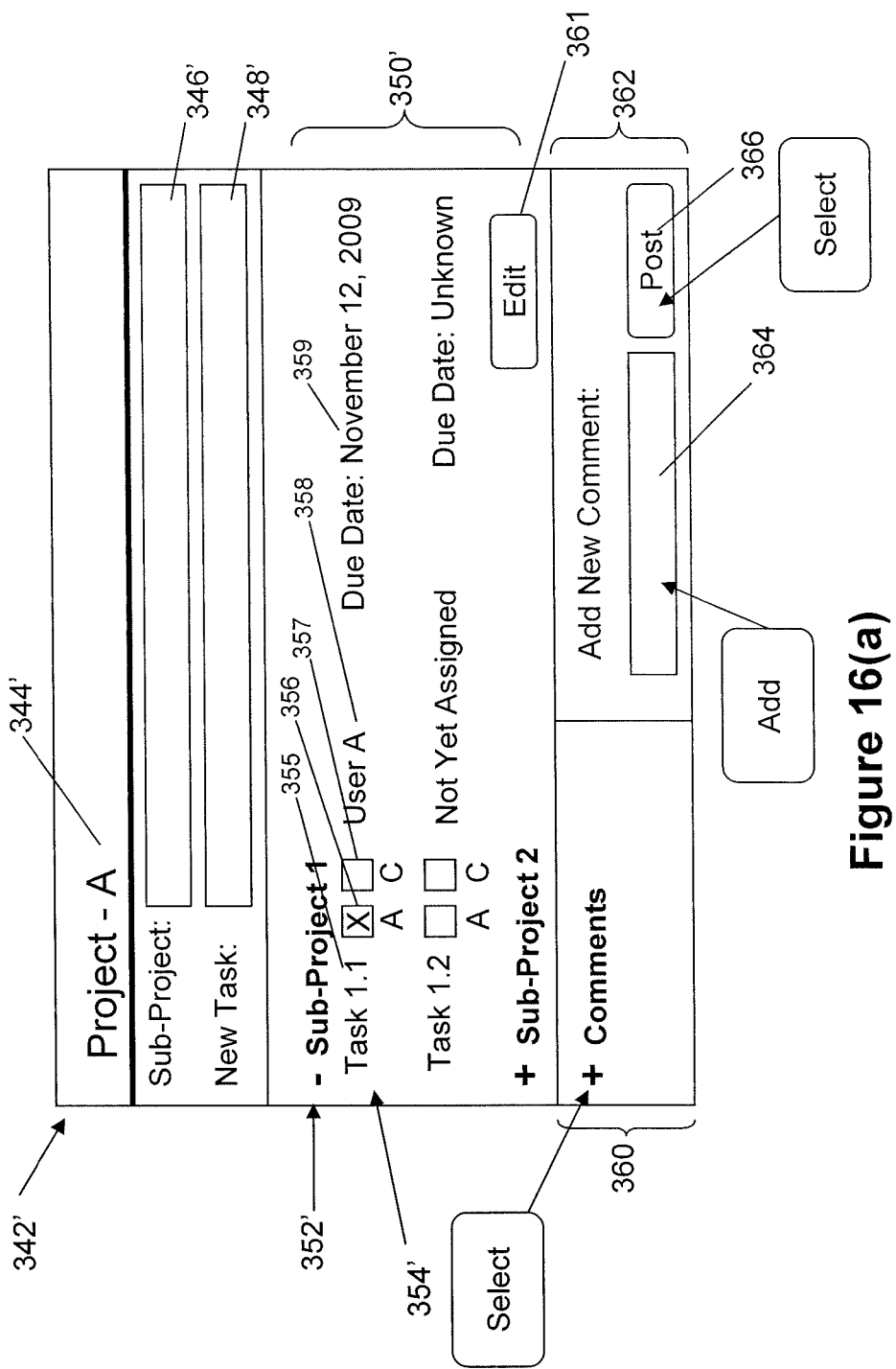
FIGS. 16(a) to 16(d) are example GUIs illustrating the use of lists maintained using the group sharing application for managing tasks in a group project.

The principles for managing a list amongst the group 10 can also be extended to more particularly manage tasks within a project as discussed above. Turning now to FIGS. 16(a) through 16(d), example screen shots for managing a group project are shown. In FIG. 16(a), a project GUI 342' is shown, which displays an applet name 344', enables a new sub-project 346' to be added, and allows new tasks to be added 348', similar to the addition of categories 346 and items 348 shown in FIG. 13. The GUI 342' comprises a current list of tasks 350', organized into one or more categories 352', each of which comprises zero or more tasks 354' (i.e. wherein a sub-project 352' is awaiting population). In the example shown in FIG. 16(a), sub-projects 352' can be shown in expanded or contracted forms to facilitate navigation amongst the sub-projects 352'. The task 1.1 comprises a task name 355, an assignment "A" indicator 356 for showing whether or not a task 354' has been assigned to a group member, a completion "C" indicator 357 to show whether or not a task 354' has been completed, an assignee name 358, and a due date 359. It can be appreciated that the data pertaining to the task 354' can vary depending on the project type, user preferences, or based on different applications, and thus the data shown in FIG. 16(a) is for illustrative purposes only.

By providing the data as shown in FIG. 16(a), when a task is assigned, e.g. by selecting an Edit button 361 and applying changes to the entry (not shown), the shared data 11 is updated to reflect the changes such that the other group members are aware of the new assignment and any other data associated therewith. For example, if Task 1.1 is assigned to User A as shown, a record 92 for that task 354' can be changed and the new record 92 would then be sent in a group message 8 to enable the other group members to replace the previous record 92 with one that shows the new assignee 358 information and indicates by checking the indicator 355 that the task 354' has been assigned.

Figure 16B:
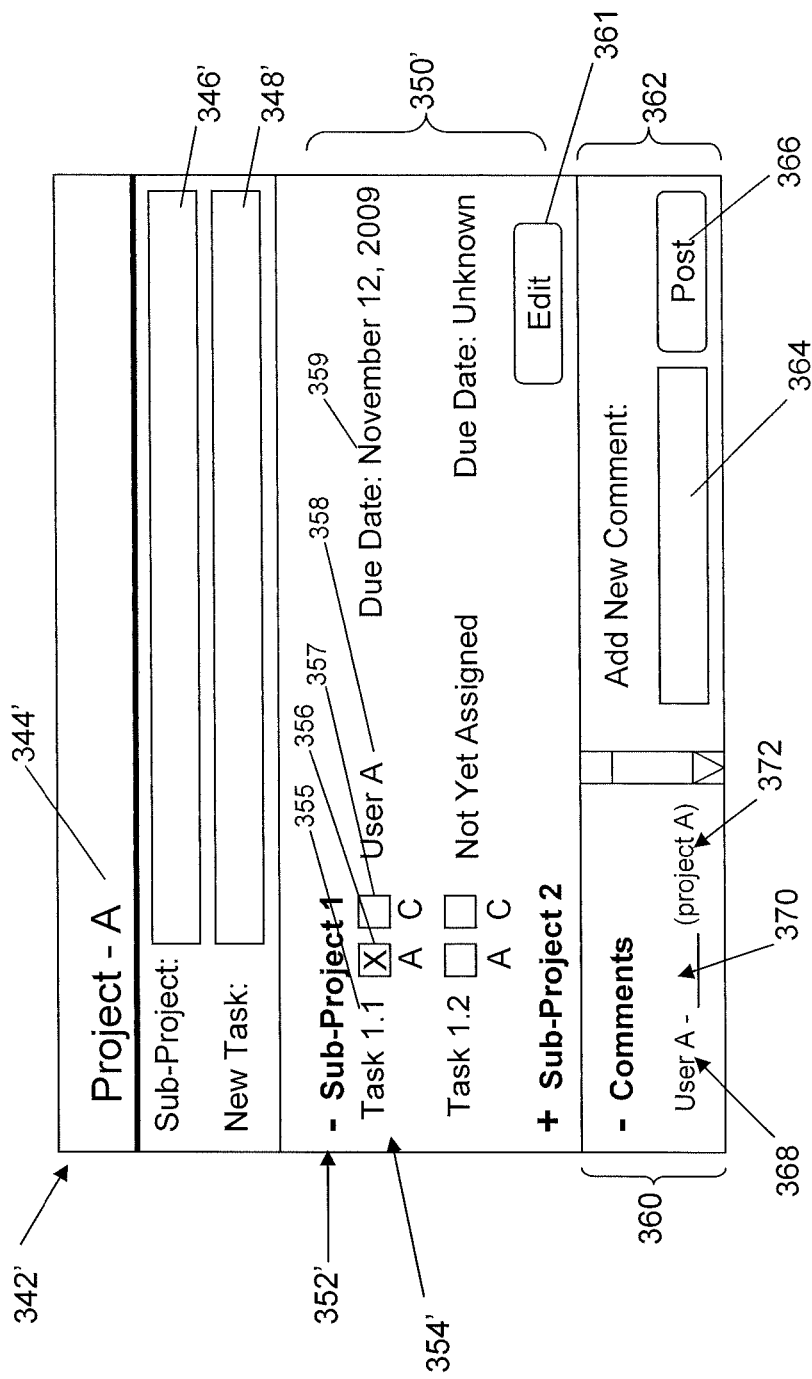
Figure 16C:
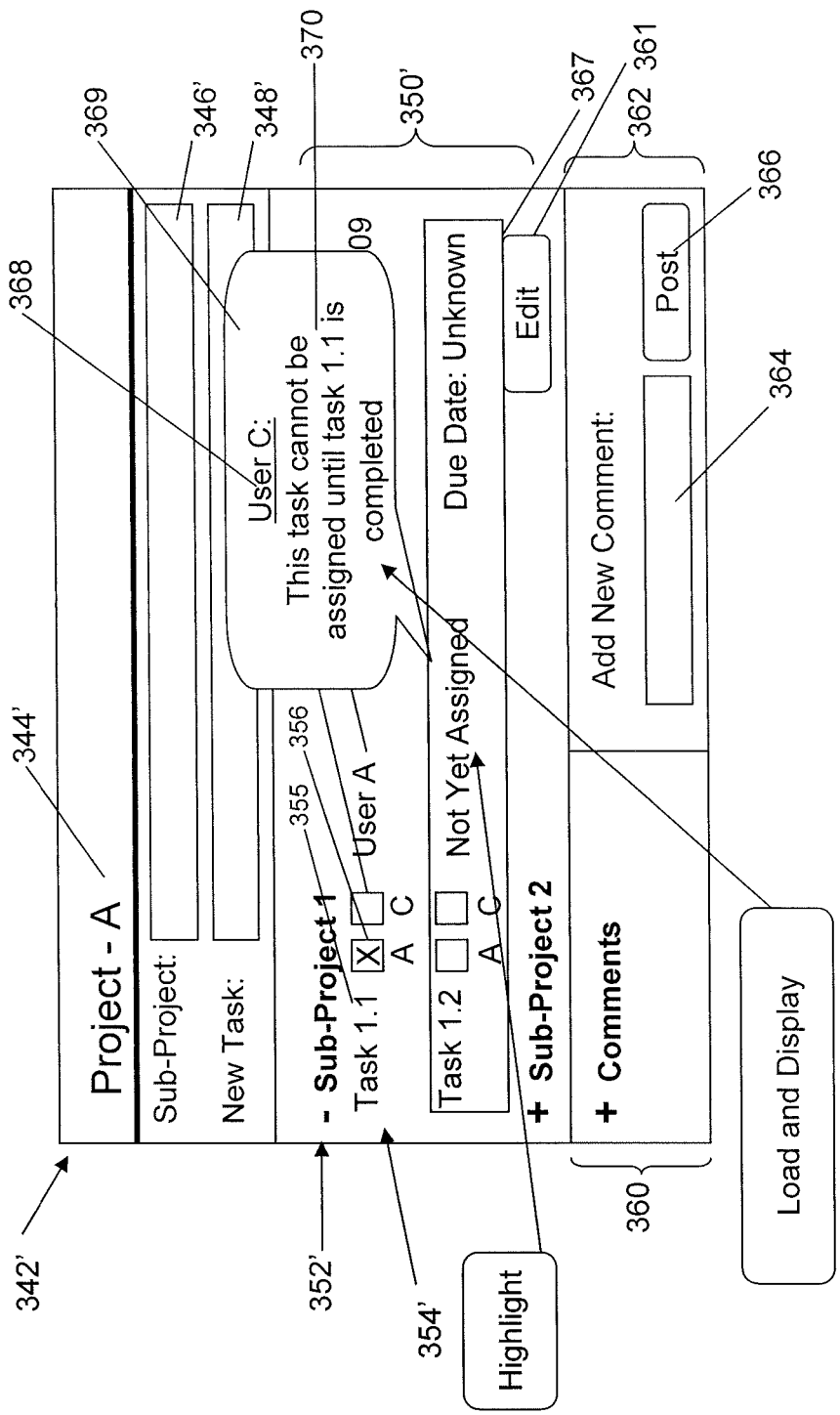

The GUI 342' may also comprise a comments portion 360 which in this example shows a contracted list of comments (i.e. comments not shown until expanded). By selecting the '+' associated with the comments portion 360, various comments 370 may be displayed within the comments portion as shown in FIG. 16(b). Each comment 370 may illustrate associated information such as who the poster 368 was and to which project (or sub-project) 372 the comment pertains. This allows the user to obtain a complete list of comments for all sub-projects 352' and tasks 354' without having to navigate to a particular task 354'. In addition to or alternatively, a comment 370 and the poster 368 can be revealed in a pop-up balloon 369 or other message container as shown in FIG. 16(c), e.g. by highlighting the associated task 354' using a selection bar 367 (as illustrated). This can allow comments 370 to be viewed directly with the associated sub-project 352' and task 354' as the user navigates through the current list 350'.

Figure 16D:
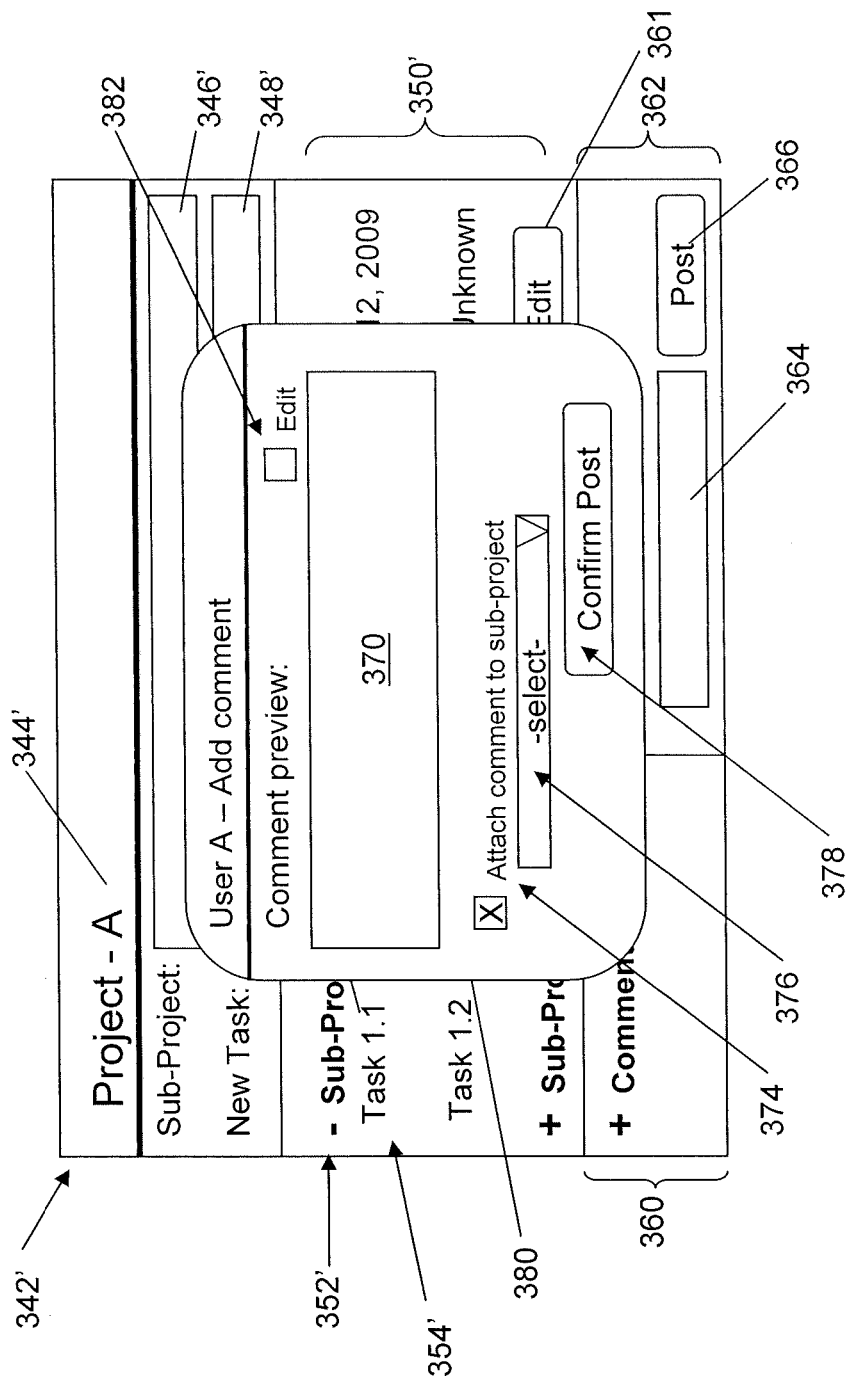

In order to add comments and have them shared amongst the group 10, the GUI 342' in this example also comprises an Add New Comment portion 362, which comprises a comment entry box 364 for entering the comment 370 and a Post button 366 for effecting the posting of the comment 370. If comments are simply to be associated with the project in general, the Post button 366 can be selected and the comment 370 posted directly within the comments portion 360. In addition, or alternatively, as shown in FIG. 16(d), the comment 370 can be previewed and further categorization of the comment 370 made by displaying a pop-up window 380. The pop-up window 380 in this example previews the comment 370 and enables the comment 370 to be edited by detecting selection of an edit option 82. The pop-up window 380 also comprises a sub-project selection option 374 to enable the user to assign the comment 370 to a particular one or more sub-projects 354'. If selected as shown in FIG. 16(d), a selection mechanism such as a pull-down menu 376 can be used to select such one or more sub-projects 354'. A Confirm Post button 376 may then be selected to effect posting of the comment 370, e.g. in the comments portion 360, in a pop-up balloon 369, or both.

In order to utilize the system described in FIGS. 1 through 11, various GUIs can be provided on the mobile devices 100, in addition to those shown in FIGS. 12 through 16. A group 10 can be used to create or join a collection of other users that a particular user wants to stay connected with, such as family, friends, or co-workers. The group 10 can be used to share pictures, lists, and appointments with the members of the group 10. Chats with other members can be initiated and comments on shared items can be made. A group may specify a predetermined maximum number of members, and can include members that are not already part of a given user's contact list 64, in particular when the contact list 64 is associated with an instant messaging or other messaging medium. The groups 10 can be integrated into existing interfaces and applications, such as instant messaging and personal information management interfaces and applications, by including indications or lists of groups 10 in screens of these applications. Groups 10 may also be included in contact list interfaces and applications. Shortcut icons for a group can also be created and placed in a home screen to enable quick access to a particular group or to a particular function associated with a group Turning now to FIG. 17, a group 10 in this example is created using a Create New Group GUI 632. When a new group 10 is created, the user creating the group is automatically the administrator for the group. By selecting a suitable input mechanism and invoking a menu, an option to create a new group is selected in order to invoke the Create New Group GUI 632. A name for the group is identified by typing in a Group Name field 634, and a description that is seen by potential members when they receive an invitation to join the group 10 is provided by typing in a Description field 636. An icon for the group can be selected by changing a group icon option 638. In order to prevent other members from inviting other users to the group 10, an Allow non-admin members to invite others option 640 is changed to "No". Otherwise, other members can invite other users. A Show on Home Screen option 642 can be set to "Yes" or "No". If Show on Home Screen option 642 is set to "Yes" an icon representing group 10 will be placed on a home screen from which functionality related to group 10 may be accessed directly. If Show on Home Screen option 642 is set to "No" an icon representing group 10 will not be placed on a home screen.

Figures 17, 18:
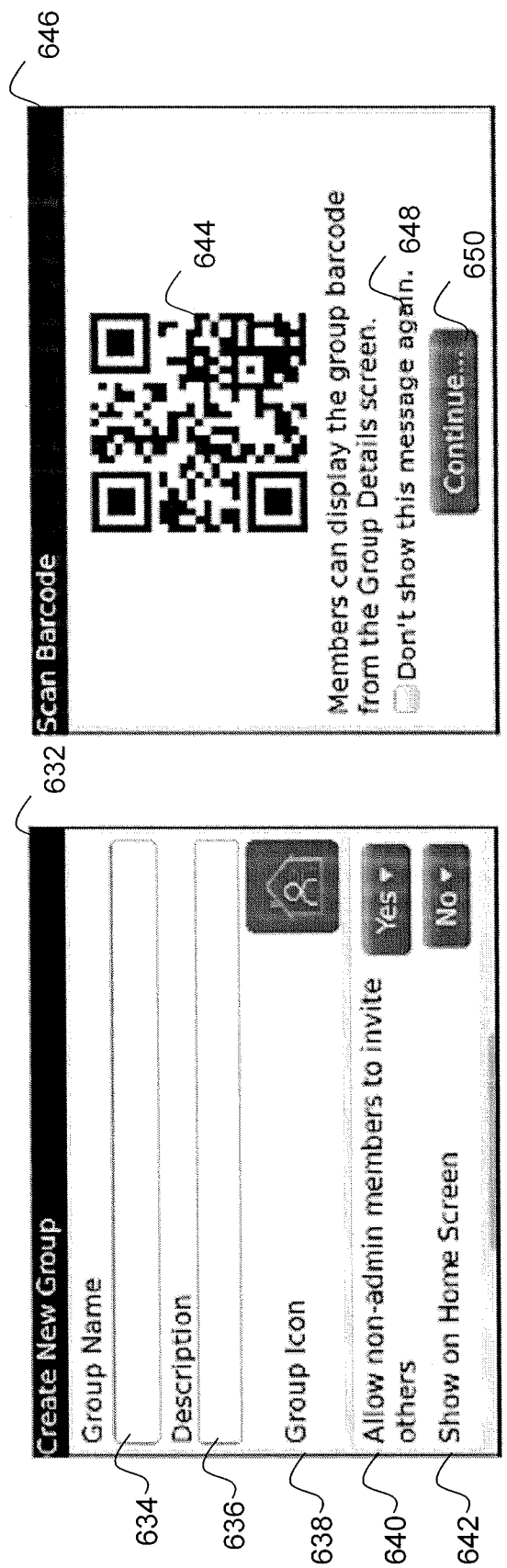
FIG. 17 is an example screen shot illustrating the creation of a new group.
FIG. 18 is an example screen shot illustrating an interface displaying a group barcode to enable a new member to join the group by scanning the barcode.

For mobile devices 100 that include a camera or other imaging device (not shown), the user can join a group by scanning a barcode 644 displayed on the screen of another mobile device. A Scan Barcode GUI 646 is shown in FIG. 18 which advises a user that, in this example, a 2-D barcode 644 can be scanned by the mobile device 100 to join a group 10 and provides an example barcode 644. A Don't show this message again check box 648 is selected to skip display of the GUI 646 in future uses. A Scan a Group Barcode option (not shown) is invoked which initiates the Scan Barcode GUI 646. By selecting a Continue button 650, an image is caused to be taken using the camera or imaging device of mobile device 100. Mobile device 100 captures barcode 644 by orienting mobile device 100 such that all four corners of the barcode 644 displayed on the other mobile device appear on the device display of mobile device 100. The mobile device 100 then automatically scans the barcode 644 and may provide confirmation by way of an auditory "beep" when the scan is successful.

Figure 19:
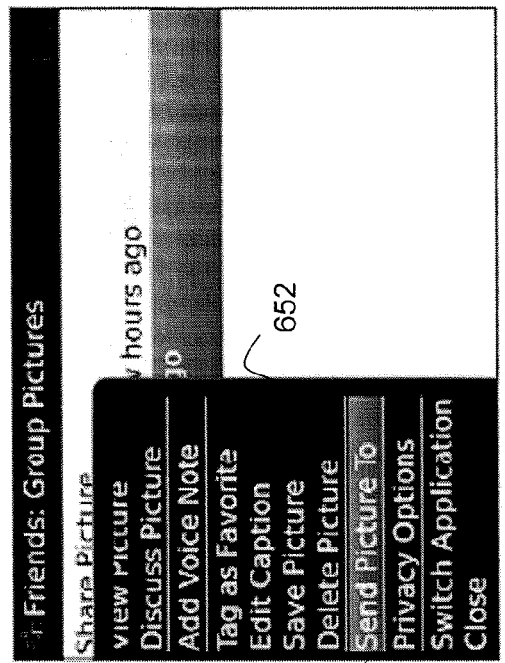
FIG. 19 is an example screen shot illustrating a menu interface for sending a chat, picture, or list to a contact that is not a member of a group.

As noted above, a chat, picture, or list can be sent to a user that is not part of the group 10. By selecting a particular group chat, picture or list, a menu 652 is invoked as shown in FIG. 19 and, in this example, since a picture was selected, a Send Picture To option 654 is displayed which enables the user to send the selected picture to a desired user. It can be appreciated that if a chat was selected, the menu 652 would include a "Send Chat To" option (not shown). Invoking Send Picture To option 654 causes a further interface (not shown) to be displayed in which one or more recipients for the picture can be chosen. Once recipients have been chosen, the selected picture is sent to the selected recipients according to one or more message transports such as email, instant message or peer-to-peer for example.

Figure 20:
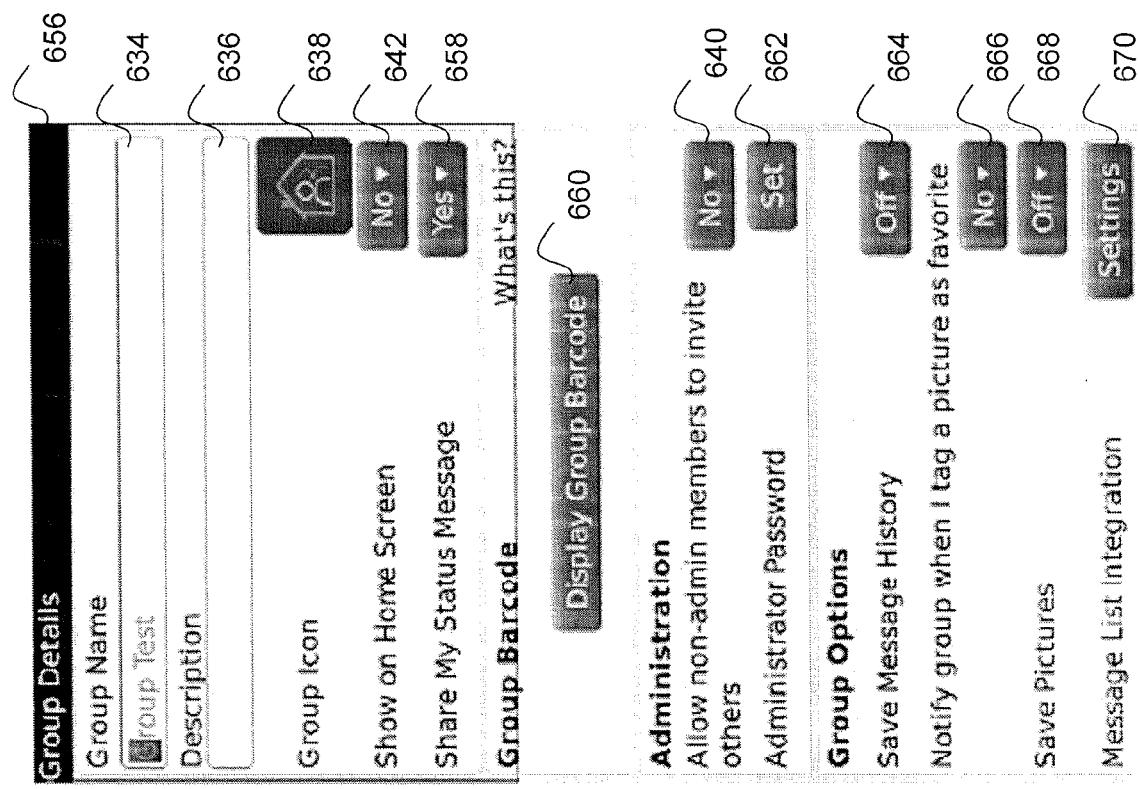
FIG. 20 is an example screen shot illustrating an interface for changing group options.

Various options and details of a particular group 100 can be specified and/or modified by invoking a Group Details GUI 656, which is shown by way of example in FIG. 20. The Group Details GUI 656 can be invoked, for example via a menu (not shown) associated with the group sharing application 54, instant messaging application, home screen, etc. As can be seen in FIG. 20, those options that are the same as those provided when creating the group 10 (see FIG. 17) are given like numerals for clarity. The icon associated with the group can be updated by selecting the Group Icon option 638. To toggle whether a user's status is shared with other members, a Share My Status Message option 658 can be changed to "Yes" or "No". The group's barcode 644 can be displayed by selecting the Display Group Barcode button 660. This enables other users to scan the group's barcode 644 to join the group as described above in relation to FIG. 18. To be notified when members are added, deleted, or leave the group, a Notify Me of Changes in Group field (not shown) can be set to "Yes". To turn on chat history for the group 10, a Save Message History field 664 can be modified. To save group pictures, the Save Pictures option 668 can be modified to select the device, a media card, or any other available memory. To stop receiving notification of group activities in the messages application (e.g. as shown in FIG. 13(e)), a Settings button 670 adjacent a Message List Integration field can be selected and an option then selected. If the user is an administrator to the group 10, the group description can be changed by typing a new description in the Description field 636. To change a password that a member requires to become an administrator for the group 10, an Administrator Password option 662 can be set as "Change" or "Set". To notify other members when a picture is tagged as a favourite, a Notify group when I tag a picture as favourite option 666 can be set to "Yes".

Figure 22:
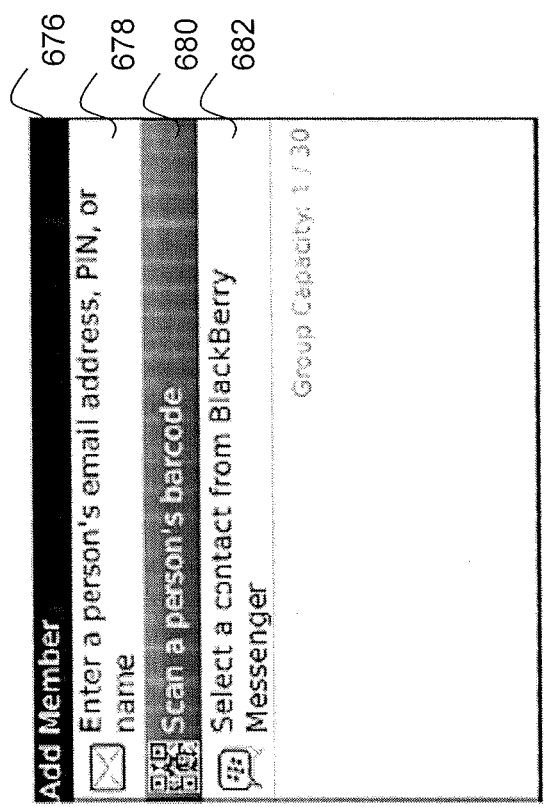
FIG. 22 is an example screen shot illustrating an interface for adding a new group member.
Figure 21:
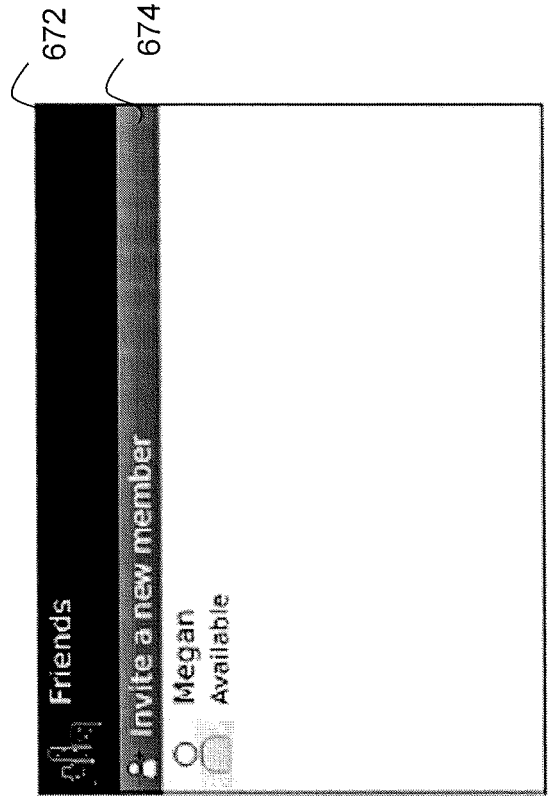
FIG. 21 is an example screen shot illustrating an interface for enabling a new group member to be invited to a group.

A new member can be invited to a group in various ways, including through existing invitation mechanisms used for inviting new contacts in, for example, instant messaging applications. Such mechanisms require the new member to accept an invitation before they are added as a member of the group 10. In the present example, if the Allow non-admin members to invite others option 640 is set to "No" only administrators can invite new members. To do so, a group contact list GUI 672 is invoked as shown in FIG. 21. Group contact list GUI 672 includes an invite a new member option 674. When invite a new member option 674 is selected, an Add Member GUI 676 is displayed as shown in FIG. 22. In this example a new member may be added by selecting a first option 678 enabling a user's email address, PIN or name to be entered, by selecting a second option 680 for scanning another user's barcode 644, or a third option 682 for selecting a contact from an instant messaging application.

To add a new member by scanning the new member's barcode 644 the second option 680 in the Add Member GUI 676 is selected and the Scan Barcode GUI 646 can be displayed (if check box 648 is de-selected). The barcode 644 is scanned by maintaining the four corners of the barcode 644 in the field of view of the camera or imaging device until a successful scan is confirmed.

Figures 23, 24:
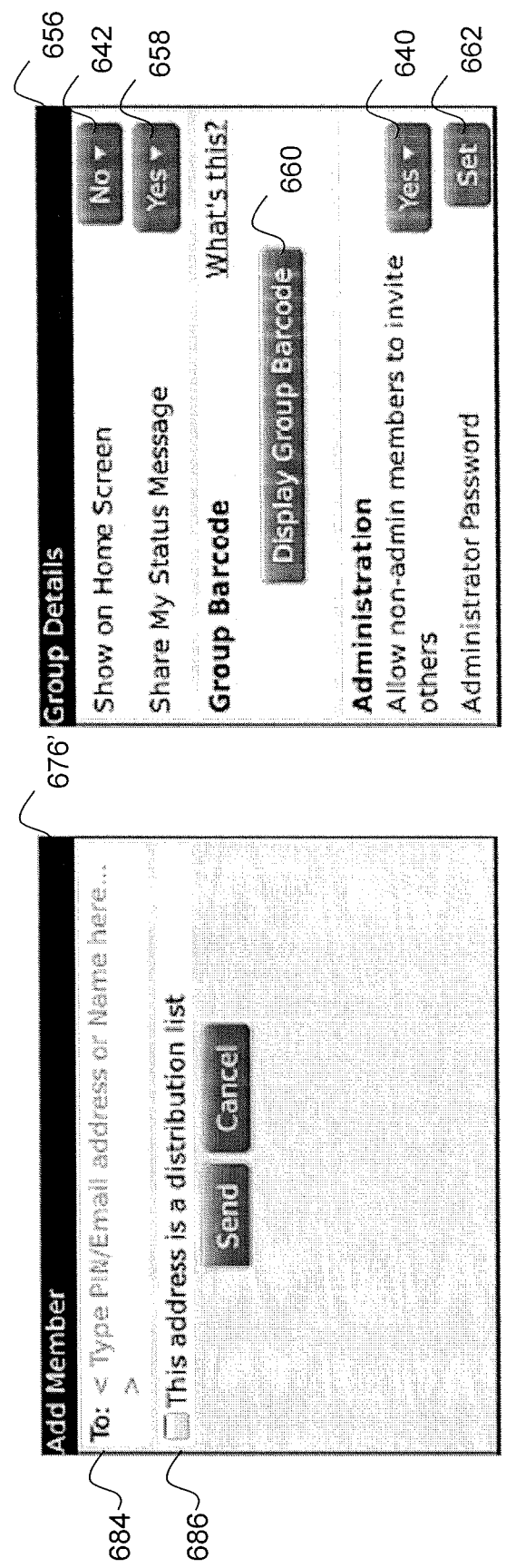
FIG. 23 is an example screen shot illustrating another interface for adding a new group member.
FIG. 24 is an example screen shot illustrating an interface for displaying group details including enabling a group barcode to be displayed on a mobile device.

By selecting the first option 678, the Add Member GUI 676' is updated as shown in FIG. 23 to enable a PIN, email address or name to be typed into a To field 684. If appropriate, the user can select a This address is a distribution list check box 686. In other embodiments (not shown) a security question can be associated with the invitation that the new member must answer correctly. Once one or more addresses have been entered into To field 684 the Send button is actuated to send an invitation to each address included in To field 684.

A portion of the Group Details GUI 656 is shown in FIG. 24. By selecting the Display Group Barcode button 660, other users can scan the barcode 644 on the user's mobile device 100 to join the group 10.

Figure 25:
FIG. 25 is an example screen shot illustrating a prompt to enable a group contact to be added as an instant messaging contact.

As noted above, group members may not be existing instant messaging (or other message medium) contacts. A group member can be invited to become an instant messaging contact and then would need to accept the invitation in the same way as a normal instant messaging contact. After a member is invited to be an instant messaging contact, private chats can be initiated using an instant messaging exchange service (e.g. the PIN-based system shown in FIG. 6). From a list of group members (not shown), a member who is not already an instant messaging contact can be selected and via a menu (not shown), an Invite to Messenger prompt 688 is displayed as shown in FIG. 25.

Figure 26:
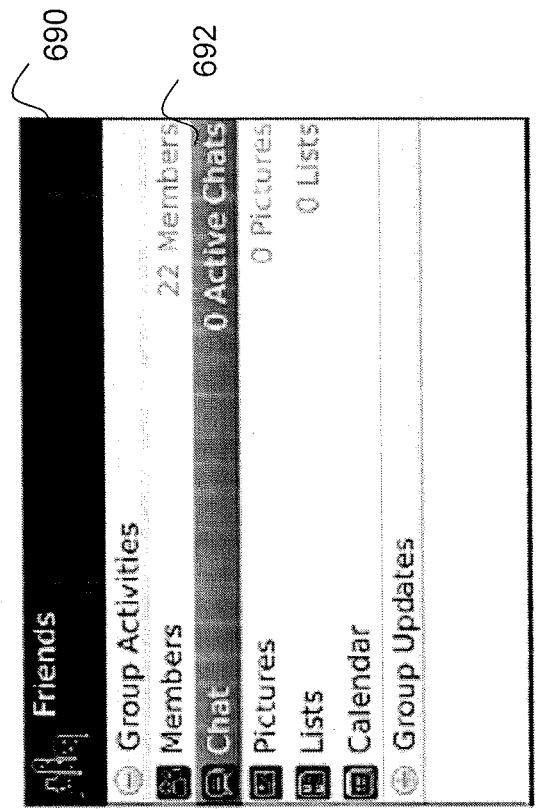
FIG. 26 is an example screen shot illustrating an expanded list of various group activities.

Administrators, or those that are given administrative privileges can delete members from a group by selecting particular members from a members list and invoking a menu. For any member, once that member leaves a group, the group no longer appears in a contact list screen for the user and activity updates are no longer received for that group. All members of a group can see group chats. In a Friends group GUI 690 shown in FIG. 26, by highlighting a Chat category 692 under "Group Activities", if a group chat exists, a message can be entered immediately. If a new group chat is to be created, a menu (not shown) is invoked and a "New Chat" option selected and a subject for the chat identified. Group chats can be deleted, e.g. through the same menu used to create a new chat.

Pictures can be shared with all members of a group 10. The user can share pictures that are stored on the mobile device 100 or, if a camera is included in the mobile device 100, a new picture can be taken and shared. Pictures can be marked as favourites, comments can be added, and voice notes created and added. Each group 10 may set a limit on the number of pictures that can be associated with that group 10 (e.g. to manage storage capacities) and can be automatically deleted after a prescribed number of days. Pictures that are marked as favourites can persist beyond the prescribed period and pictures can be saved locally or to a memory card accessible to the mobile device 100.

Figures 27, 28:
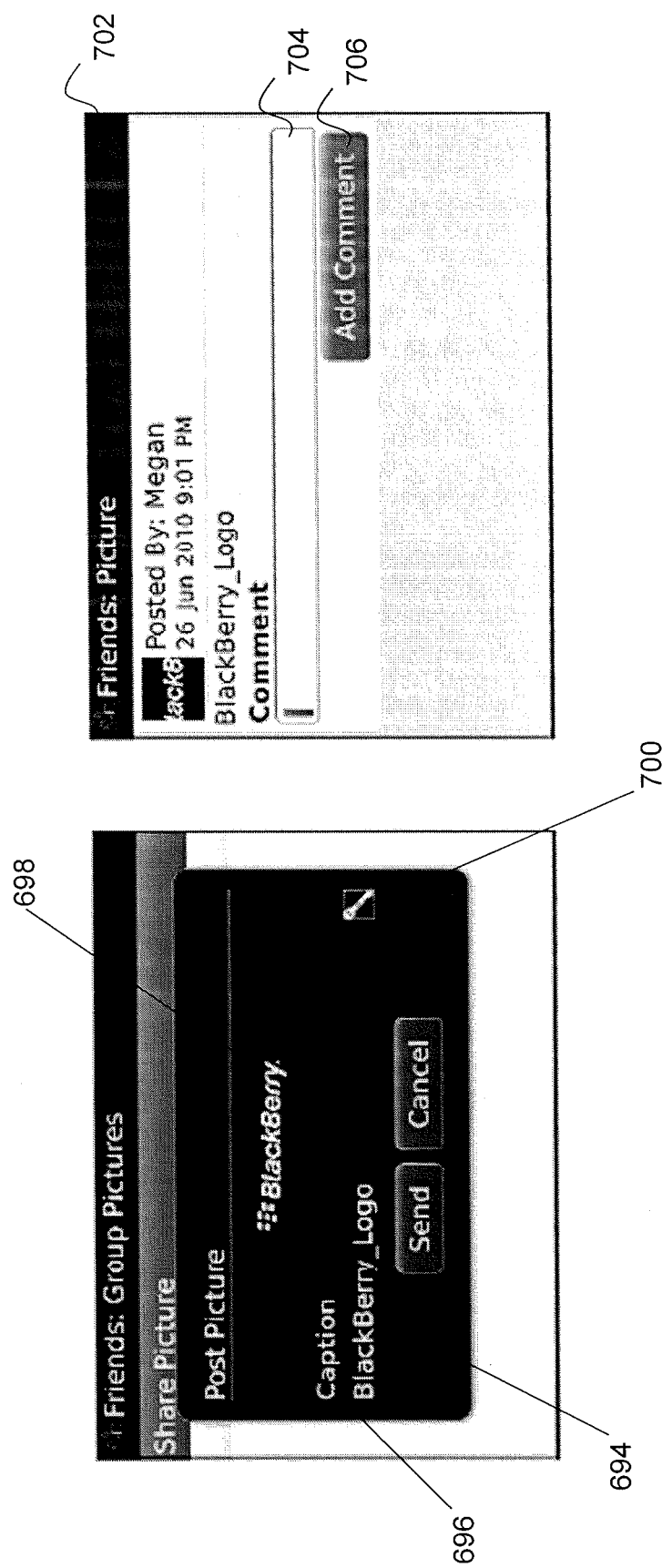
FIG. 27 is an example screen shot illustrating an interface for posting a picture.
FIG. 28 is an example screen shot illustrating an interface for enabling a picture to be discussed.

To share a picture, a menu may be invoked which provides an option to send or post the picture to the group 10. A Post Picture GUI 694 shown in FIG. 27 enables a caption 696 to be associated with the picture and a preview 698 of the picture is shown. A voice notes icon 700 can be selected to add a voice note (discussed in greater detail below). A picture that is associated with a group 10 can be discussed. A Picture GUI 702 is shown in FIG. 28 which provides a preview 698 of the picture and details of who posted the picture and at what time, etc. The caption 696 is also displayed. A comment can be added to the discussion by typing in the Comment field 704 and an Add Comment button 706 selected. Comments are shared amongst members of group 10 in association with the shared picture.

Figure 29:
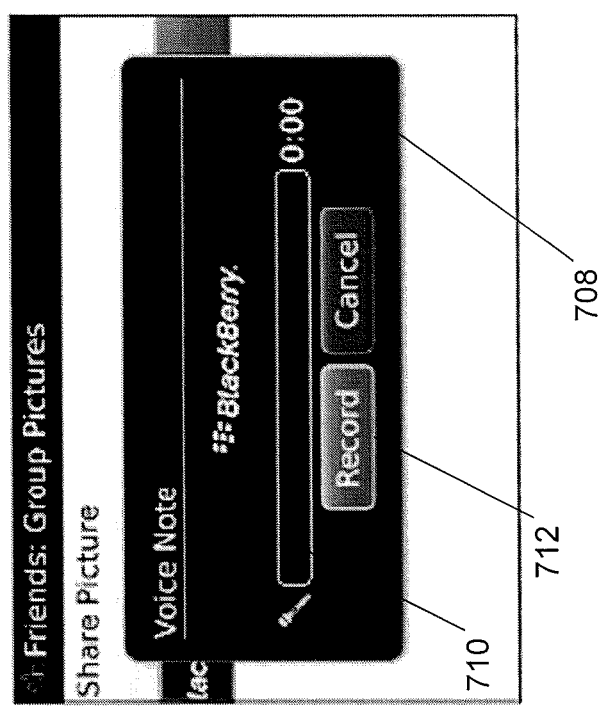
FIG. 29 is an example screen shot illustrating an interface for recording a voice note.

Voice notes can be added or replaced for pictures posted to a group. A Voice Note GUI 708 shown in FIG. 29 can be invoked, e.g. via a menu or via the voice notes icon 700. Options to add or replace voice notes can be provided enabling the user to create a new voice note or record over an existing one. A Record button 712 is selected to begin the recording whose progress is displayed in a status bar 710. When the recording is finished the voice note can be attached (not shown).

Figure 30:
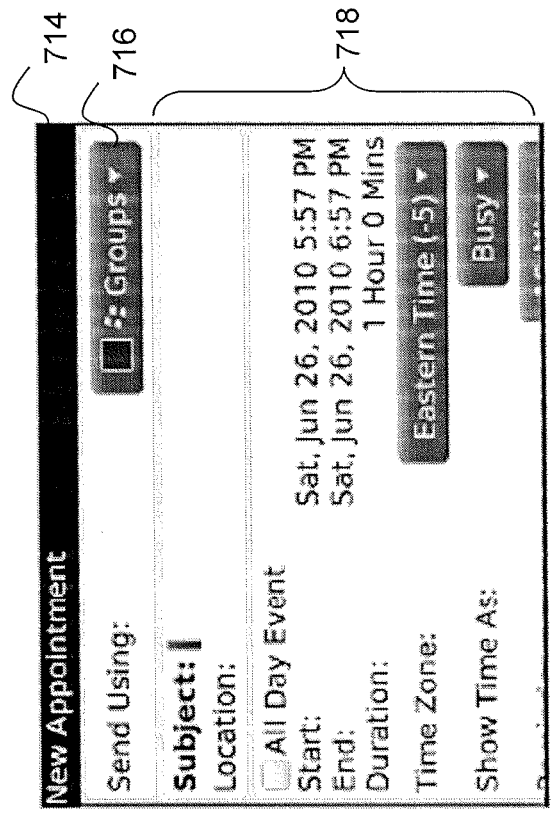
FIG. 30 is an example screen shot illustrating an interface for creating a new group appointment.

The group calendar is used to create appointments for the group and share such appointments with all members of the group. Members can add, change, or delete appointments from within the group 10. Appointments that are created in a group may also appear in an existing calendar application for that mobile device 100 to enable the user to view both personal and group calendar items from the same interface. A new appointment GUI 714 is shown in FIG. 30, which includes a Send Using option 716 that enables the user to generate a new group appointment. The remaining options 718 correspond to normal calendar appointment options as is well known in the art. Where both personal and group calendar items are shown in a calendar, a different visual cue, such as colour or pattern for example, may be used to easily distinguish the type of calendar item.

Figure 32:
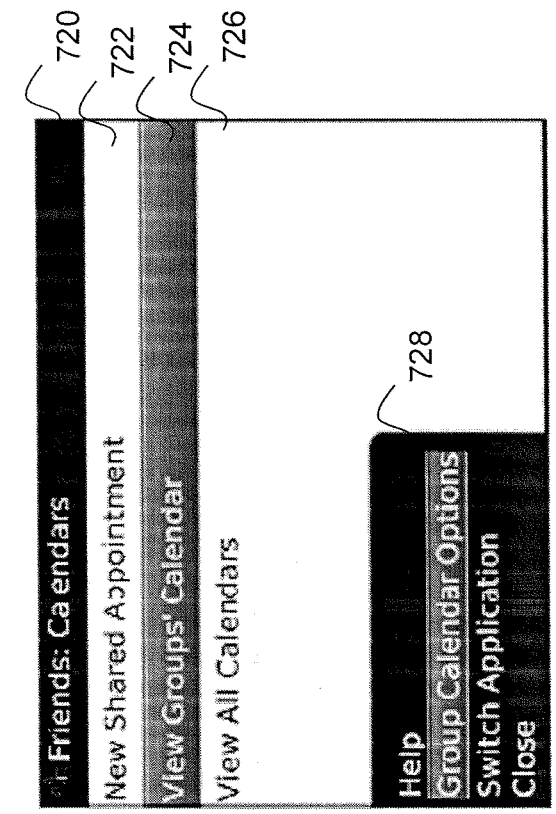
FIG. 32 is an example screen shot illustrating a menu interface for initiating another interface comprising group calendar options.
Figure 31:
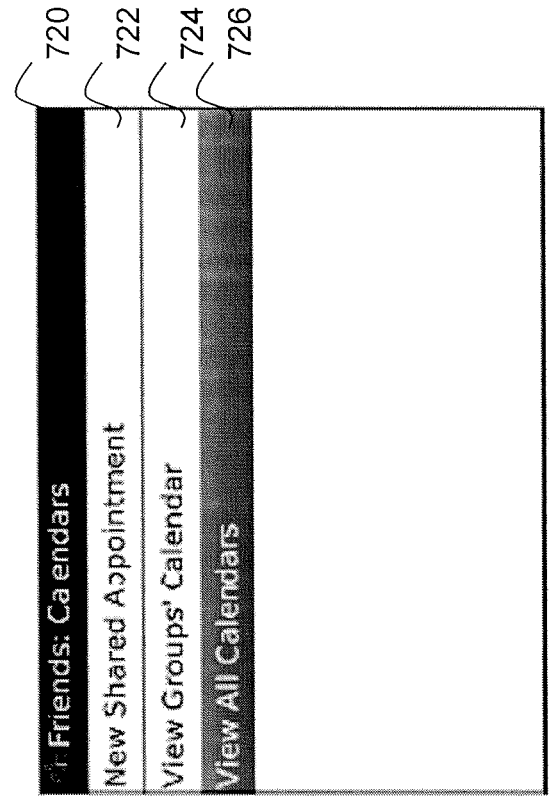
FIG. 31 is an example screen shot illustrating an interface displaying a group calendar.

A group calendars GUI 720 is shown in FIGS. 31 and 32 which is accessed by selecting a calendar icon in the group GUI 690. The group calendars GUI 720 comprises a New Shared Appointment option 722, a View Groups' Calendar option 724, and a View All Calendars option 726. By selecting the View All Calendars option 726, appointments for all groups that the user is a member of appear in the same calendar view (not shown). A calendar menu 728 can be invoked as shown in FIG. 32 using a menu key or other appropriate input to access Group Calendar Options. By selecting the View Groups' Calendar option 724 as also shown in FIG. 32, appointments can be accessed to enable them to be viewed, deleted, modified, etc.

In other embodiments functionality is provided whereby groups share other personal information management (PIM) information. Examples of other PIM information which can be shared) in a manner similar to the calendar information discussed above in relation to FIGS. 30, 31 and 32) includes contacts, address books, tasks and memos for example.

Figure 34:
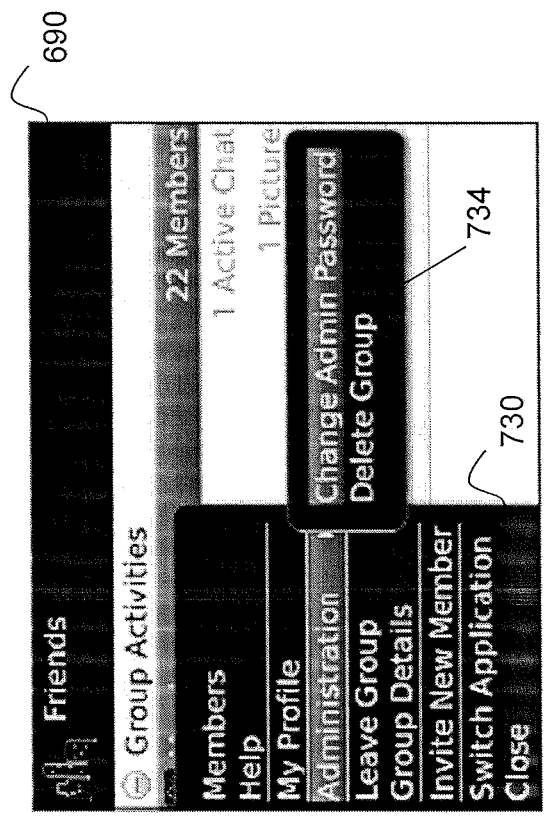
FIG. 34 is an example screen shot illustrating a menu interface for changing an administrator password.
Figure 33:
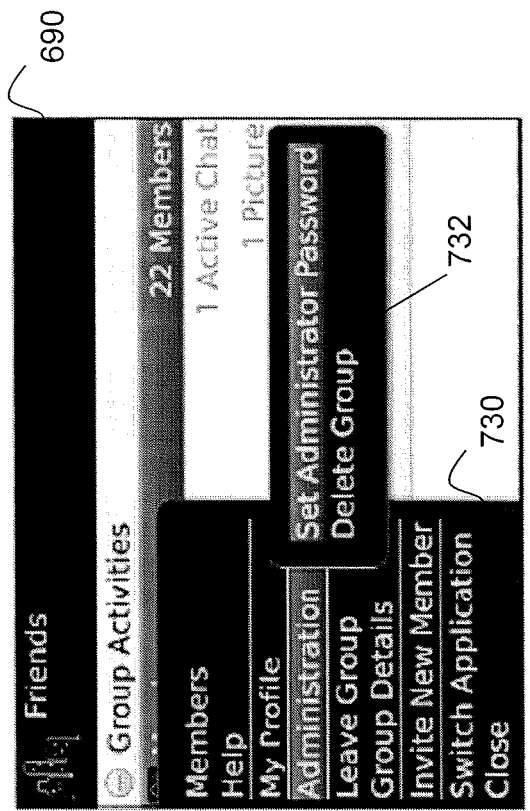
FIG. 33 is an example screen shot illustrating a menu interface for setting an administrator password.

As noted above, in these examples, when a group 10 is created, the creator becomes the administrator for the group 10 by default. As an administrator, the user can delete pictures and appointments for all members in a group 10. Administrators of a group 10 can also control membership of the group 10, set or change the administrator password, appoint other administrators and delete the group 10. To set an administrator password, an option menu 730 is invoked in the group GUI 690. By highlighting the Administration option in the menu 730, a secondary menu 732 is displayed, which enables the user to select a Set Administrator Password option or a Delete Group option. By selecting the Set Administrator Password option, the user is prompted to enter a password and accept the entry to set the password. If the user has already set an administrator password, a different secondary menu 734 is displayed as shown in FIG. 34, which includes an option to change the password. By selecting the Change Admin Password option in the secondary menu 734, the user is then prompted to type a new password and accept the new password to make the change.

Figure 36:
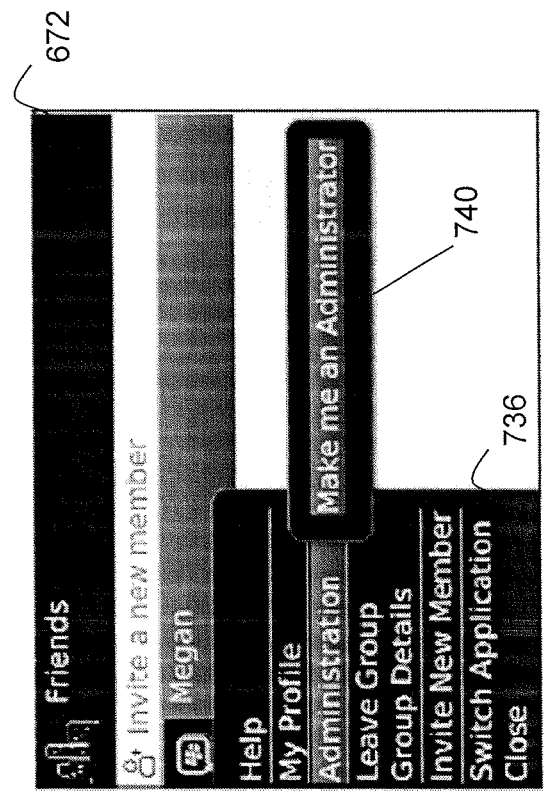
FIG. 36 is an example screen shot illustrating a menu interface for making a user an administrator.
Figure 35:
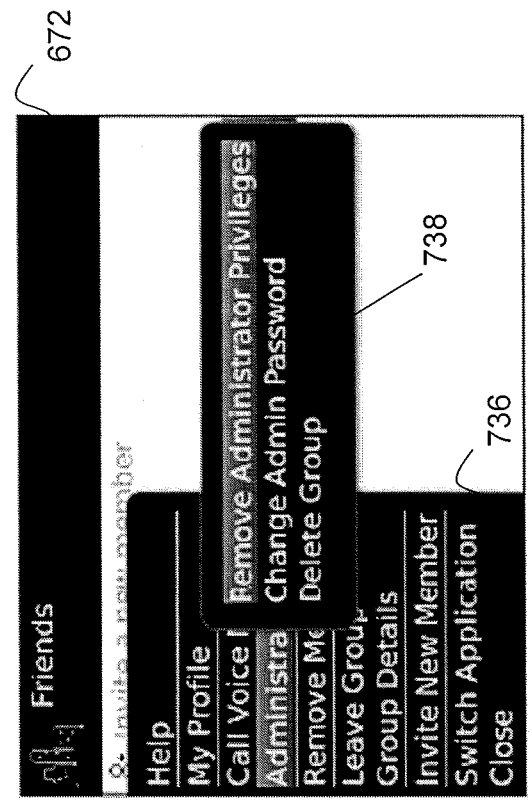
FIG. 35 is an example screen shot illustrating a menu interface for removing administrator privileges.

Administrator permissions can also be assigned or removed by the administrator. An options menu 736 can be invoked in the group contact list GUI 672 as shown in FIG. 35. By highlighting the Administrator option as shown, a sub-menu 738 is displayed, which provides various options, including one to remove or grant administrator privileges to selected contacts in the group. If the user is not an administrator but wishes to become one, the administrator can provide that user with the administrator password. In the group contact list GUI 672 as shown in FIG. 36, a non-administrator can invoke the options menu 736 and select the Administration option to display a sub-menu 740. The sub-menu 740 comprises a Make me an Administrator option which, when selected, prompts the user to enter the administrator password.

Figure 38:
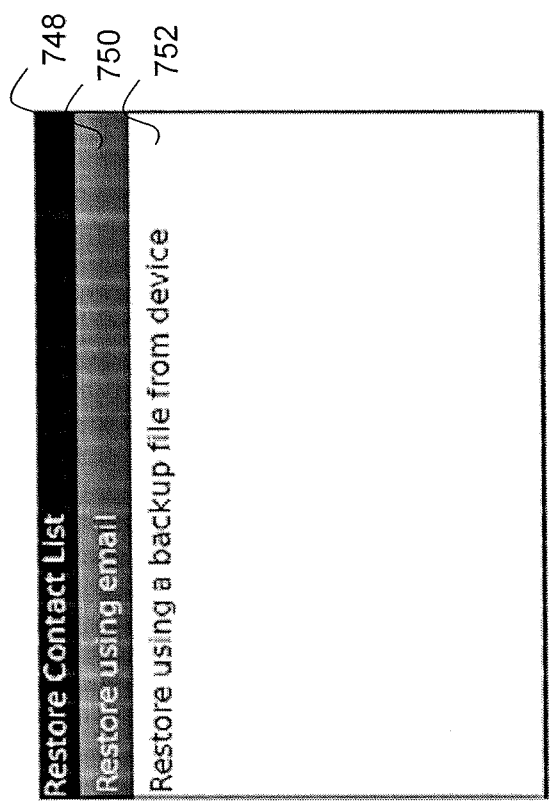
FIG. 38 is an example screen shot illustrating an interface for restoring contact lists.
Figure 37:
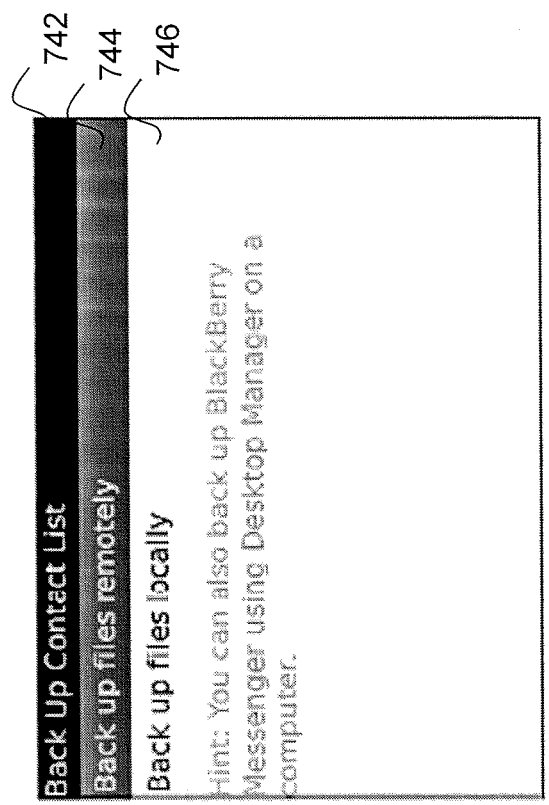
FIG. 37 is an example screen shot illustrating an interface for backing up contact lists.

The group sharing application 54 can maintain a contact list that is shared with other applications such as instant messaging, etc. The contact list is typically backed up and can be restored, to save and/or restore the contacts themselves, profiles, and group membership. Settings can be used to, for example, create back up files when contact list changes occur or enable manual back ups onto the device itself or a media card or other auxiliary memory. Such settings include the ability to back up the list of groups that the use belongs to so that the user automatically receives invitations to the groups when the contact list is restored to thereby rebuild the group memberships without requiring the user to be invited manually by each administrator. Contact list information can be registered with a server or other entity over a wireless network 20 to back up and restore contact lists automatically. Therefore, if all data on a mobile device 100 is deleted, the contacts, profiles, and group memberships can be restored by accessing the server. FIG. 37 illustrates a Back Up Contact List GUI 742, which includes a Back up files remotely option 744, and a Back up files locally option 746. FIG. 38 illustrates a Restore Contact List GUI 748, which includes a Restore using email option 750 and a Restore using a backup file from device option 752. As noted, if the restore functionality is used, the group memberships are rebuilt by re-inviting members to the groups 10.

Figure 39:
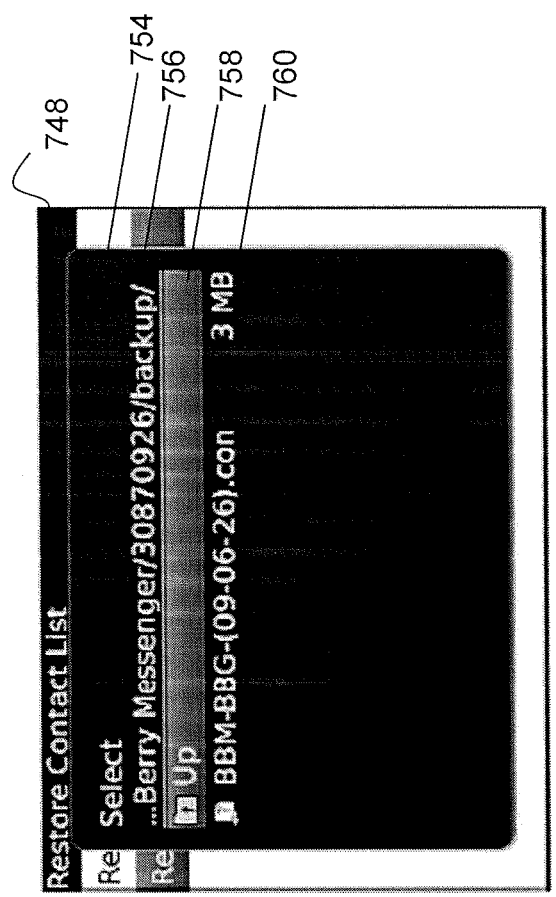
FIG. 39 is an example screen shot illustrating an interface for restoring contacts lists using a backup file.

When selecting the Restore using a backup file from device option 752, a selection prompt 754 is displayed as shown in FIG. 39. In this example, the file location is shown in field 756, and a particular back up file is shown in field 760. The user can navigate to find other back up files by selecting the folder field 758.

If a contact list that is backed up using a back up file does not include group memberships, it can be appreciated that a member from the group 10 that has the requisite permissions would need to re-invite the user in order to re-establish that particular group membership. It can be appreciated that the mobile device 100 may be configured to either send or receive the re-invitations upon restoring a contact list. For example, if the mobile device 100 is designated as an administrator, loss of them as a group member could affect the entire group. In this case, if the group is deleted due to the loss of an administrator, the administrator can be configured to send invitations to the previous group members to re-establish the group. Alternatively, the invitations can be controlled from a server. For example, if the loss of an administrator does not delete the group, upon restoring their contact list, that administrator could receive an invitation from the server or another member in the group. Similarly, if a group is deleted and subsequently restored, the group can be re-built via invitations sent from the server or a designated one of the members such as an administrator. If one of the members has maintained a back up of the contact list that includes a particular group and its membership, that back up file can be shared in order to re-establish the group (e.g. if a particular member is now missing). It can also be appreciated that other members that are not administrators may receive re-invitations via a server, another member such as an administrator or some other service.

Figure 40:
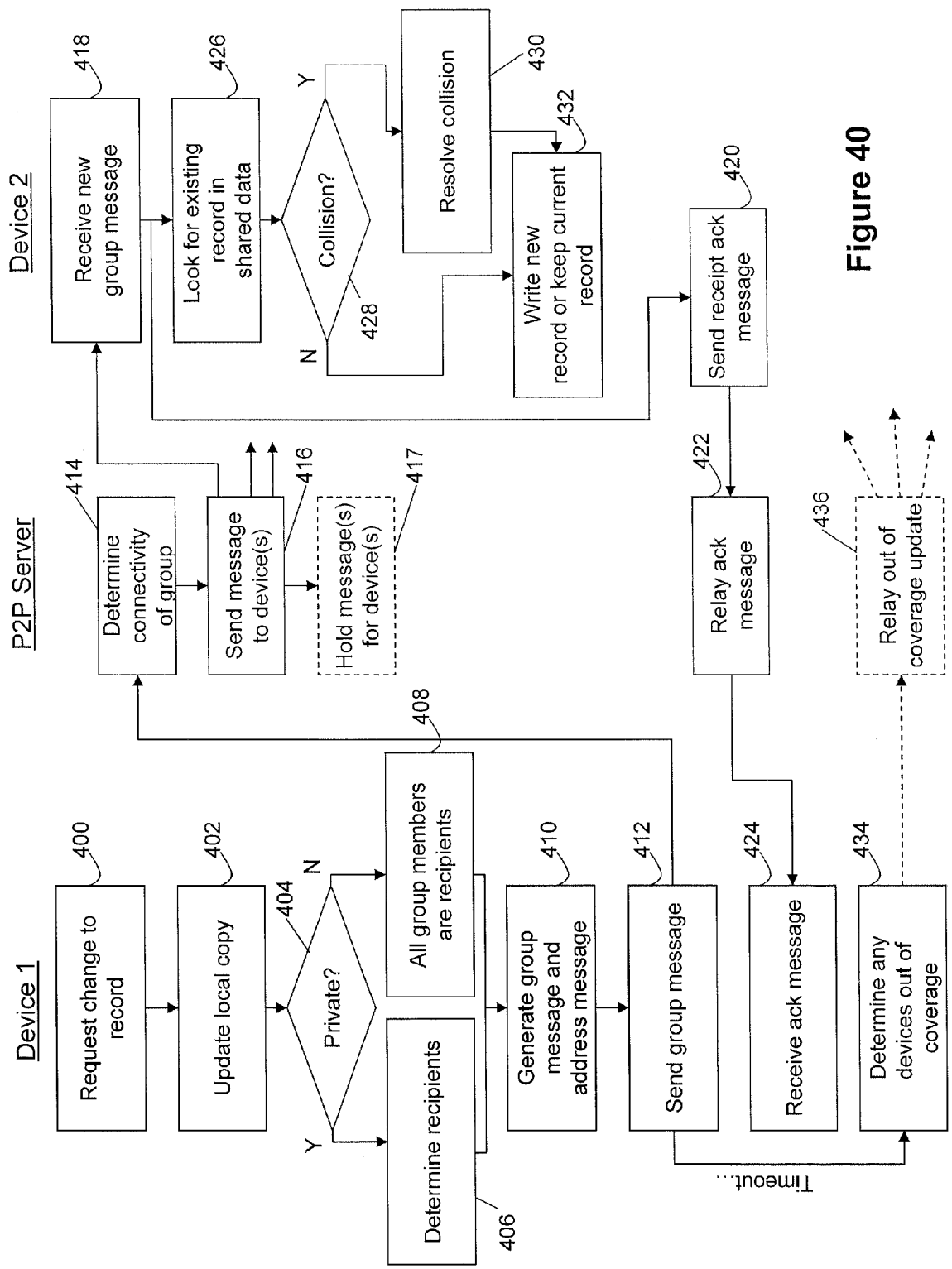
FIG. 40 is a flow chart illustrating example computer executable instructions for updating the shared data based on a change made by one mobile device in the group of mobile devices.

FIG. 40 illustrates an example set of computer executable instructions executed by a first device, device 1, the peer-to-peer (P2P) server 80, and a second device, device 2, to illustrate an update to a record 92 in the shared data 11 and the handling of acknowledgement messages 312 and detecting out of coverage situations. At 400, device 1 requests a change to a record 92 in the shared data 11, e.g. by adding to a list. At 402, the data updater module 300 would add a new value 94' to the shared data 11' by adding a new record 92 or replacing an existing record 92 with a new record 92 containing the new value 94'. At 404, the new message generator 306 determines whether or not the update is associated with a private database 90 or a global, group-wide or "public" database 90. If private, the new message generator 306 determines which members in the group 10 are permitted to be recipients at 406. If not private, all group members are determined to be recipients at 408. The new message generator 306 then generates a group message 8 at 410 and sends the group message 8 at 412, which is received by the peer-to-peer server 80.

At 414, the peer-to-peer server 80 determines the connectivity of the group 10. At 416, where applicable, messages 8 are sent to the connected members and, if necessary, messages 8 are held for those devices not in coverage at 417. In this example, device 2 receives the new group message 8 through the communication interface 302 at 418 and the message comparator 308 examines the shared data 11' at 426, looks for an existing record 92 corresponding to the record name 72 indicated in the message 8 and, at 428, determines if a collision exists. If there is an existing record 92 in the shared data 11', i.e. a collision exists, the collision is resolved at 430 using an appropriate collision resolution scheme. If an existing record 92 cannot be found, i.e. no collision exists, no collision resolution scheme is necessary. At 432, either a new record will be added or an existing record kept or overwritten depending on the outcome of the collision resolution.

While the data updater module 300 is processing the incoming group message 8, at 420 a receipt acknowledgement (ACK) message 312 is sent back to device 1, which is relayed by the peer-to-peer server 80 at 422 and received by device 1 at 424. At the time device 1 initially sends the group message 8 (at 412), typically a timeout begins wherein after a predetermined amount of time, device 1 determines how many if any ACK messages 312 have been returned, e.g. as at 424. At 434, after the timeout expires, device 1 may then determine if any devices in the group 10 are out of coverage and if necessary, at 436, send an out of coverage update via the peer-to-peer server 80. This enables other devices to be aware of the out of coverage status for any device which is out of coverage to enable, e.g. the group application GUI 320 to be updated to "grey out" or otherwise indicate which members are unavailable.

Figure 41:
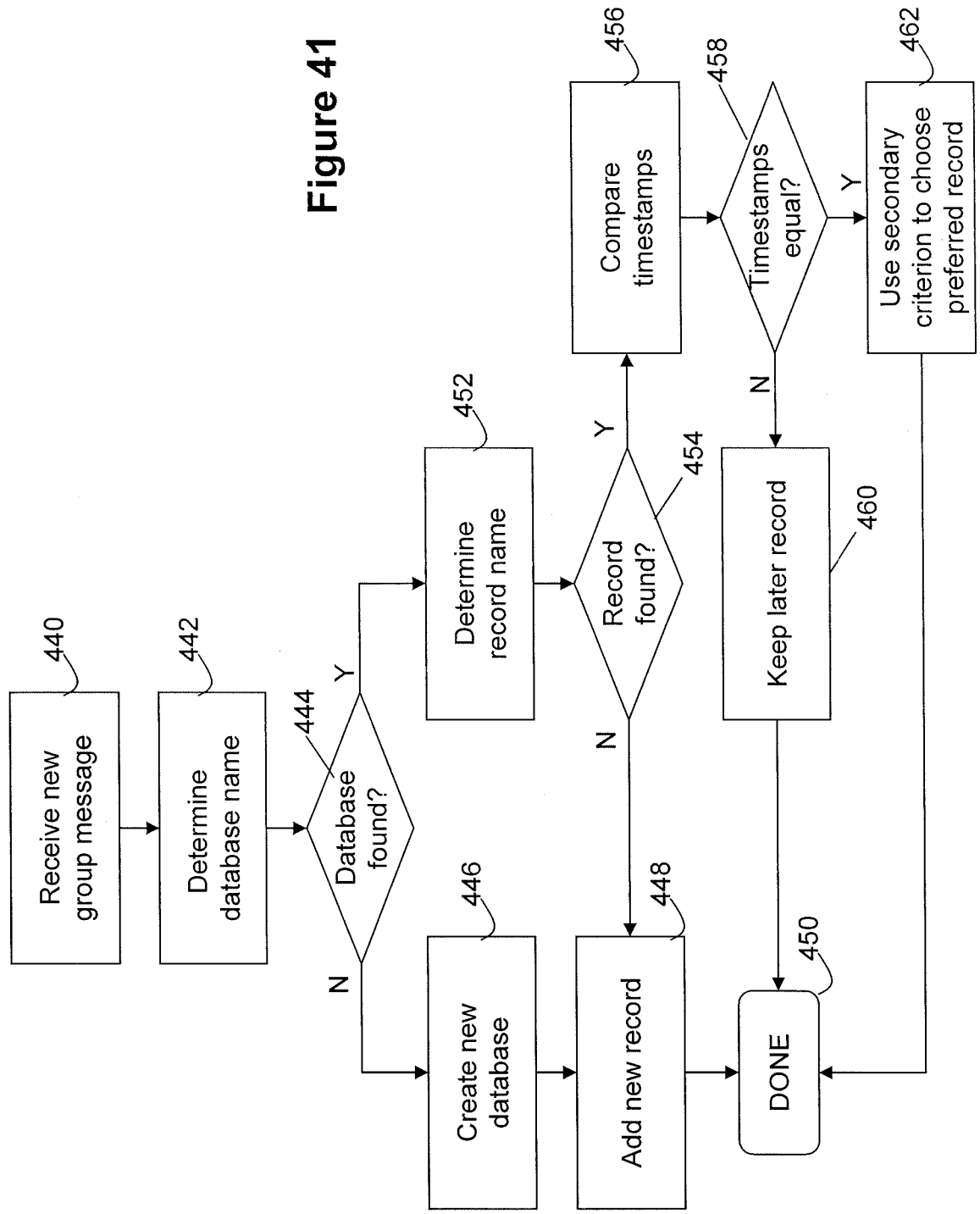
FIG. 41 is a flow chart illustrating example computer executable instructions for one embodiment for determining if a collision exists between record updates and resolving any such collisions.

Turning now to FIG. 41, one example for performing steps 418 to 432 in FIG. 40 is shown in greater detail. At 440, a new group message 8 is received and from the header 69, the database name 71 is determined at 442. If no database 90 can be found at 444 in the shared data 11', a new database 90 can be created at 446 (e.g. a new conversation, new list, etc.) and the new record 92 transported in the group message 8 is added to the new database at 448 and the update is done at 450. If a database 90 can be found in the shared data 11', the message comparator 308 then determines the record name 72 as indicated in the header 69 of the message 8. If no record 92 can be found at 454, a new record is added to the existing database 90 at 448 and the process finished at 450. If a record 92 matching the record name 72 exists, the message comparator 308 compares the record timestamps 74 in both records 92 at 456. If at 458 the timestamps 74 are deemed to be equal, then a secondary criterion may be used to break the tie at 462. Examples of a secondary criterion include PIN number (e.g. choose lower PIN number), alphabetical by record author 73, a collision hierarchy, etc. If the timestamps 74 are deemed to be different at 458, the later record is kept at 460 and the process is completed at 450.

Figure 42:
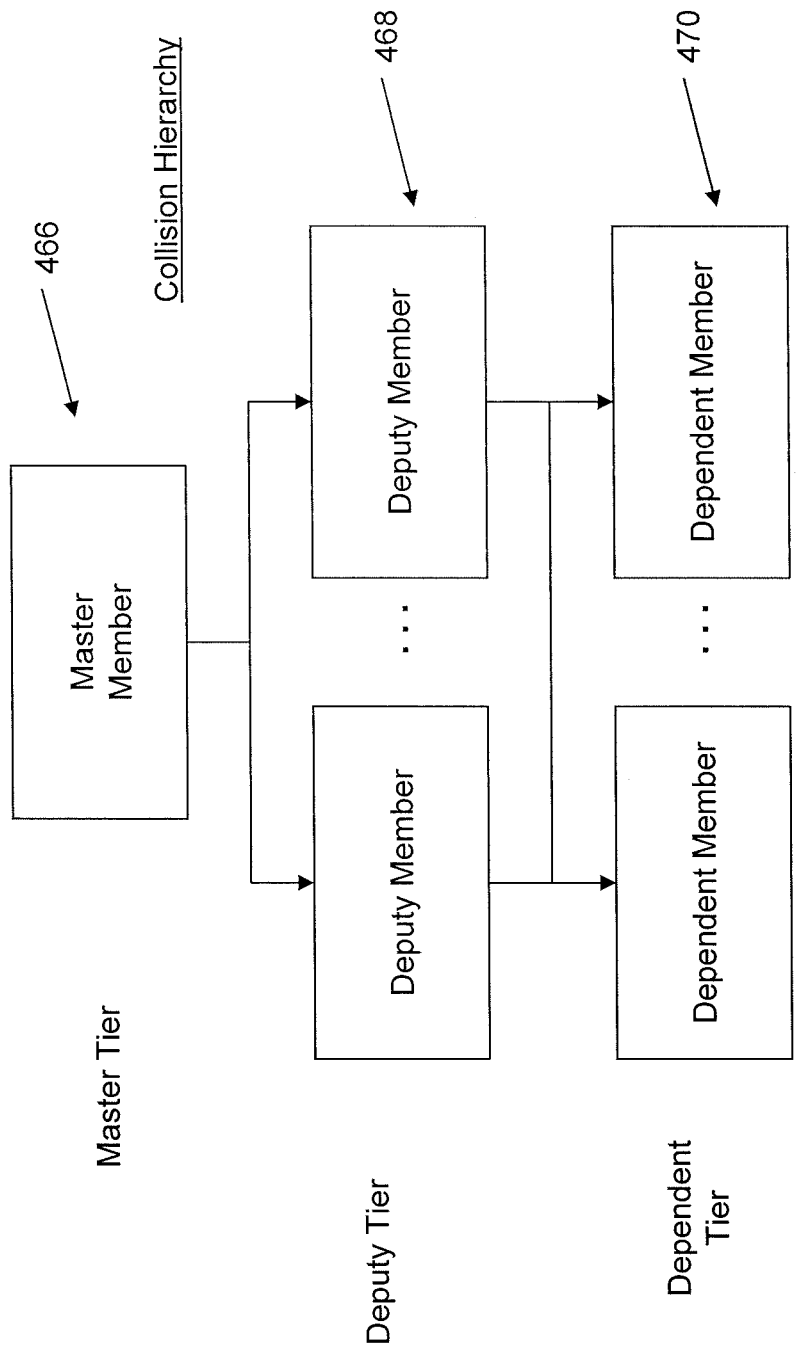
FIG. 42 is a block diagram illustrating an example group member hierarchy.
Figure 43:
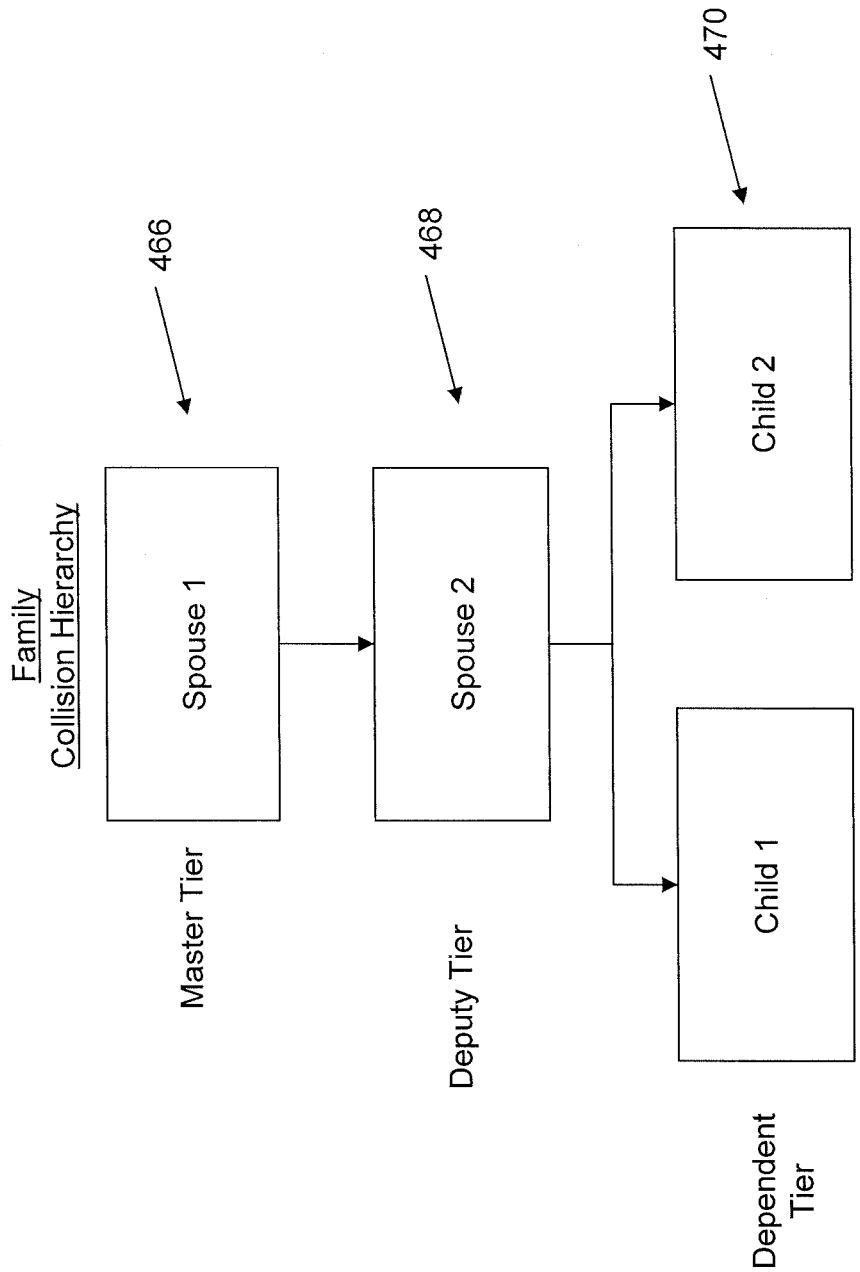
FIG. 43 is a block diagram illustrating an example family group according to the hierarchy of FIG. 42.

It can be appreciated that the comparison of timestamps 74 is only one example of a collision resolution technique and others may equally apply. For example, as shown in FIG. 42, a collision hierarchy comprising a plurality of tiers can be used. In this example, one of the members is designated a master member 466 at the highest or "master" tier. One or more members may then be designated as deputy members 468, which are in a lower deputy tier. One or more other members (typically the remaining members) are then designated dependent members 470 in a dependent tier, which is the lowest tier in this example. It can be appreciated that greater or fewer tiers can be used. For example, with only three members, a master member 466 and only two deputy members 468 or two dependent members 470 being designated. Alternatively, the same three members could be spread over all three tiers. FIG. 43 illustrates an example of a family group hierarchy for resolving family collisions in a family group 10. In this case, one of the spouses in the family, spouse 1, is designated the master member 466, the other spouse, spouse 2 is designated a deputy member 468, and the two children, child 1 and child 2, are designated dependent members 470 at the lowest tier. By designating a master member 466, any updates made by the master member 466 that find a collision are kept, regardless of the timing. This allows a group veto to be exercised if desired.

Figure 44:
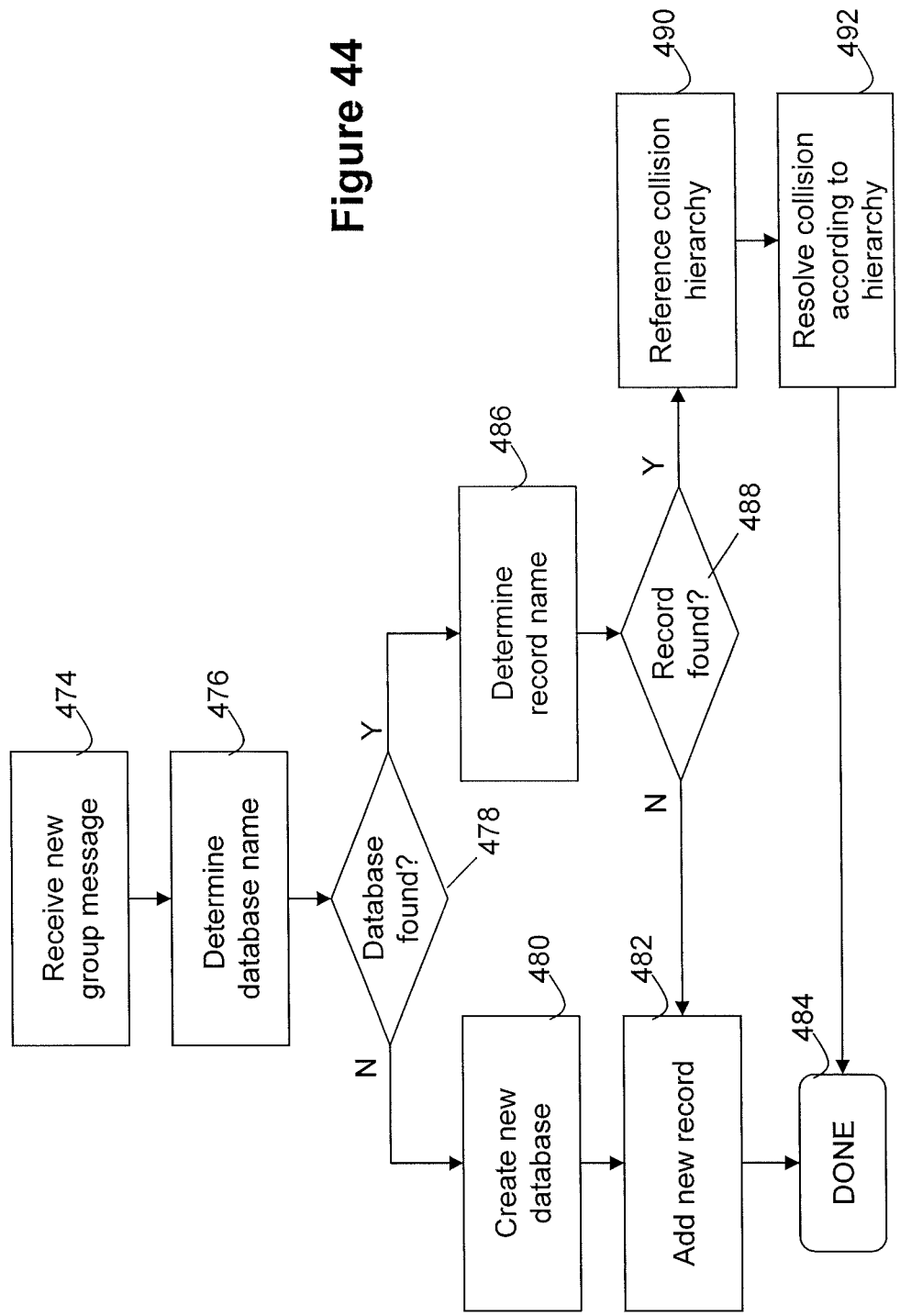
FIG. 44 is a flow chart illustrating example computer executable instructions for another embodiment for determining if a collision exists between record updates and resolving any such collisions.

FIG. 44 illustrates a collision resolution technique that utilizes a collision hierarchy such as the only shown in FIG. 42. It can be appreciated that steps 474 through 488 are the same as steps 440 through 454 in FIG. 41 and thus details thereof need not be reiterated. When resolving collisions using a hierarchy, at 490, the collision hierarchy is referenced to determine if any of the members supersede the others and in what order. The collision is then resolved according to the hierarchy at 492 and the process completed at 484. It may be noted that collision hierarchy may include any hierarchy determined according to any criteria or rules, such as numerical, alphabetical, relative importance or any other way to distinguish one record 92 over others.

Figure 45:
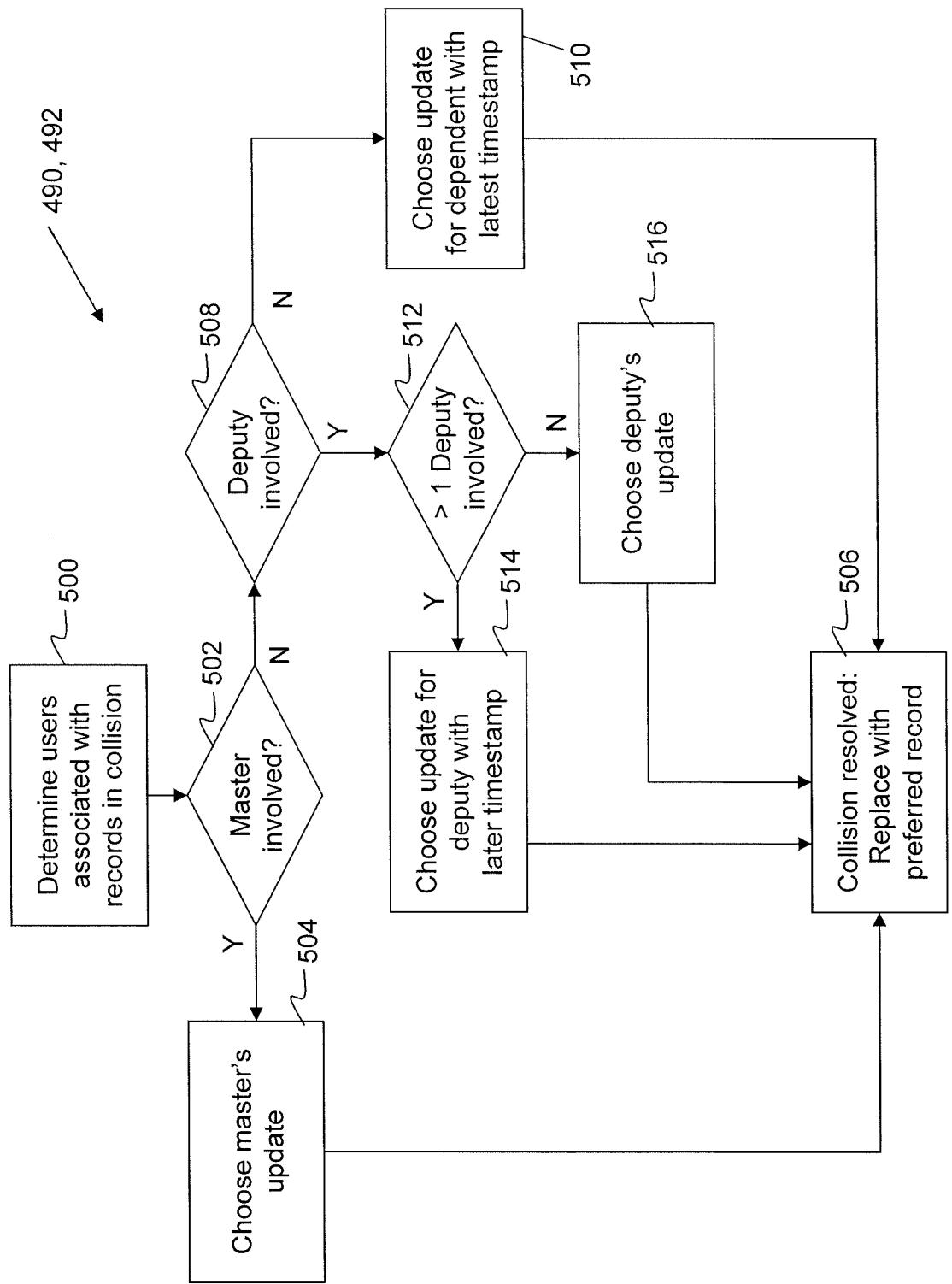
FIG. 45 is a flow chart illustrating example computer executable instructions for resolving a collision between record updates according to the example group member hierarchy shown in FIG. 42.

FIG. 45 illustrates an example of performing steps 490 and 492 according to the hierarchy shown in FIG. 44. At 500, the message comparator 308 determines which users or members are associated with the records 92 in the collision, e.g. by referencing PIN numbers or record author 73 fields. If the master member 466 is determined at 502, the master's update is chosen at 504 and the collision is resolved at 506. However, if the master member 466 is not determined at 502, the message comparator 308 then determines at 508 if a deputy member 468 is involved in the collision. If no deputy member 468 is involved, indicating only dependent members 470 were involved in the collision, the update with the latest timestamp may be chosen at 510. It can be appreciated than any other secondary criterion can be used at 510 and the selection based on timestamps 74 is made for illustrative purposes only. If a deputy member 468 is involved, at 512, it is determined whether or not both records 92 were authored by deputy members 468. If not, only one deputy member 468 is involved and that update is chosen at 516. However, if more than one deputy member 468 is involved in the collision, the record with the latest timestamp 74 (or other secondary criterion) is chosen as the new record 94' at 514 and the collision is resolved at 506.

Figure 46A:
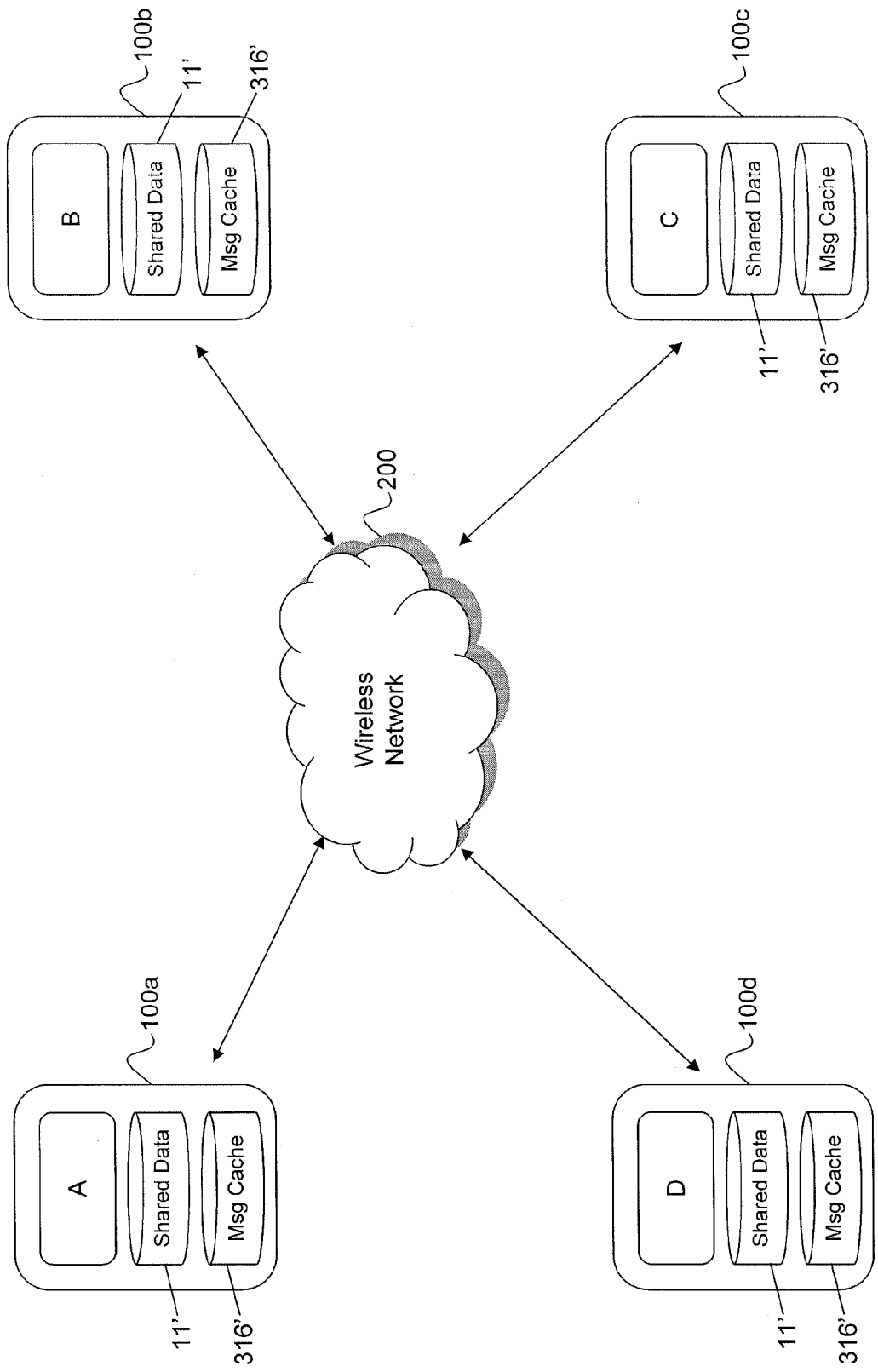
FIGS. 46(a) and 46(b) are schematic diagrams illustrating an example alternative embodiment wherein undelivered group messages are cached at the mobile devices.
Figure 46B:
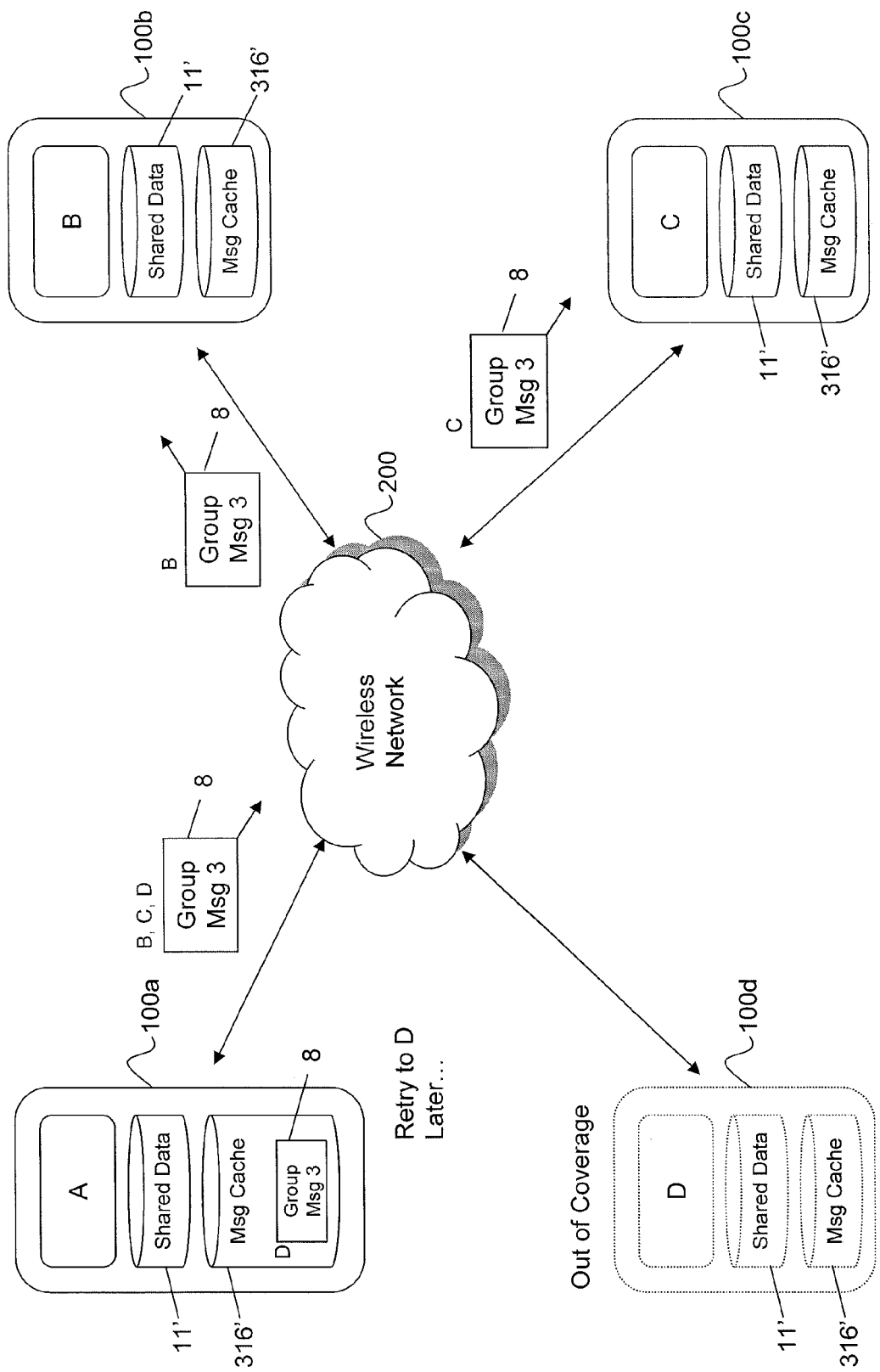

Another embodiment is shown in FIGS. 46(*a*) and 46(*b*), wherein a message cache 316' is maintained on the mobile device 100 rather than in a peer-to-peer server 80 or similar device. This embodiment may be implemented where a different type of message exchange service is used via the wireless network 200, i.e. other than a peer-to-peer or PIN-to-PIN exchange are herein exemplified. As shown in FIG. 46(*b*), in the same out of coverage situation for mobile device 100*d* that was illustrated in FIG. 9 or FIG. 11, a message 8 sent to members B, C, D would in some suitable way communicate an acknowledgement of receipt back to mobile device 100*a* such that mobile device 100*a* would know to hold the group Msg 3 and retry later. In this way, the mobile device 100 is responsible for delivery retries and caching messages 8 that have not been received. It can be appreciated that the principles described herein may equally apply to the embodiment shown in FIG. 46, only without relying on the peer-to-peer server 80 for relaying messages. It can also be appreciated that in such an embodiment, the mobile device 100 would need to be capable of sending multi-cast messages either via a locally stored program or a program running on the available message exchange service.

Figure 47:
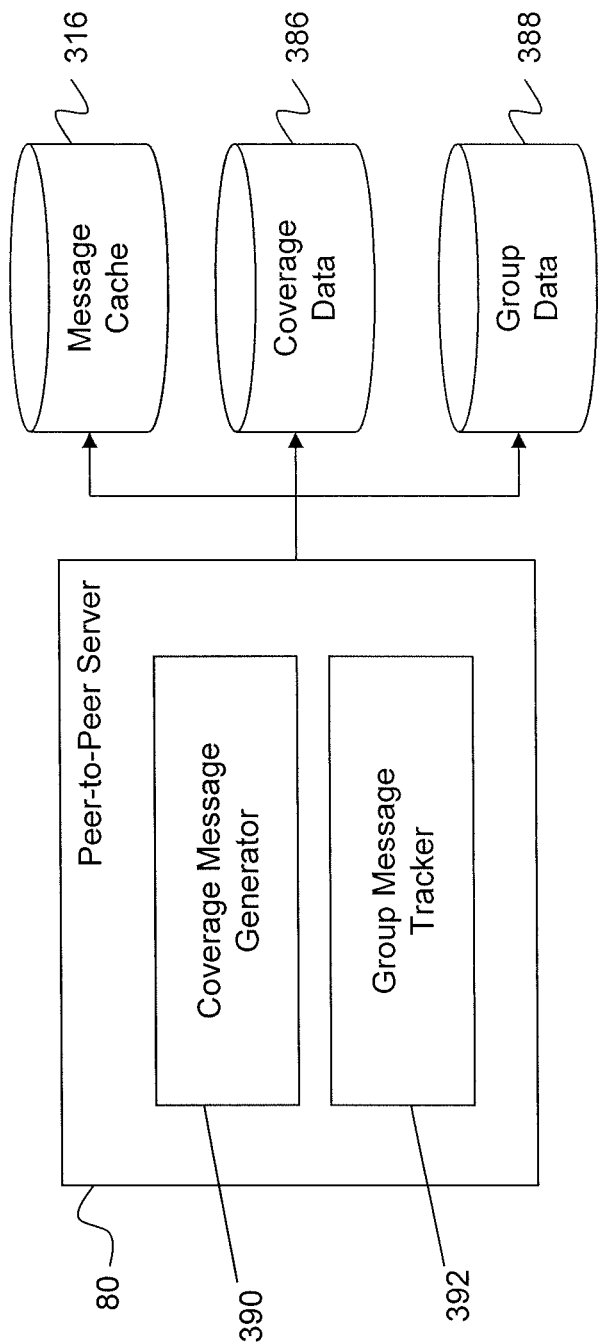
FIG. 47 is a block diagram illustrating an example alternative embodiment for the peer-to-peer server configured to track device coverage and send in and out of coverage messages.

Another embodiment is shown in FIG. 47, wherein the tracking of ACK messages 312 and determining in and out of coverage situations are offloaded from the mobile devices 100 to the peer-to-peer server 80. In this example, the peer-to-peer server 80 comprises a coverage message generator 390 for generating out of coverage messages 314 and back in coverage messages 315; and a group message tracker 392 for tracking the members of a group 10 associated with each message 8 relayed by the peer-to-peer server 80. In addition to the message cache 316, the peer-to-peer server 80 comprises or otherwise has access to coverage data 386 for recording which members are in and out of coverage, and group data 388 for tracking which messages are associated with what members.

Figure 48:
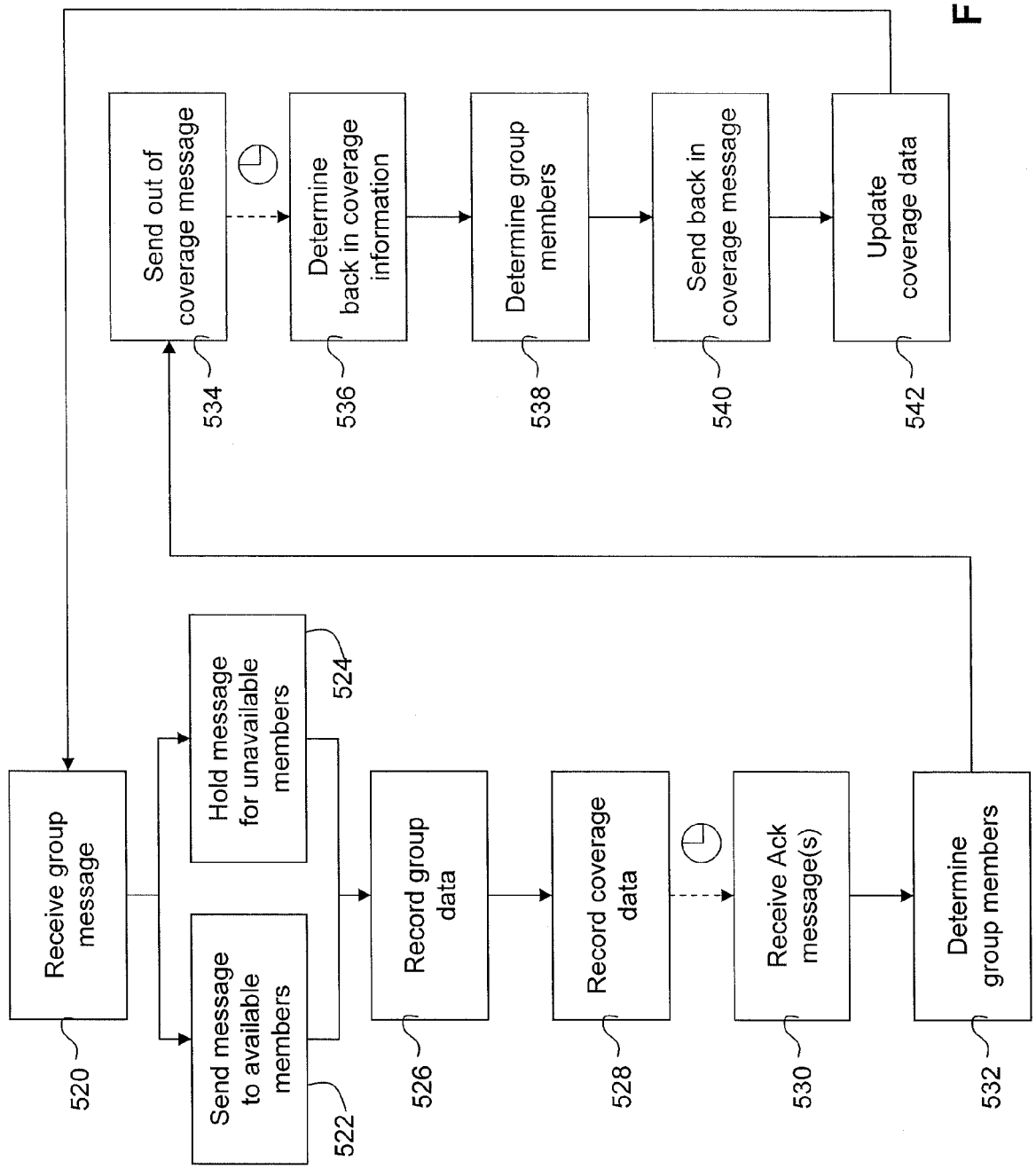
FIG. 48 is a flow chart illustrating example computer executable instructions for having the peer-to-peer server of FIG. 47 track device coverage by monitoring acknowledgement messages and send in and out of coverage messages.

FIG. 48 illustrates an example set of computer executable instructions that may be executed by the peer-to-peer server 80 in offloading the above-noted tasks from the mobile devices 100. At 520 a group message 8 is received, at 522 is sent to all available members, and at 524 is held for all unavailable members. At 526 the group message tracker 392 records the group data, e.g. by storing in a message log, an identifier for the message and each member that was listed in the Dest PIN field 70. At 528, the peer-to-peer server 80 records the coverage data based on who is currently in and out of coverage and at 530, typically after some time has elapsed, the coverage message generator 390 determines which if any ACK messages 312 have been received. By comparing the ACK messages 312 to the members associated with the message 8, the coverage message generator 390 may determine at 532, which group members have acknowledged receipt and those which have not. Using this information, the coverage message generator 390 may, at 534 send out of coverage messages 314 to the group members and hold those for members not in coverage. Typically after some time has elapsed, the coverage message generator 390 then determines which if any of the mobile devices 100 have come back into coverage at 536, e.g. by receiving a new message 8 or through some other available information. The group message tracker 392 can then be used to determine the group members associated with the original message 8 at 538, and a back in coverage message 315 can be sent to the members at 540 and the coverage data 386 updated at 542. This process may be repeated for each new group message received 520 or on a periodic basis, or both, to provide up to date coverage information to the mobile devices 100, e.g. to enable them to update GUIs, without requiring additional messages to be generated at the device. In this way, message transfer is optimized by moving tasks from the mobile device 100 to the peer-to-peer server 80 at the expense of increased intelligence and overhead at the peer-to-peer server 80.

Figure 49A:
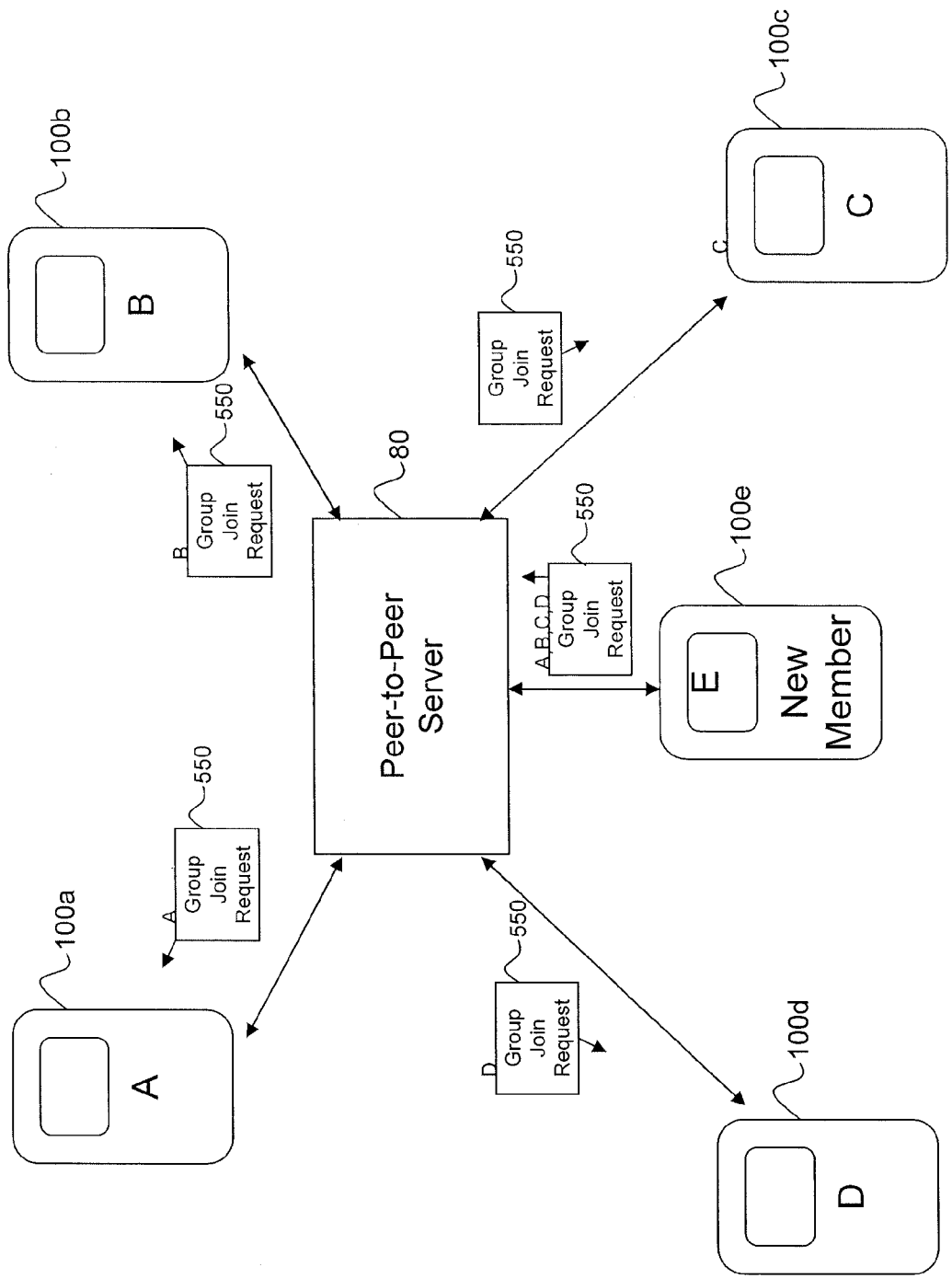
FIGS. 49(a) to 49(c) are schematic diagrams illustrating an example provisioning process for adding a new member to a group.
Figure 49B:
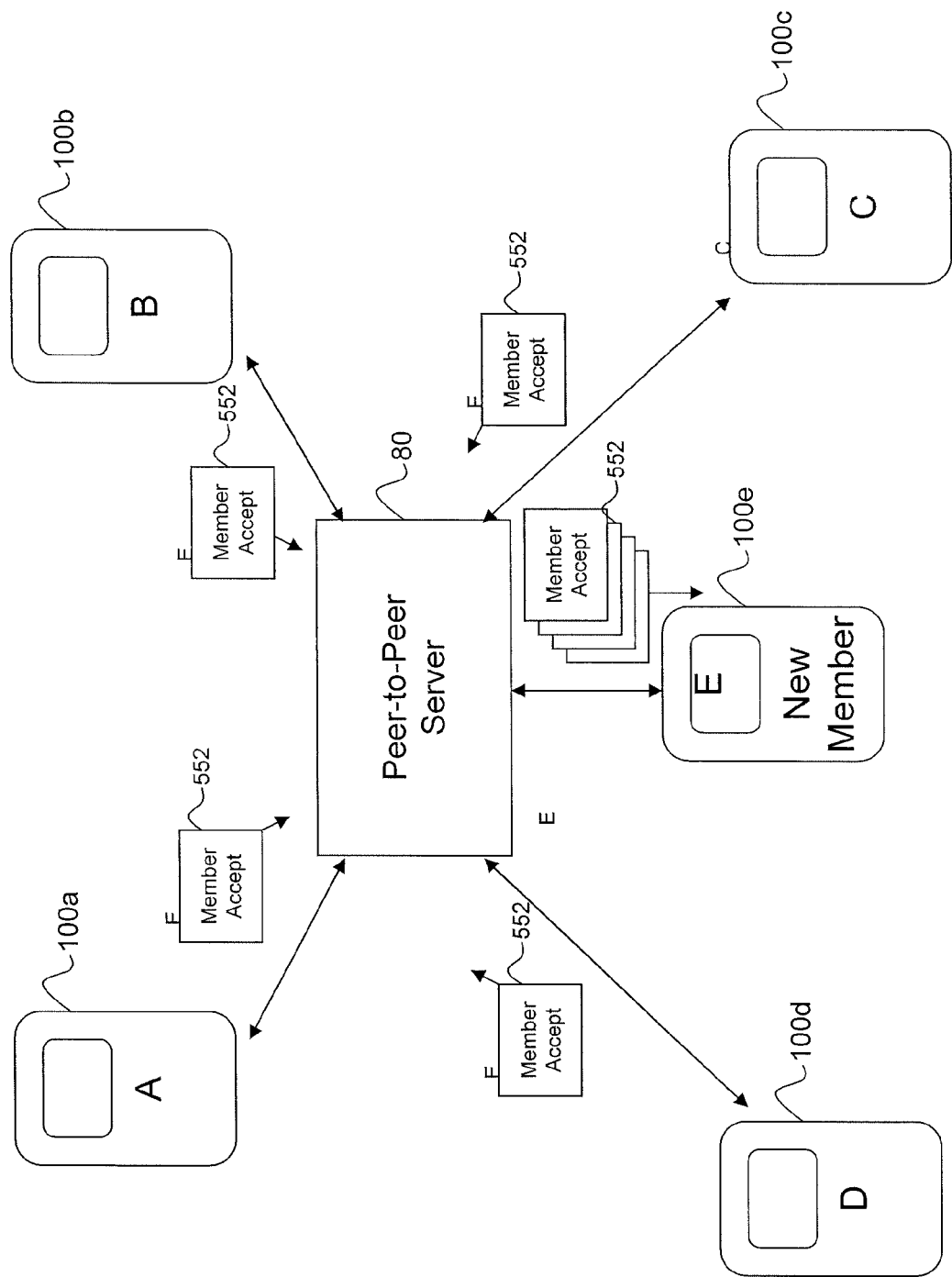
Figure 49C:
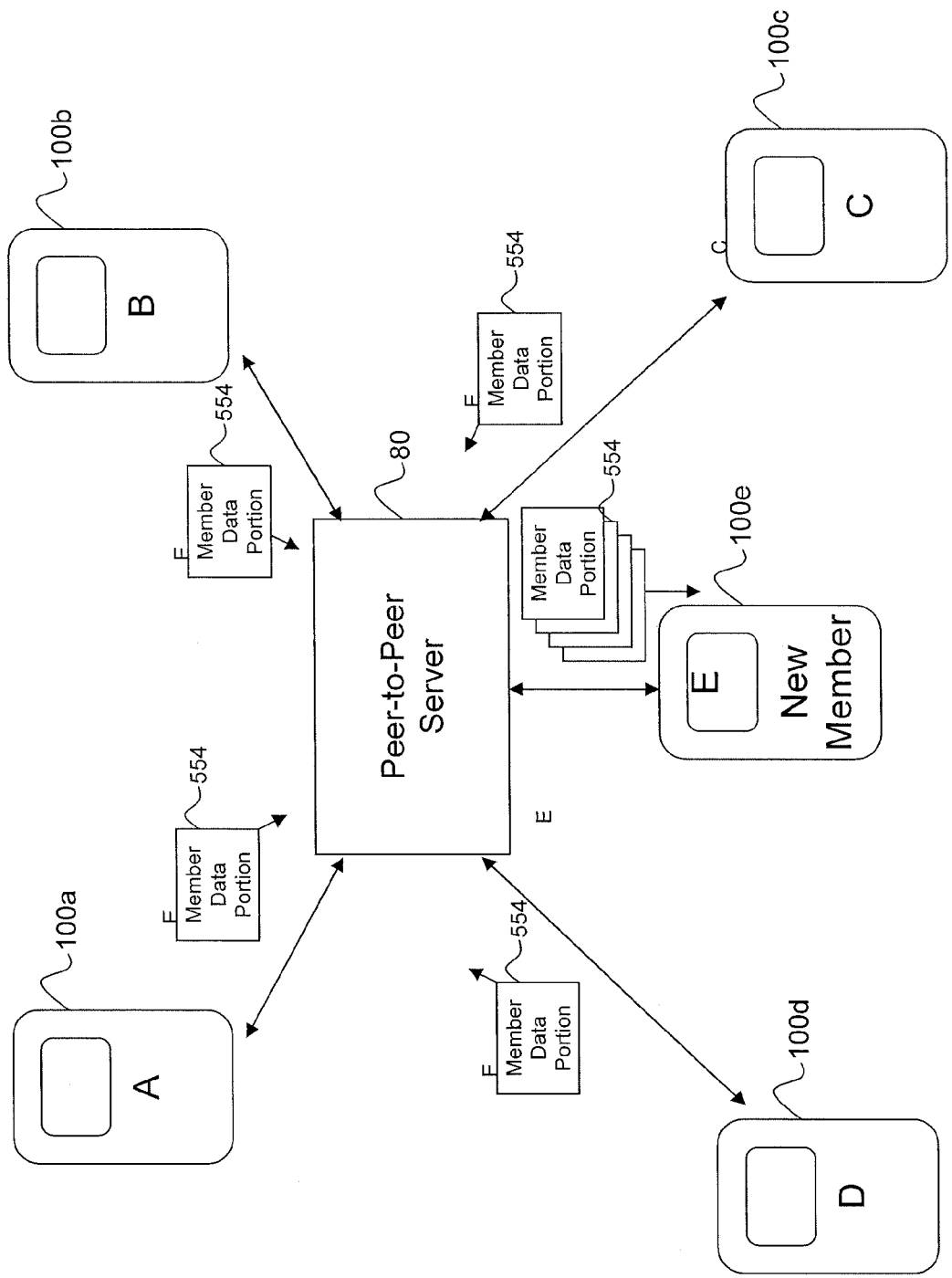
Figure 50:
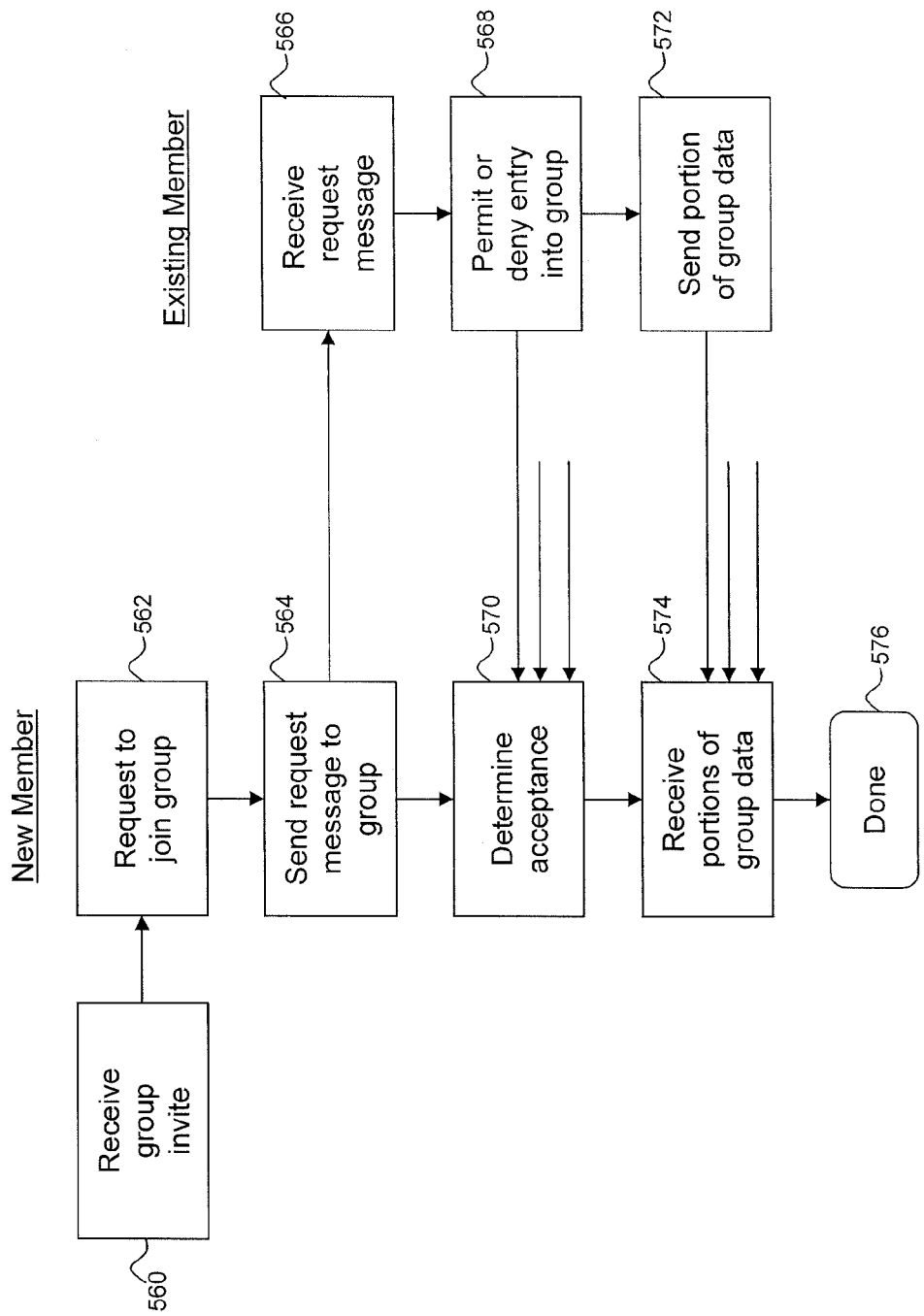
FIG. 50 is a flow chart illustrating example computer executable instructions for adding a new member to a group.

As discussed above, by associating a record author field 73 with each message 8, when new members join a group 8, the new member can be provisioned with an up-to-date set of shared data 11 by having each member contribute messages 8 that include records 92 created by them. Another embodiment is shown in FIGS. 49 and 50 to illustrate such a provisioning scheme. Turning first to FIG. 49(a), a new member E, having mobile device 100e in this example requests to join the group 10 by sending a group join request 550, which is relayed to each of the members. In this example, it is assumed that the new member E ascertains the group membership by first receiving an invitation from a group member or elsewhere but it can be appreciated that other methods may be employed. As shown in FIG. 49(b), each group member may reply to the request 550 with a member accept message 552, which are then used by the group application 54 residing on the new member's mobile device 100e to confirm acceptance into the group 10. Upon accepting member E, each existing member may then send the portions 554 of the shared data 11 which they authored to enable the new member to build their own up-to-date version of the shared data 11, as shown in FIG. 49(c).

Turning to FIG. 50, a provisioning procedure for permitting member E to join the group is shown. At 560, the new mobile device 100e receives or otherwise obtains a group invite, e.g. provided by one of the existing members or an intermediary (e.g. book club organizer). At 562, the new mobile device 100e uses an existing or newly installed group application 54 to generate a group join request 550 and, at 564, sends the group join request 550 to each group member. It can be appreciated that where hierarchies exist in the group 10, the new member may be able to simply send a message to the master member 466 who governs the membership. Each existing member in this example receives a group join request 550 at 566 and through some auxiliary process (e.g. by prompting a user) permits or denies entry into the membership at 568. The new member in this example then waits for receipt of member accept messages 552 at 570 to determine acceptance and at 572, assuming acceptance is granted, the existing members would begin sending their portions of the shared data, which are received at 574. The new member would then be provisioned and the process completed at 576.

A method and system are therefore provided for sharing data amongst a group of a plurality of mobile devices without requiring a database or server to centrally store the shared data. The shared data is instead stored by each group member individually while controlling the manner in which the shared data is updated. To manage updates, the shared data is atomized such that individual databases in the shared data are separated or otherwise delineated into one or more records, each record having associated therewith, a value.

To maintain a common copy of the shared data at each device, any update is sent to all group members using an intermediate message exchange service that is capable of transmitting a sent message to more than one recipient if necessary. In this way, the updates are multicast to the group. To manage the content of the shared data, each update comprises one or more changes to a current copy of a corresponding record.

At the receiving end, each record may then be evaluated and replaced in its entirety (according to certain criteria) to simplify the resolution of collisions between updates to similar records and to inhibit propagation of changes throughout the shared data. In other words, atomic changes can be used such that only the data, information, selection or other value associated with a single record is affected for each addition, change or update. By managing the shared data in this way, updates to the shared data are also more tolerant of out-of-coverage situations. While devices are out-of-coverage, messages containing updates can be held until the device comes back into coverage or the messages may be resent on a periodic basis or both.

It will be appreciated that the particular options, outcomes, applications, screen shots and icons shown in the figures and described above are for illustrative purposes only and many other variations can be used according to the principles described.

It will also be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the mobile device 100 (or devices 12, 14, 16, 18) or accessible or connectable thereto. Any application or module herein described may be implemented using computer readable/executable instructions that may be stored or otherwise held by such computer readable media.

Accordingly, there may be provided a mobile device, computer readable medium comprising instructions for operating the mobile device and a method for operating the mobile device, wherein the method comprises enabling a back up file to be generated for a contact list on the mobile device, the contact list comprising at least one group; enabling the contact list to be restored using the back up file; and sending or receiving an invitation to re-join a particular group.

There may also be provided a mobile device, computer readable medium comprising instructions for operating the mobile device and a method for operating the mobile device, wherein the method comprises capturing an image of a barcode on the mobile device; reading the barcode to obtain an identifier associated with a group; and if the reading is successful, associating the mobile device with the group.

There may also be provided a mobile device, computer readable medium comprising instructions for operating the mobile device and a method for operating the mobile device, wherein the method comprises storing a barcode on the mobile device; and displaying the barcode using a display on the mobile device such that the entire barcode is visible on the display; wherein the barcode comprises an identifier associated with a group, and the displaying enables another mobile device to scan the barcode to join the group.

There may also be provided a mobile device, computer readable medium comprising instructions for operating the mobile device and a method for operating the mobile device, wherein the method comprises determining if members of a group to which the mobile device belongs are in a contact list associated with another messaging medium; and if a member of the group is not in the contact list, enabling an invitation to be sent to the member to be added as a contact for the another messaging medium.

There may also be provided a mobile device, computer readable medium comprising instructions for operating the mobile device and a method for operating the mobile device, wherein the method comprises storing one or more personal calendar appointments on the mobile device; storing one or more group calendar appointments on the mobile device, the group calendar appointments being shared by a plurality of members of the group; and displaying the personal calendar appointments and the group calendar appointments in a common graphical user interface.

There may also be provided a mobile device, computer readable medium comprising instructions for operating the mobile device and a method for operating the mobile device, wherein the method comprises enabling a group to be created; assigning the mobile device as an administrator for the group; and enabling control of membership of the group via the mobile device.

Although the above has been described with reference to certain specific embodiments, various modifications thereof will be apparent to those skilled in the art as outlined in the appended claims.

The invention claimed is:

1. A method of operating a mobile device, the method comprising:
    storing a barcode on the mobile device, the barcode identifying an individual associated with the mobile device;
    detecting selection of an option to display the barcode identifying the individual; and
    displaying the barcode to enable another mobile device to capture at least one image of the barcode to prepare an invitation for the mobile device to join a group using information from the barcode identifying the individual; and
    receiving the invitation to join the group.

2. The method of claim 1, further comprising displaying an image of an example barcode on the mobile device prior to reading the barcode being displayed by the other mobile device.

3. The method of claim 2, wherein the image of the example barcode is displayed after detecting selection of the option.

4. The method of claim 1, wherein the displaying comprises displaying the entire barcode on a display of the mobile device.

5. The method of claim 1, the barcode being a two dimensional barcode comprising four corners and displaying the entire barcode comprises having the four corners of the barcode visible on the display.

6. The method of claim 1, wherein the group is associated with an instant messaging application.

7. A method of operating a mobile device, the method comprising:
    storing a barcode on the mobile device, the barcode identifying an individual associated with the mobile device;
    detecting selection of an option to display the barcode, the option being provided in a group details user interface; and
    displaying the barcode on a display of the mobile device such that the entire barcode is visible on the display to enable another mobile device to scan the barcode and be invited to join the group using information from the barcode identifying the individual.

8. The method of claim 7, the barcode being a two dimensional barcode comprising four corners and displaying the barcode comprises having the four corners of the barcode visible at the same time.

9. The method of claim 7, further comprising providing an option to join another group, and reading another barcode being displayed by another mobile device, to identify the other group, by capturing at least one image of the other barcode.

10. The method of claim 7, wherein the group is associated with an instant messaging application.

11. A method of operating a mobile device, the method comprising:
    detecting selection of an option to invite a new member to a group from a user interface associated with the group, the mobile device being a member of the group;
    reading a barcode being displayed by another mobile device, to identify an individual associated with the other mobile device, by capturing at least one image of the barcode; and
    inviting the individual identified by the barcode to join a group using information from the barcode.

12. The method of claim 11, wherein reading the barcode comprises capturing images until the entire barcode is visible on a display of the mobile device.

13. The method of claim 12, the barcode being a two dimensional barcode comprising four corners and reading the barcode comprises capturing the images until the four corners of the barcode are visible in a same image.

14. The method of claim 11, further comprising providing confirmation when the barcode has been read.

15. The method of claim 14, wherein the confirmation comprises an auditory beep.

16. The method of claim 11, wherein the group is associated with an instant messaging application.

17. A non-transitory computer readable medium comprising computer executable instructions for operating a mobile device, the computer executable instructions comprising instructions for:
    storing a barcode on the mobile device, the barcode identifying a contact associated with the mobile device;
    detecting selection of an option to display the barcode identifying the contact; and
    displaying the barcode to enable another mobile device to capture at least one image of the barcode to prepare an invitation for the mobile device to join a group using information from the barcode identifying the individual; and receiving the invitation to join the group.

18. A mobile device comprising a display, a processor, and memory, the memory comprising computer executable instructions for operating the processor to:

store a barcode on the mobile device, the barcode identifying a contact associated with the mobile device;

detect selection of an option to display the barcode identifying the contact; and display the barcode to enable another mobile device to capture at least one image of the barcode to prepare an invitation for the mobile device to join a group using information from the barcode identifying the individual; and receive the invitation to join the group.

19. A non-transitory computer readable medium comprising computer executable instructions for operating a mobile device, the computer executable instructions comprising instructions for:

storing a barcode on the mobile device, the barcode identifying an individual associated with the mobile device;

detecting selection of an option to display the barcode, the option being provided in a group details user interface; and displaying the barcode on a display of the mobile device such that the entire barcode is visible on the display to enable another mobile device to scan the barcode and be invited to join the group using information from the barcode identifying the individual.

20. A mobile device comprising a display, a processor, and memory, the memory comprising computer executable instructions for operating the processor to:

store a barcode on the mobile device, the barcode identifying an individual associated with the mobile device;

detect selection of an option to display the barcode, the option being provided in a group details user interface; and display the barcode on a display of the mobile device such that the entire barcode is visible on the display to enable another mobile device to scan the barcode and be invited to join the group using information from the barcode identifying the individual.

21. A non-transitory computer readable medium comprising computer executable instructions for operating a mobile device, the computer executable instructions comprising instructions for:

detecting selection of an option to invite a new member to a group from a user interface associated with the group, the mobile device being a member of the group;

reading a barcode being displayed by another mobile device, to identify an individual associated with the other mobile device, by capturing at least one image of the barcode; and inviting the individual identified by the barcode to join a group using information from the barcode.

22. A mobile device comprising a display, a processor, and memory, the memory comprising computer executable instructions for operating the processor to:

detect selection of an option to invite a new member to a group from a user interface associated with the group, the mobile device being a member of the group;

read a barcode being displayed by another mobile device, to identify an individual associated with the other mobile device, by capturing at least one image of the barcode; and invite the individual identified by the barcode to join a group using information from the barcode.

23. The mobile device of claim 18, further comprising computer executable instructions for operating the processor to display an image of an example barcode on the mobile device prior to reading the barcode being displayed by the other mobile device.

24. The mobile device of claim 23, wherein the image of the example barcode is displayed after detecting selection of the option.

25. The mobile device of claim 18, wherein the displaying comprises displaying the entire barcode on a display of the mobile device.

26. The mobile device of claim 18, the barcode being a two dimensional barcode comprising four corners and displaying the entire barcode comprises having the four corners of the barcode visible on the display.

27. The mobile device of claim 18, wherein the group is associated with an instant messaging application.

28. The mobile device of claim 22, wherein reading the barcode comprises capturing images until the entire barcode is visible on a display of the mobile device.

29. The mobile device of claim 28, the barcode being a two dimensional barcode comprising four corners and reading the barcode comprises capturing the images until the four corners of the barcode are visible in a same image.

30. The mobile device of claim 22, further comprising computer executable instructions for operating the processor to provide confirmation when the barcode has been read.

31. The mobile device of claim 30, wherein the confirmation comprises an auditory beep.

32. The mobile device of claim 22, wherein the group is associated with an instant messaging application.

* * * * *